United States Patent
Yamada

(10) Patent No.: US 10,271,221 B2
(45) Date of Patent: Apr. 23, 2019

(54) COMMUNICATION DEVICE, CONTROL METHOD, AND COMMUNICATION SYSTEM

(71) Applicant: NEC CORPORATION, Tokyo (JP)

(72) Inventor: Yoshiyuki Yamada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/534,569

(22) PCT Filed: Dec. 10, 2015

(86) PCT No.: PCT/JP2015/006158
§ 371 (c)(1),
(2) Date: Jun. 9, 2017

(87) PCT Pub. No.: WO2016/092852
PCT Pub. Date: Jun. 16, 2016

(65) Prior Publication Data
US 2017/0339573 A1   Nov. 23, 2017

(30) Foreign Application Priority Data
Dec. 10, 2014  (JP) ................................. 2014-249511

(51) Int. Cl.
*H04L 12/26* (2006.01)
*H04W 16/22* (2009.01)
(Continued)

(52) U.S. Cl.
CPC .......... *H04W 16/22* (2013.01); *H04W 24/08* (2013.01); *H04W 72/08* (2013.01); *H04W 4/70* (2018.02); *H04W 76/10* (2018.02)

(58) Field of Classification Search
CPC ............................ H04W 16/22; H04W 72/08
See application file for complete search history.

(56) References Cited

U.S. PATENT DOCUMENTS 6,094,420 A * 7/2000 Lemieux ............. H04L 12/5602
370/232
8,457,071 B2 * 6/2013 Alex ................. H04W 36/0055
370/331
(Continued)

FOREIGN PATENT DOCUMENTS

| JP | 2014-087031 A | 5/2014 |
|---|---|---|
| JP | 5537600 B2 | 7/2014 |
| JP | 2014-170372 A | 9/2014 |

OTHER PUBLICATIONS

Communication dated Dec. 5, 2017 from the European Patent Office in counterpart European application No. 15866660.2.
(Continued)

*Primary Examiner* — Chi H Pham
*Assistant Examiner* — Fahmida S Chowdhury
(74) *Attorney, Agent, or Firm* — Sughrue Mion, PLLC

(57) ABSTRACT

A communication device for calculating an amount of resources of a virtual network node required for satisfying a predetermined condition of delay in signal processing based on a feature value of communication traffic so as to avoid performance degradation in signal processing in the communication network due to excess communication traffic which varies and changes. For example, the virtual network node may be realized by a virtual machine which provides network functions relating to signal processing by software of the virtual machine, and can flexibly increase or decrease processing resources.

10 Claims, 42 Drawing Sheets

(51) Int. Cl.
  *H04W 72/08* (2009.01)
  *H04W 24/08* (2009.01)
  *H04W 4/70* (2018.01)
  *H04W 76/10* (2018.01)

(56) References Cited

U.S. PATENT DOCUMENTS

| | | | | |
|---|---|---|---|---|
| 8,861,494 B2* | 10/2014 | Mukhopadhyay | .... | H04W 24/02 370/338 |
| 8,942,119 B1* | 1/2015 | Vivanco | ........ | H04W 24/08 370/252 |
| 9,307,446 B2* | 4/2016 | Choi | ........ | H04L 5/00 |
| 2003/0007453 A1* | 1/2003 | Ogier | ........ | H04L 47/17 370/229 |
| 2010/0015926 A1* | 1/2010 | Luff | ........ | H04L 41/0604 455/67.13 |
| 2010/0091717 A1* | 4/2010 | Bonta | ........ | H04W 74/08 370/329 |
| 2013/0298184 A1* | 11/2013 | Ermagan | ........ | G06F 21/54 726/1 |

OTHER PUBLICATIONS

Jianzhe Tai, et al, "Ara: Adaptive Resource Allocation for Cloud Computing Environments under Bursty Workloads", Performance Computing and Communications Conference (IPCCC), 2011 IEEE 30th International, IEEE, Nov. 17, 2011, pp. 1-8 (8 pages), XPO32077131.

"Management and Orchestration architectural framework";MANO_GS_Skeleton_Change_R1, ETSI Draft; European Telecommunications Standards Institute (ETSI), vol. ISG-NFV, Apr. 30, 2014, see pp. 1-78 (entire 184 page document submitted), XP014228361.

International Search Report for PCT/JP2015/006158 dated Feb. 23, 2016.

"Jisedai no Joho Tsushin Network no Kiban Gijutsu ni Kanren shita Katsudo o Tenkai suru", NTT Network Technology Laboratories, Business Communication, Jul. 1, 2014, pp. 36 to 39, vol. 51 No. 7.

* cited by examiner

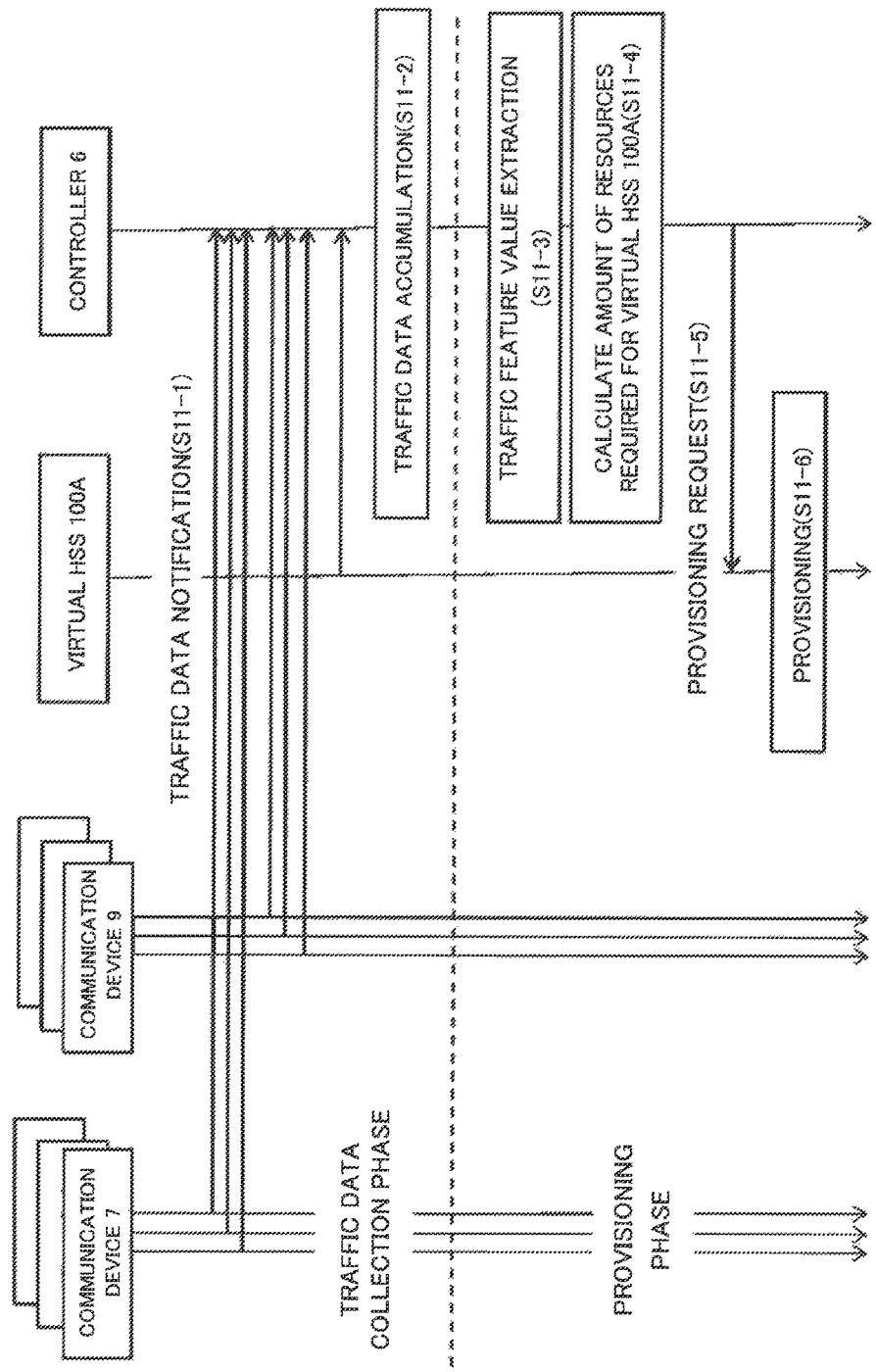

COMMUNICATION DEVICE, CONTROL METHOD, AND COMMUNICATION SYSTEM

CROSS REFERENCE TO RELATED APPLICATIONS

This application is a National Stage of International Application No. PCT/JP2015/006158 filed Dec. 10, 2015, claiming priority based on Japanese Patent Application No. 2014-249511 filed Dec. 10, 2014, the contents of all of which are incorporated herein by reference in their entirety.

TECHNICAL FIELD

The present invention relates to a communication device, a control method, a communication system, and a storage medium.

BACKGROUND ART

In recent years, as smart phones, smart devices, or the like come to be widely used, the volume of communication traffic has increased rapidly. As M2M (Machine to Machine) communication is also expected to proliferate in the future, there is a possibility that the volume of communication traffic will further increase. With the increasing volume of communication traffic, reinforcement of equipment at network nodes processing such communication traffic becomes important.

In PTL 1, a technique of, in a mobile communication system including physical servers that achieve virtual call processing nodes, generating the virtual call processing nodes based on an amount of communication processing in each of the physical servers is disclosed. PTL 1 describes that generating the virtual call processing nodes based on an amount of communication processing in each of the physical servers enables resources required for communication processing to be acquired and an equipment use efficiency to be increased.

CITATION LIST

Patent Literature

[PTL 1] Japanese Patent No. 5537600

SUMMARY OF INVENTION

Technical Problem

In the technique described in PTL 1, as described above, an amount of equipment at virtual call processing nodes is determined on the basis of an amount of communication processing in each physical server, that is, a CPU (Central Processing Unit) usage rate or the number of terminals.

However, in the technique described in PTL 1, the amount of equipment at the virtual call processing nodes is not determined in consideration of characteristics, such as statistics, of communication traffic, and there is a possibility that, depending on characteristics of such communication traffic, the performance of the virtual call processing nodes deteriorates with respect to a delay, a discarding rate, or the like in signal processing or the performance of the virtual call processing nodes becomes unstable.

An object of the present invention is to solve the above-described problem and provide a technique enabling at least one of a reduction in performance degradation in signal processing at network nodes and an enhancement of the stability of the network nodes based on an appropriate estimate of the amount of equipment for communication traffic.

Solution to Problem

A communication device according to an example embodiment of the present invention, is communication device that operates, by a virtual machine, a function of processing a control signal that a terminal transmits in order to connect to a network, and comprises: a first means for, from a network node that processes traffic that a plurality of the terminals transmit and receive, collecting traffic data that are information relating to the traffic; and a second means for, from the collected traffic data, extracting a traffic feature value that includes a degree to which the traffic varies, wherein, based on the extracted traffic feature value, the second means calculates an amount of resources of at least one of the communication device and the network node, the amount of resources being required for processing the traffic.

A control method according to an example embodiment of the present invention, comprises: from a network node that processes traffic that a plurality of terminals transmit and receive, collecting traffic data that are information relating to the traffic; from the collected traffic data, extracting a traffic feature value that includes a degree to which the traffic varies; and based on the extracted traffic feature value, calculating an amount of resources required for at least one of a communication device and the network node, the communication device operating, by a virtual machine, a function of processing a control signal that the terminals transmit in order to connect to a network.

A communication system according to an example embodiment of the present invention, comprises: a communication device that operates, by a virtual machine, a function of processing a control signal that a terminal transmits in order to connect to a network; and a network node that processes traffic that a plurality of the terminals transmit and receive, wherein the communication device comprises: a first means for, from the network node, collecting traffic data that are information relating to the traffic; and a second means for, from the collected traffic data, extracting a traffic feature value that includes a degree to which the traffic varies, wherein, based on the extracted traffic feature value, the second means calculates an amount of resources of at least one of the communication device and the network node, the amount of resources being required for processing the traffic.

A program stored in a storage medium according to an example embodiment of the present invention, makes a computer execute: a process of, from a network node that processes traffic that a plurality of terminals transmit and receive, collecting traffic data that are information relating to the traffic; a process of, from the collected traffic data, extracting a traffic feature value that includes a degree to which the traffic varies; and a process of, based on the extracted traffic feature value, calculating an amount of resources required for at least one of a communication device and the network node, the communication device operating, by a virtual machine, a function of processing a control signal that the terminals transmit in order to connect to a network.

Advantageous Effects of Invention

The present invention has an advantageous effect of enabling at least one of a reduction in performance degradation in signal processing at network nodes and an enhancement of the stability of the network nodes based on an appropriate estimate of the amount of equipment.

BRIEF DESCRIPTION OF DRAWINGS

FIG. 51 is a sequence chart illustrating an operation example of the communication system of the ninth example embodiment.

EXAMPLE EMBODIMENT

<First Example Embodiment>

A first example embodiment of the present invention will be described with reference to the drawings. In the following description, it is to be noted that drawing reference symbols noted in this example embodiment are added, for convenience, to respective elements as an example for facilitating understanding thereof, and the description of the example embodiment is not intended to make any limitation. In addition, the directions of arrows in the respective drawings only illustrate an example and do not limit the directions of signals among blocks.

Figure 1:
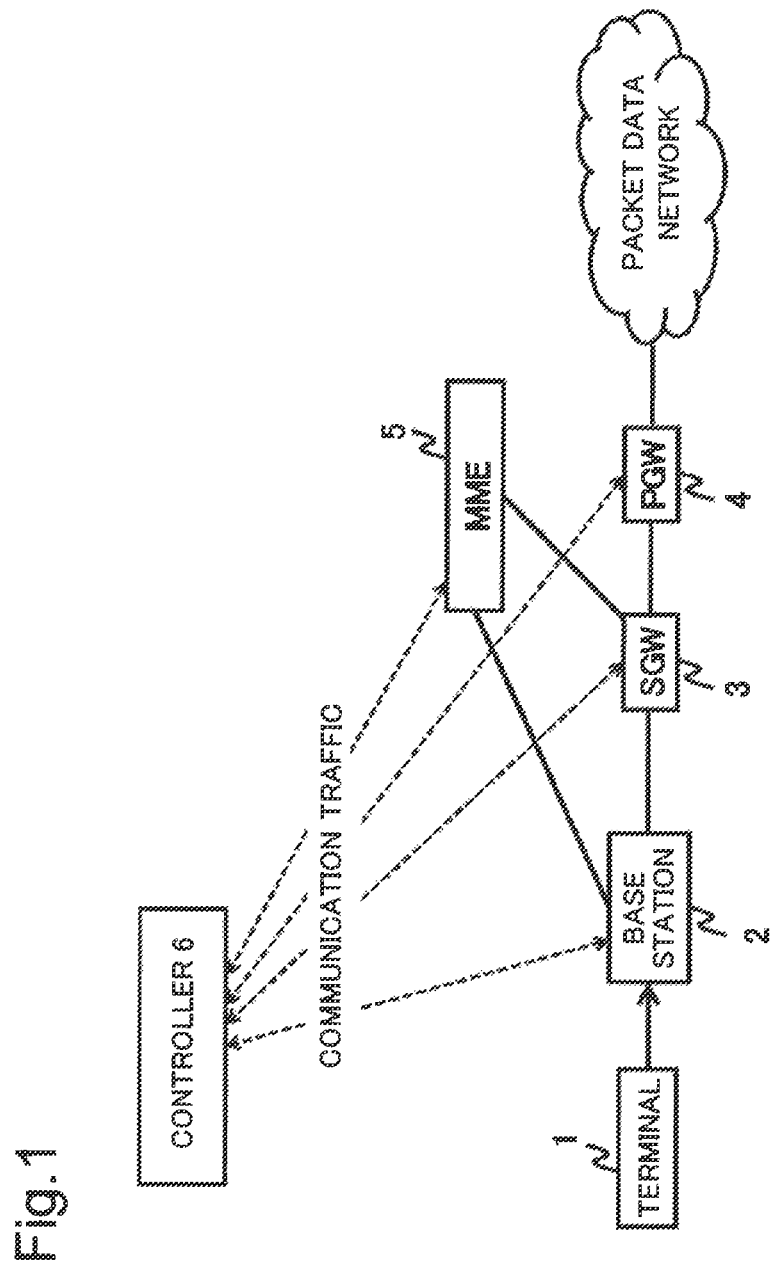
FIG. 1 is a configuration example of a communication system of a first example embodiment.

FIG. 1 is a configuration example of a communication system of the first example embodiment. Although FIG. 1 exemplifies a communication system based on LTE (Long Term Evolution), communication systems of the present invention are not limited to the example in FIG. 1. For example, the present invention is also applicable to GPRS (General Packet Radio Service), UMTS (Universal Mobile Telecommunication System), WiMAX (Worldwide Interoperability for Microwave Access), or the like.

In the example in FIG. 1, the communication system of the first example embodiment includes a terminal 1 and a plurality of types of communication devices. The terminal 1 (UE: User Equipment) communicates with an external packet data network, such as the Internet, via the plurality of types of communication devices. In this case, the communication devices are, for example, network nodes, such as a base station 2, an S-GW 3, a P-GW 4, an MME 5, and the like. In the description hereinafter set forth, the communication devices are collectively referred to as communication devices 7.

The terminal 1 connects to the base station 2 and accesses the Internet or the like via a core network. The core network is made up of, for example, the S-GW (Serving Gateway) 3, the P-GW (Packet Data Network Gateway) 4, and the MME (Mobility Management Entity) 5. In the following description, the S-GW 3 may be also referred to as an SGW 3. In addition, the P-GW 4 may be also referred to as a PGW 4.

The terminals 1 include a terminal 1 that is a mobile phone, a PC (Personal Computer), a mobile router, a smart device (for example, a smart meter that monitors power consumption in a home, a smart TV, or a wearable terminal), an M2M (Machine to Machine) device, or the like. The M2M devices include, for example, industrial equipment, a vehicle, health care equipment, a home electric appliance, or the like in addition to the above-described devices.

As described above, the communication devices 7 are, for example, network nodes, such as the base station 2, the S-GW 3, the P-GW 4, and the MME 5. The respective network nodes perform various types of signal processing relating to communication services that the communication system provides. For example, the MME 5 performs signal processing relating to mobility management of and connection management of the terminal 1. A communication device 7 may be any of the network nodes, that is, the base station 2, the S-GW 3, the P-GW 4, the MME 5, and the like, illustrated in FIG. 1.

The respective network nodes in the example in FIG. 1 include, for example, the following network functions.

The base station 2 has, for example, a function of performing data communication (U-Plane function) with the terminal 1 based on PDCP (Packet Data Convergence Protocol). In addition, the base station 2 has a function of processing control signaling (C-Plane function).

The S-GW 3 includes, for example, a function of processing packets (User-Plane function) and a function of processing control signaling (C-Plane function).

The P-GW 4 includes, for example, a function of processing packets (User-Plane function), a function of managing charging status based on communication (PCEF: Policy and Charging Enforcement Function), a function of controlling policies such as a QoS policy (PCRF: Policy and Charging Rule Function), a lawful interception (LI: Lawful Interception) function for intercepting communication, and the like.

The MME 5 includes, for example, a function (C-Plane function) of processing control signaling, which includes setting up and release of sessions for communication, control of handover, or the like, in cooperation with an HSS (Home Subscriber Server) that manages subscriber information of the communication system.

A controller 6 collects traffic data from the communication devices 7 and extracts a traffic feature value from the collected traffic data. The traffic data may be packets themselves that are transmitted and received among the respective devices. The traffic data may be header information of packets. The traffic data may be log information of packets. The traffic data may be information relating to times at which packets are transmitted and received, information relating to the number of such packets, or information relating to the data sizes of such packets.

The traffic feature value is an amount indicating, for example, a feature of traffic or a property of traffic. The traffic feature value is a statistic derived from traffic data or an amount derived through statistical processing of traffic data. The traffic feature value is derived from information relating to times at which packets are transmitted and received and information relating to the number of packets transmitted and received. The traffic feature value may be, for example, one of the amounts described below or a combination of a plurality thereof:

- an occurrence rate or an arrival rate of connection requests (connection frequency over the entire network);
- a burstiness index (also referred to as a synchronization rate among a plurality of terminals, a synchronization rate within the network, or a simultaneous arrival rate from a plurality of terminals);
- a periodic interval (when there exists periodicity);
- a phase (when, for example, occurrence time is set to be every hour on the hour); and
- a phase shift (when occurrence times are distributed over a range centered on a reference phase, or the like)

The controller 6 calculates an amount of resources required for each communication device 7 based on the extracted traffic feature value. The controller 6 extracts, for example, a burstiness index of traffic from a plurality of terminals or the other communication devices 7 as a traffic feature value and calculates an amount of resources required for each communication device 7 based on the extracted burstiness index.

Figure 2:
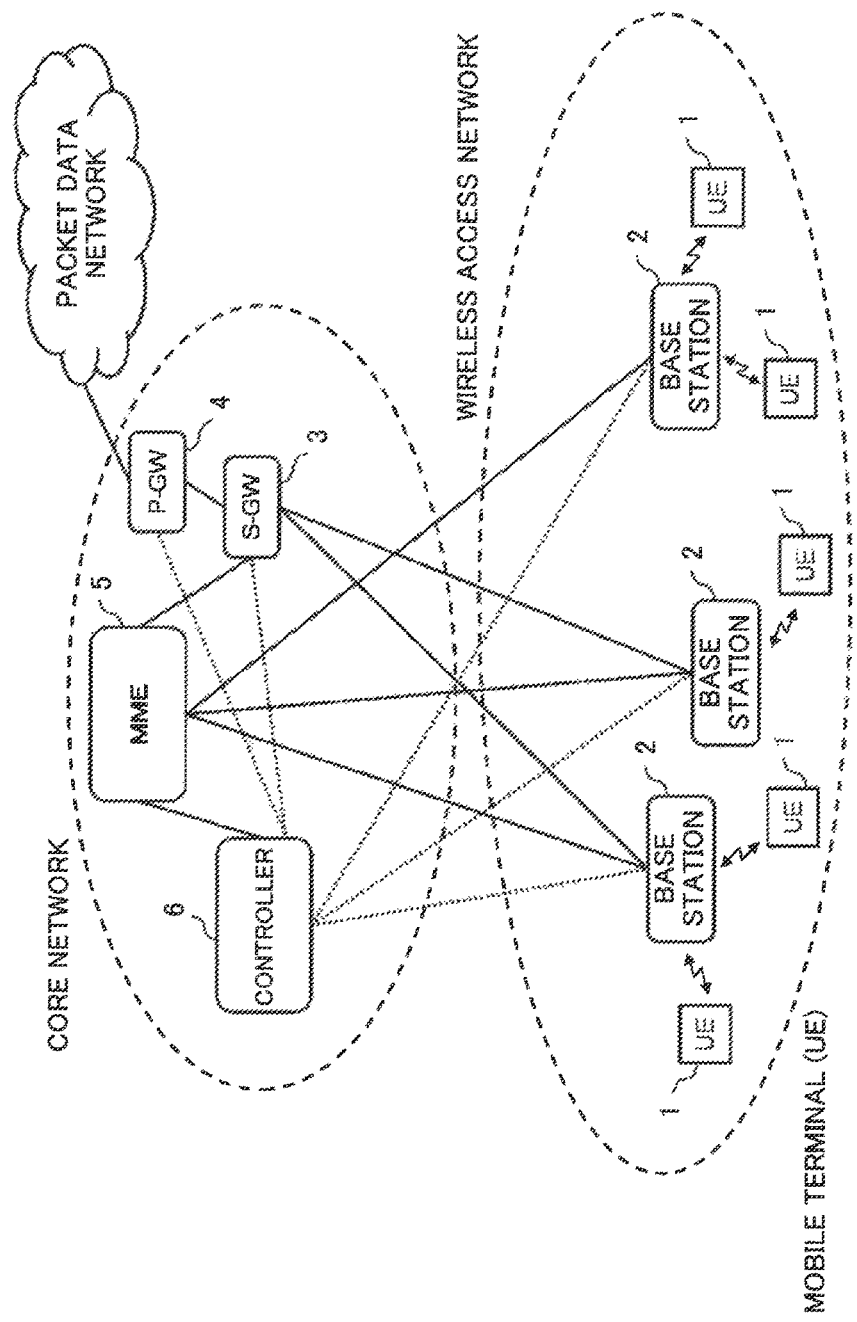
FIG. 2 is another configuration example of the communication system of the first example embodiment.

FIG. 2 is another configuration example of the communication system of the first example embodiment. As illustrated in FIG. 2, the communication system of the first example embodiment includes a plurality of terminals (UE) 1, a plurality of base stations 2, the S-GW 3, the P-GW 4, the MME 5, and the controller 6. The controller 6 may collect traffic from the plurality of base stations 2, the S-GW 3, the P-GW 4, and the MME 5 and extract a traffic feature value, as illustrated in FIG. 2.

Figure 3:
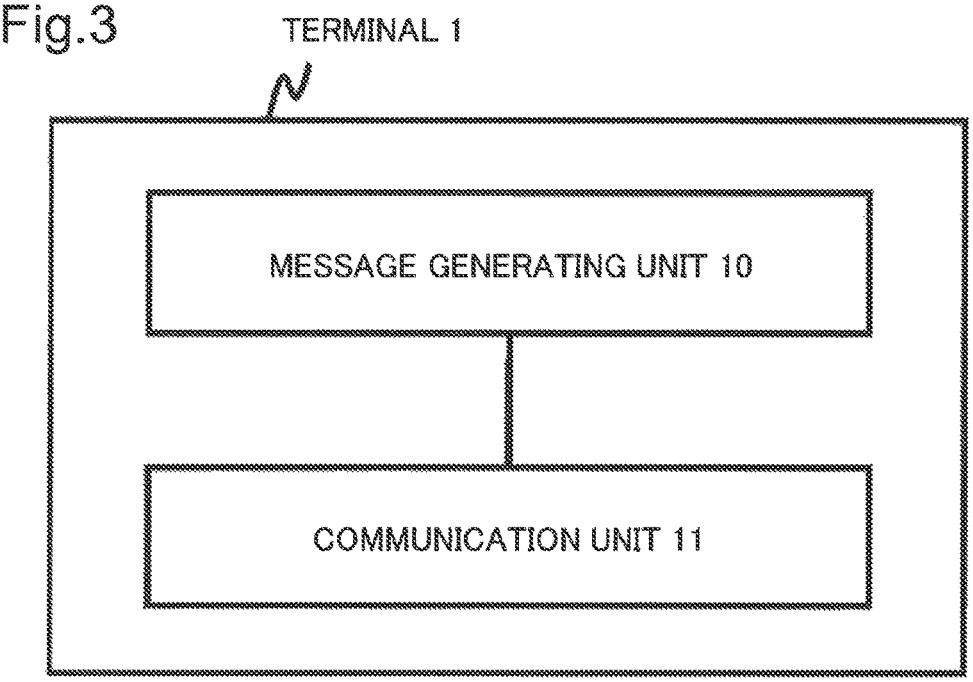
FIG. 3 is a configuration example of a terminal 1 of the first example embodiment.

FIG. 3 illustrates a configuration example of the terminal 1 in the first example embodiment. As exemplified in FIG. 3, the terminal 1 includes, for example, a message generating unit 10 and a communication unit 11. The message generating unit 10 generates a message that the terminal 1 communicates to the base station 2. For example, the message generating unit 10 generates a connection request (for example, an "RRC Connection Request") that is transmitted to the base station 2. The communication unit 11 transmits the generated message to the base station 2.

Figure 4:
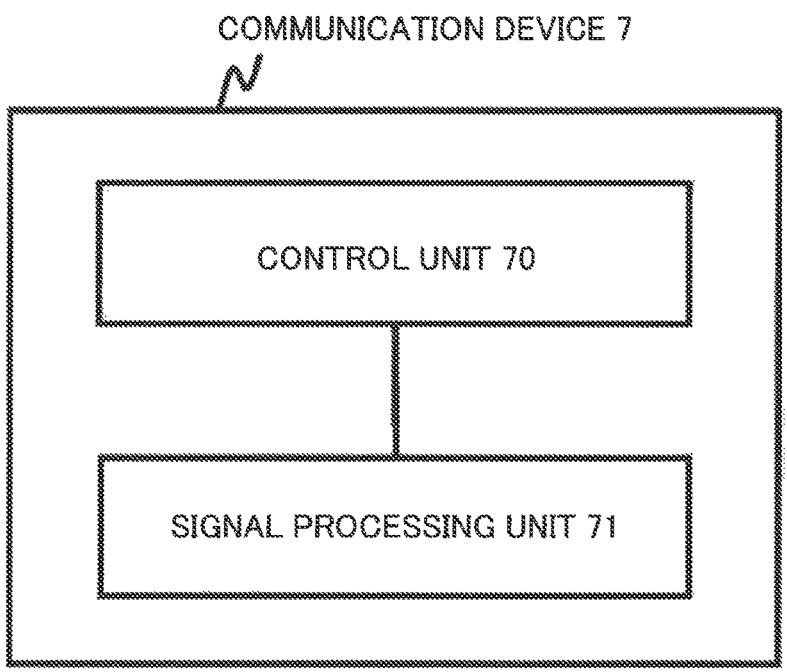
FIG. 4 is a configuration example of a communication device 7 of the first example embodiment.

FIG. 4 illustrates a configuration example of each communication device 7 in the first example embodiment. As exemplified in FIG. 4, each communication device 7 includes a control unit 70 and a signal processing unit 71. Each communication device 7, however, does not always have to include both the control unit 70 and the signal processing unit 71 and may include either one thereof.

The signal processing unit 71 has functions that correspond to what is called U-Plane. The U-Plane contains functions of processing data transmitted in the communication system.

The control unit 70 has functions that correspond to what is called C-Plane. The C-Plane contains functions of processing control signals transmitted in the communication system.

The control unit 70 communicates traffic data to the controller 6. The traffic data may be, for example, traffic data relating to control signal packets that are processed by the C-Plane functions or traffic data relating to user data packets that are processed by the U-Plane functions. The traffic data may be, for example, log information associated with time, an amount of traffic per unit time, and header information relating to control signals that the control unit 70 has transmitted or received, or log information associated with time, an amount of traffic per unit time, and header information relating to user data packets that the signal processing unit 71 has transmitted or received.

In addition, the traffic data may also be acquired at the start and end points of an IP (Internet Protocol) tunnel established between communication devices 7, such as an IP tunnel established between the S-GW 3 and the P-GW 4.

The control unit 70 communicates traffic data to the controller 6, for example, at a predetermined timing. The control unit 70 communicates traffic data to the controller 6, for example, with a predetermined period. The control unit 70 communicates traffic data to the controller 6, for example, in response to a request from the controller 6. The control unit 70 communicates traffic data to the controller 6, for example, in response to a predetermined amount of traffic data having been collected. The control unit 70 communicates traffic data to the controller 6, for example, in response to a request from another communication device 7. The timings at which the control unit 70 communicates traffic data to the controller 6 are, however, not limited to timings in the above examples and may include any timing.

In the present example embodiment, the communication devices 7 that communicate traffic data may be all the communication devices 7 included in the network or some of the communication devices 7.

Figure 5:
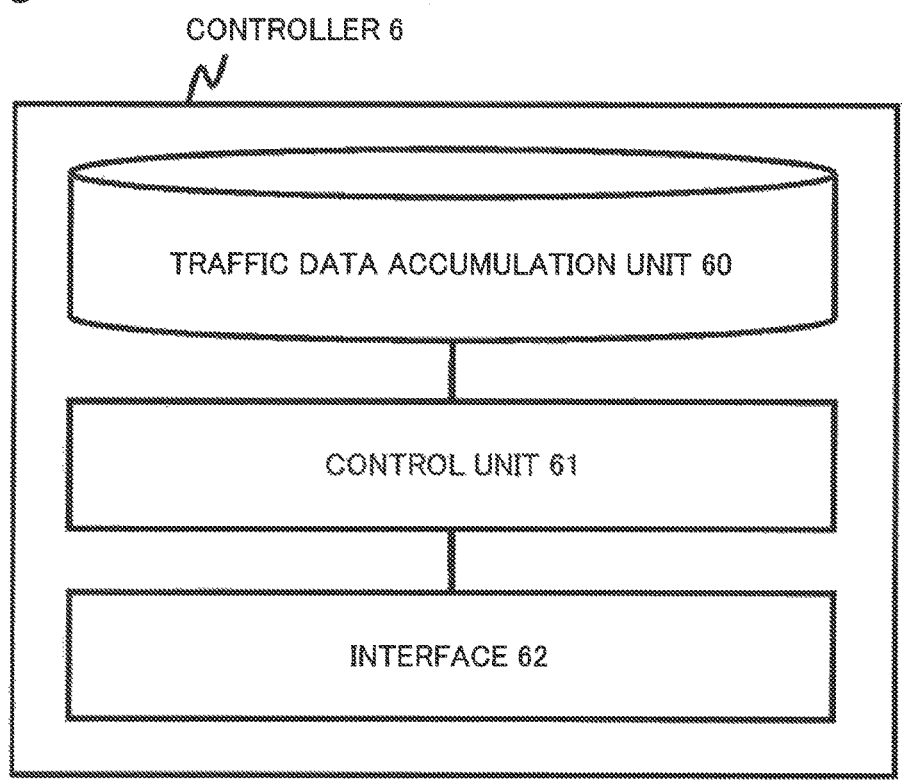
FIG. 5 is a configuration example of a controller 6 of the first example embodiment.

FIG. 5 illustrates a configuration example of the controller 6 in the first example embodiment. As exemplified in FIG. 5, the controller 6 includes, for example, a traffic data accumulation unit 60, a control unit 61, and an interface 62.

The interface 62 is an interface to communicate with the other communication devices 7, including the base station 2, the MME 5, and the like. The controller 6 is capable of communicating with the base station 2 and the MME 5 using a predetermined protocol via the interface 62. For example, the controller 6 collects traffic data from the communication devices 7 via the interface 62.

The traffic data accumulation unit 60 stores, for example, traffic data collected from the communication devices 7. The traffic data accumulation unit 60 may store traffic data collected from the plurality of communication devices 7, for example, with respect to each of the plurality of communication devices 7. The traffic data accumulation unit 60 may store traffic data collected from the communication devices 7, for example, with respect to each collection time of the traffic data.

The control unit 61 extracts a traffic feature value based on the traffic data collected from the communication devices 7. The control unit 61 extracts a traffic feature value, for example, based on the traffic data stored in the traffic data accumulation unit 60. The control unit 61 extracts a traffic feature value, for example, with a predetermined period. The control unit 61 extracts a traffic feature value, for example, at a predetermined time. The timings at which the control unit 61 extracts a traffic feature value are, however, not limited to the above examples and may include any timing, such as extracting a traffic feature value every time when a predetermined amount of traffic data are stored in the traffic data accumulation unit 60.

The control unit 61 calculates an amount of resources of each communication device 7 required for satisfying a predetermined condition based on the extracted traffic feature value. The predetermined condition is, for example, a condition that requires a processing delay in signal processing in each communication device 7 to be not more than a predetermined threshold value (satisfying an acceptable level).

Hereinafter, an example in which the control unit 61 calculates a burstiness index B (synchronization rate, simultaneous arrival rate) of packets that serves as a traffic feature value will be described.

The burstiness index B is an index that indicates a degree to which packets generated within a certain period of time at a plurality of terminals in the communication system arrive simultaneously. The burstiness index B can be calculated by, for example, performing statistical processing on time information of generated packets and information of the number of packets.

The time axis in traffic data is divided by slot width t. It is now assumed that a minimum value of the slot width is denoted by $t_{min}$. The minimum value $t_{min}$ may, for example, be expressed as $t_{min}=1/\mu$ using a server processing rate $\mu$. Furthermore, when the slot width is t in this case, the number m of packets that the server is capable of processing within the period of time equivalent to the slot width t is expressed as $m=t/t_{min}$.

On the other hand, it is assumed that, with respect to divided slots, the number of packets existing in the k-th slot is denoted by $n_k$. The number $n_k$ can be regarded as a burst size in the sense of being equal to the number of packets that arrive simultaneously within a time interval with the slot width t, that is, the number of packets that a server accepts at the same time.

With regard to the above-described number of packets represented by $n_k$, the number of packets denoted by $n_k-m$ indicates the number of packets that the server cannot process within the slot time width t. When it is assumed that $n_k$ that satisfies $n_k-m>0$ is newly denoted by $n_l$ and the number of $n_l$ is p, the mean of the numbers of packets for the slots that satisfy the condition $n_k-m>0$ can be expressed as a function f(t) of the slot width t by the following equation.

$$f(t) = \begin{cases} \dfrac{\sum_{l=1}^{p} (n_l - t/t_{min})}{p} & (p>0) \\ 0 & (p=0) \end{cases} \quad \text{[Equation (1)]}$$

Figure 6:
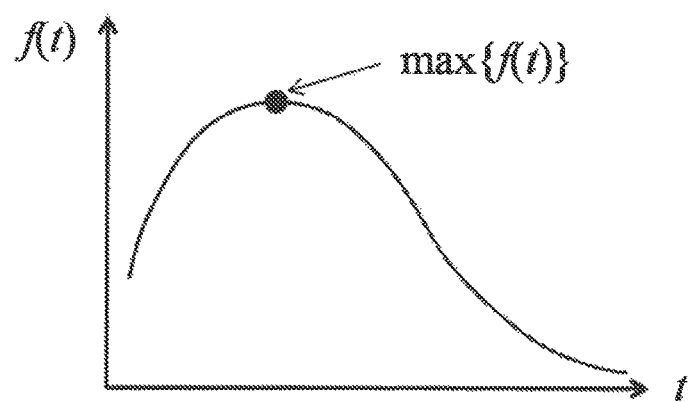
FIG. 6 is a diagram illustrating a situation representing packet arrivals when a simultaneous arrival rate η is 1.

When there is burstiness in the traffic, the function f(t) has a shape as illustrated in FIG. 6 and f(t) takes a maximum value max{f(t)} at a specific slot time width. In addition, when a largest burst size that a network system is expected to have is denoted by N, a burstiness index B, which is a traffic feature value, can be calculated using the following equation.

$$B = \frac{\max_{t}\{f(t)\}}{N} \quad \text{[Equation (2)]}$$

Alternatively, when the mean of arrival time intervals between generated packets is denoted by $\bar{x}$, the variance of the arrival time intervals between the packets is denoted by $\sigma^2$, and a coefficient of variation, which can be calculated from the mean and the variance, is denoted by CV, the burstiness index B can also be calculated using the equation (3) described below.

$$B = \frac{CV}{\sqrt{N}} = \frac{1}{\sqrt{N}} \frac{\sqrt{\sigma^2}}{\bar{x}} \quad \text{[Equation (3)]}$$

The control unit 61 is, for example, able to calculate, as a traffic feature value, the burstiness index B using the equation (2) or (3) based on traffic data collected from the communication devices 7.

Figure 7:
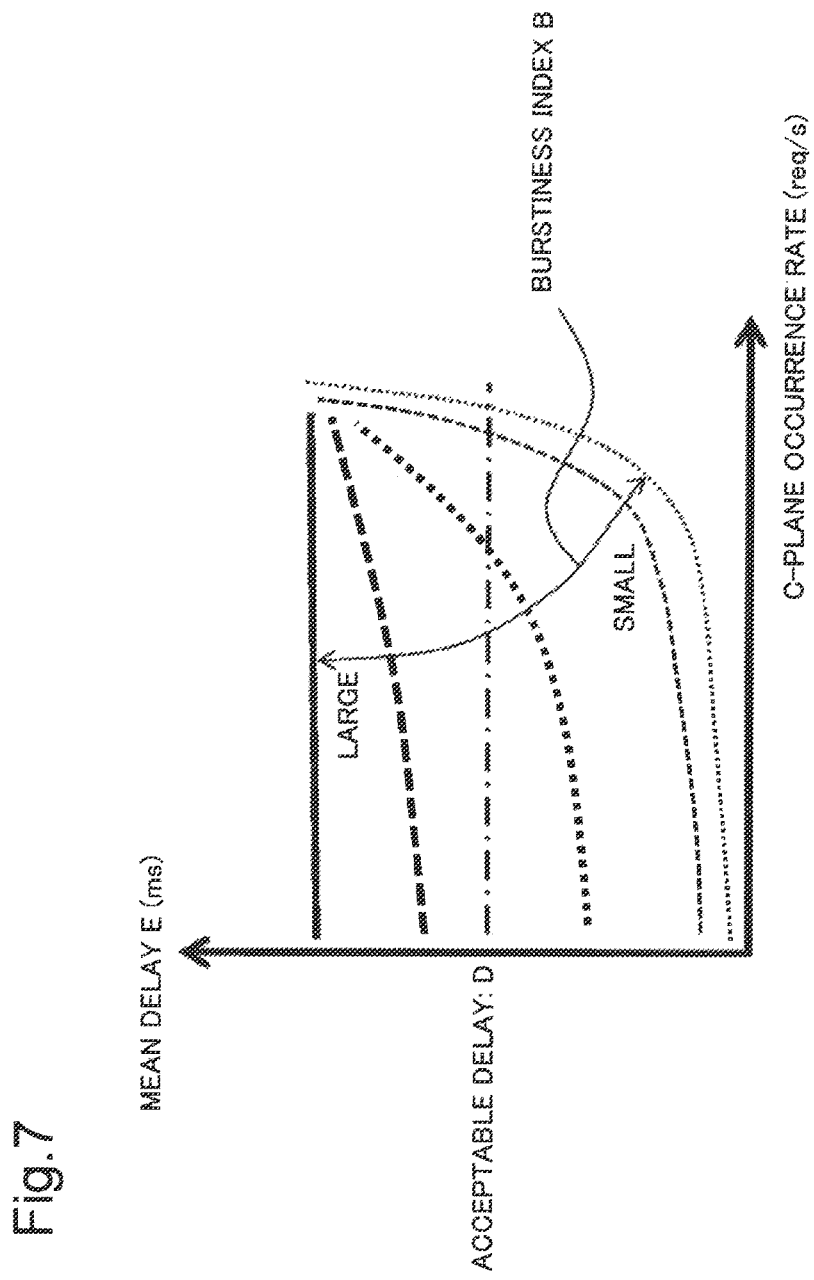
FIG. 7 is a graph illustrating relationships between C-plane occurrence rates and mean delays using the simultaneous arrival rate as a parameter.

FIG. 7 is a graph illustrating relationships between the occurrence rate in the C-Plane and the mean delay using the burstiness index B as a parameter. As illustrated in FIG. 7, the relationship between the packet occurrence rate λc in the C-Plane and the mean delay E varies depending on the burstiness index B. In the above, the mean delay E is a processing delay of the control unit 70 (C-Plane) of each communication device 7 and corresponds to, for example, a processing load on the MME 5.

Therefore, the control unit 61 of the controller 6 is able to determine whether or not the mean delay E of each communication device 7 exceeds an acceptable level D (a predetermined threshold value) on the basis of an extracted burstiness index B and the relationships in FIG. 7. In addition, the control unit 61 calculates an amount of resources of the communication device 7 required for the mean delay E of the communication device 7 to be lower than the acceptable level D (the predetermined threshold value) based on the extracted burstiness index B and the relationships in FIG. 7. The control unit 61, for example, calculates an amount of resources required for the mean delay E in signal processing in the MME 5 to be not more than a predetermined threshold value based on the extracted burstiness index B and the relationships in FIG. 7.

In the first example embodiment, acquiring resources of each communication device 7 based on an amount of resources calculated by the control unit 61 of the controller 6 prevents a processing delay or the like of the communication device 7, which are generated due to characteristics of traffic, such as burstiness or the like.

Figure 8:
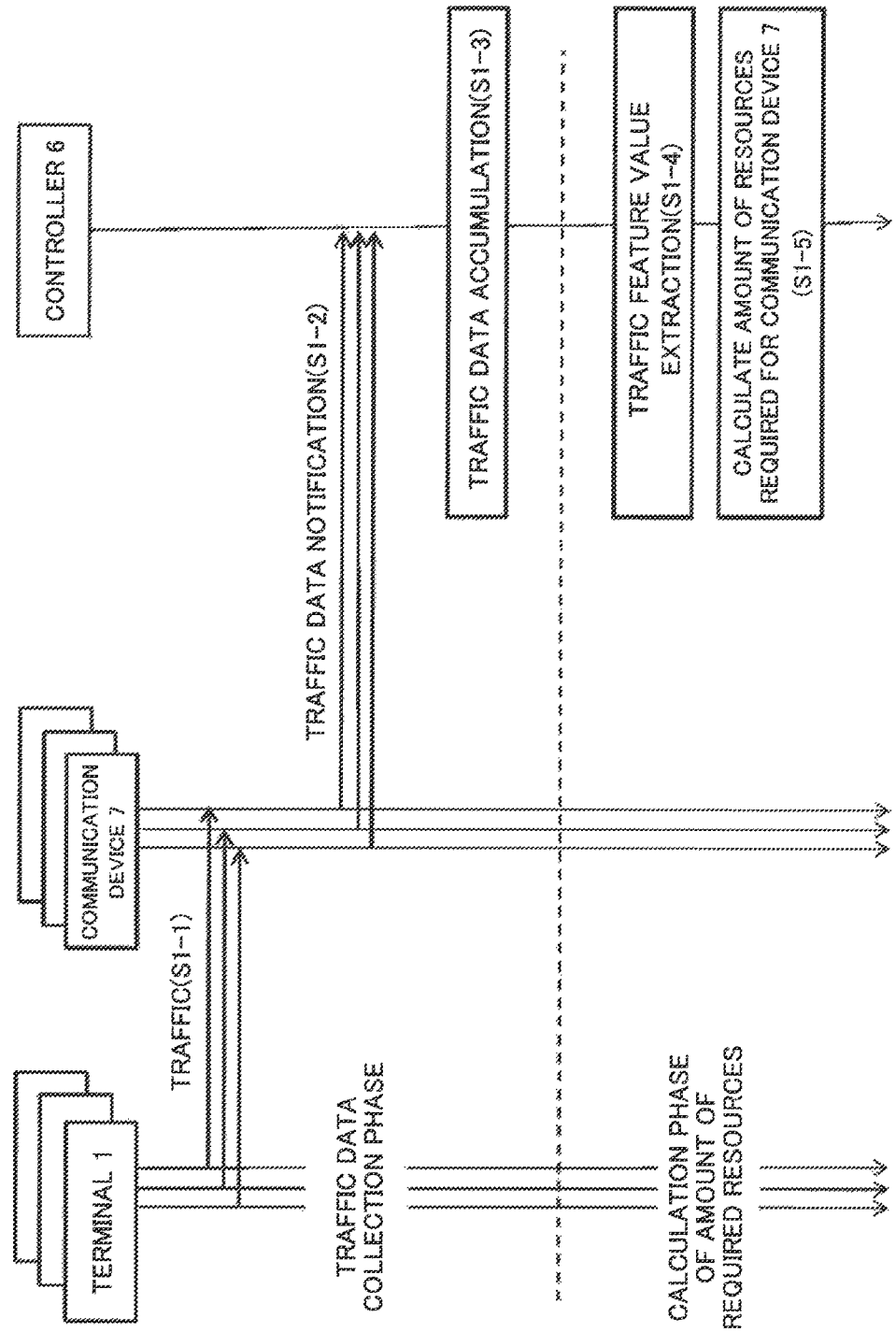
FIG. 8 is a sequence chart illustrating an operation example of the communication system of the first example embodiment.

FIG. 8 is a sequence chart illustrating an operation example of the communication system of the first example embodiment.

The communication unit(s) 11 of the terminal(s) 1 perform(s) communication with the communication devices 7 (traffic in S1-1). The communication unit(s) 11 of the terminal(s) 1, for example, transmit(s) at least one of traffic of control signals and traffic of user data to the communication devices 7.

The control unit 70 of each communication device 7 communicates traffic data, which are information relating to at least one of traffic of control signals and traffic of user data, to the controller 6 (S1-2). The control unit 70 communicates the traffic data to the controller 6, for example, at a predetermined timing.

The control unit 61 of the controller 6 accumulates the communicated traffic data in the traffic data accumulation unit 60 (S1-3).

The control unit 61 of the controller 6 extracts a traffic feature value based on the traffic data accumulated in the traffic data accumulation unit 60 (S1-4). The control unit 61, for example, calculates a burstiness index of packets as a traffic feature value based on the accumulated traffic data, using the equation (2).

The control unit 61 of the controller 6 calculates an amount of resources required for each communication device 7 based on the extracted traffic feature value (S1-5). The control unit 61, for example, calculates an amount of resources of the communication device 7 required for the mean delay E of the communication device 7 to be lower than an acceptable level D (a predetermined threshold value) based on the extracted burstiness index B and the relationships in FIG. 7.

As described above, in the first example embodiment, the controller 6 calculates an amount of resources required for each communication device 7 based on a traffic feature value extracted from traffic data. Thus, in the first example embodiment, acquiring resources of the communication devices 7 based on the calculated amount of resources may enable at least one of preventing, for example, a processing delay or the like of the communication devices 7, which are generated due to characteristics of traffic such as burstiness, and improving the stability of the network.

<Second Example Embodiment>

A second example embodiment of the present invention will be described with reference to the drawings. A technique used in the second example embodiment is applicable to techniques of both the above-described first example embodiment and example embodiments that will be described later.

In the second example embodiment of the present invention, network functions provided by the communication devices 7 of the first example embodiment exemplified in FIGS. 1 and 2 are performed by software such as a virtual machine or the like.

Figure 9:
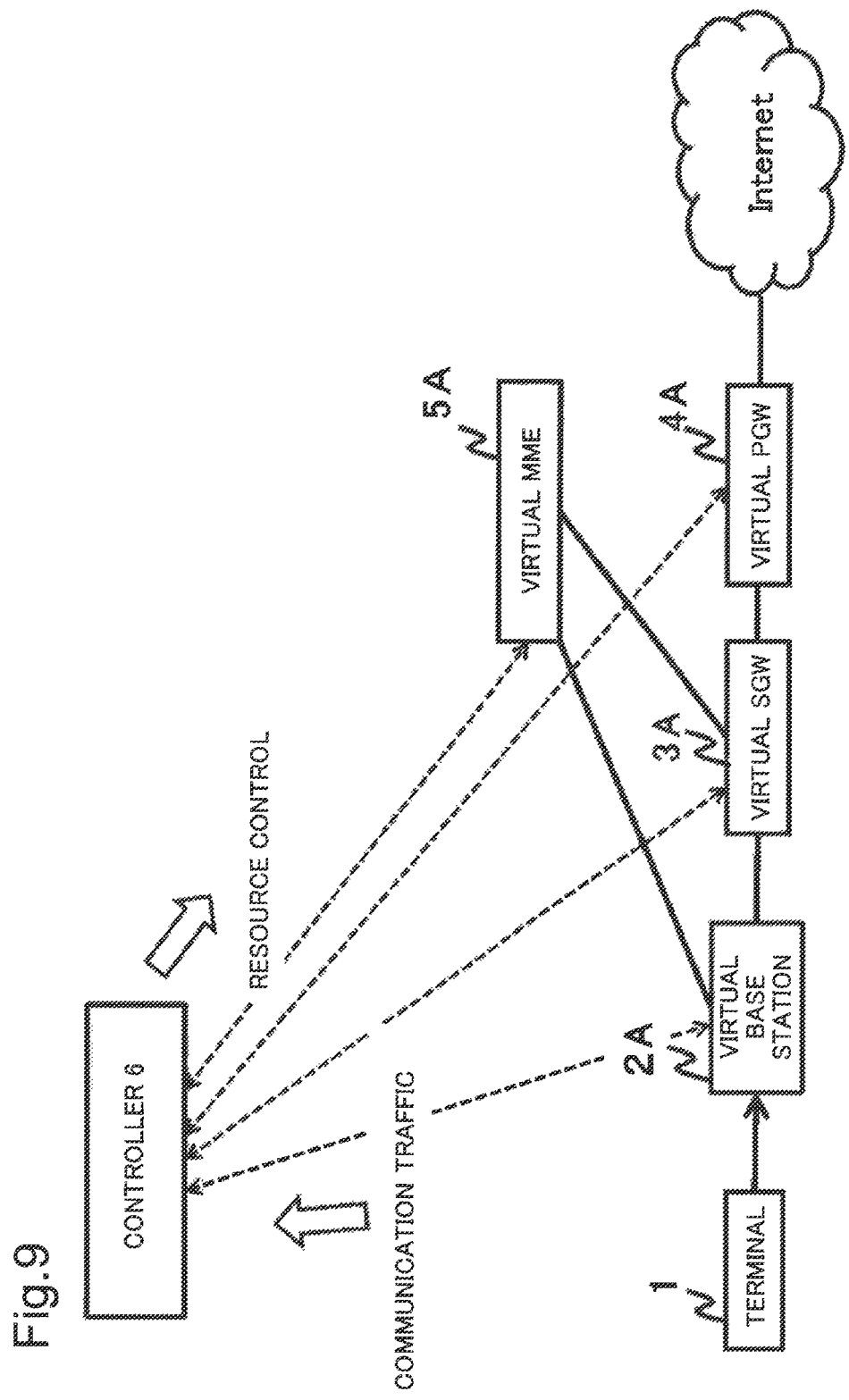
FIG. 9 is a configuration example of a communication system of a second example embodiment.

FIG. 9 is a configuration example of a communication system of the second example embodiment. As exemplified in FIG. 9, in the second example embodiment, network functions relating to signal processing performed by the communication devices 7 are performed as virtual network nodes by software such as a virtual machine or the like. In the above, the virtual network nodes are, for example, a virtual base station (eNB: evolved Node B) 2A, a virtual MME 5A, a virtual SGW 3A, a virtual PGW 4A, and the like. In the description hereinafter set forth, the virtual network nodes are collectively referred to as virtual network nodes 7A. In addition, the virtual network nodes 7A may be arranged at a location in a geographically concentrated manner or at a plurality of locations in a distributed manner.

The network functions performed in virtual machines can be dynamically scaled-out or scaled-in. Therefore, a controller 6 may request a dynamic scale-out or scale-in of the network functions on the basis of an amount of resources calculated based on an extracted traffic feature value. The controller 6, for example, requests a dynamic scale-out or scale-in of the virtual MME 5A based on an amount of resources of the virtual MME 5A that is calculated using an extracted traffic feature value.

Figure 10:
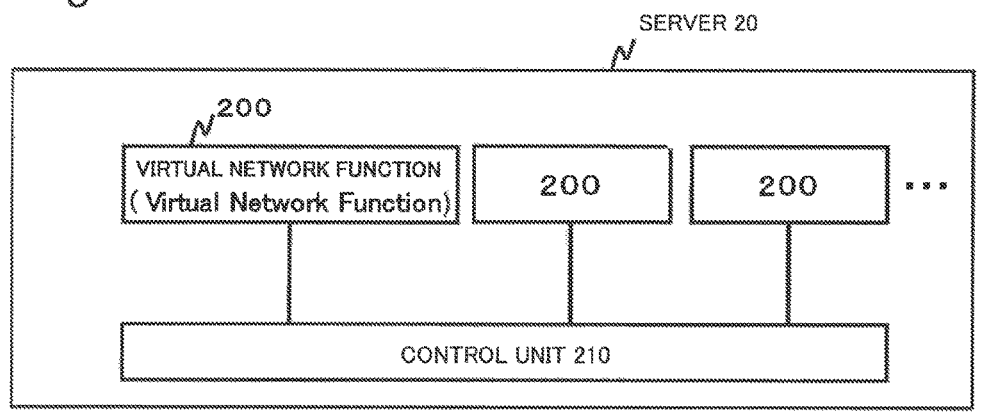
FIG. 10 is a configuration example of a server 20 of the second example embodiment.

FIG. 10 is a configuration example of a server 20 that achieves the virtual network nodes 7A of the second example embodiment. The server 20 includes, for example, a control unit 210 and virtual network functions (VNF: Virtual Network Function) 200. The devices for achieving the virtual network nodes 7A are, however, not limited to the server 20 and may be, for example, a router or the like.

The control unit 210 may operate network functions, which are designed to be performed in the communication devices 7, in virtual machines as the VNFs 200. For example, the VNFs 200 may be operated as virtual communication devices 7 (the virtual network node 7A, including the virtual eNB 2A, the virtual MME 5A, the virtual S-GW 3A, the virtual P-GW 4A, or the like). In the above, the network functions are, for example, functions that the respective network nodes (the base station 2, the S-GW 3, the P-GW 4, and the MME 5) in the example in FIG. 1 have. However, the functions that the control unit 210 is able to operate in virtual machines are not limited to the above examples.

For example, the base station (eNB) 2 may be performed by software such as a virtual machine or the like. The control unit 210 may operate, for example, functions that the base station (eNB) 2 has as a VNF 200 in a virtual machine.

The base station (eNB) 2 may be separated into a function that performs digital baseband signal processing (baseband processing unit: BBU (Base Band Unit)) and a function that performs analog Radio Frequency (RF) signal processing (radio unit: RRH).

The RRH (Remote Radio Head) is in charge of the analog RF signal processing and provides terminals with an air interface. The analog RF signal processing includes D/A conversion, A/D conversion, frequency up-conversion, frequency down-conversion, amplification, or the like.

The BBU is connected to an upper-level network (for example, a backhaul network or a core network of a telecommunication carrier) and performs control and monitoring of radio base stations and the digital baseband signal processing. The digital baseband signal processing includes layer 2 signal processing and layer 1 (physical layer) signal processing. The layer 2 signal processing includes at least one of (i) data compression/restoration, (ii) data encryption, (iii) layer 2 header addition/deletion, (iv) data segmentation/concatenation, and (v) transfer format composition/decomposition through data multiplexing/demultiplexing. In the case of the E-UTRA (Evolved Universal Terrestrial Radio Access) as one of specific examples, the layer 2 signal processing includes processing of the Radio Link Control (RLC) and the Media Access Control (MAC). The physical layer signal processing includes channel coding/decoding, modulation/demodulation, spreading/de-spreading, resource mapping, and generation of OFDM (Orthogonal Frequency-Division Multiplexing) symbol data (baseband OFDM signal) by use of Inverse Fast Fourier Transform (IFFT).

The functions performed by the BBU can be performed by software such as a virtual machine or the like. The control unit 210 is, for example, capable of operating the functions provided by the BBU in a virtual machine as a VNF 200.

The control unit 210 may, for example, be made up of control software, such as a Hypervisor or the like, that is capable of performing virtualization of a computer.

The control unit 210 is capable of transferring received signals to each VNF 200 and making the VNF 200 perform signal processing in accordance with functions that the VNF 200 have. The signals include, for example, communication data (user data packets and the like) that are transmitted and received via a bearer, messages that the network nodes transmit and receive, and the like.

Figure 11:
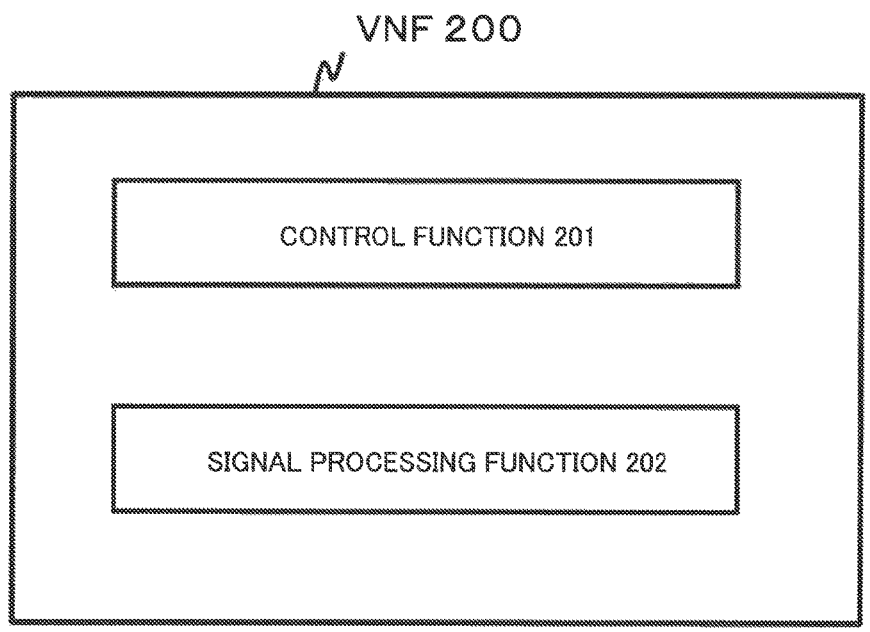
FIG. 11 is a configuration example of a VNF (Virtual Network Function) 200 of the second example embodiment.

FIG. 11 is a configuration example of each VNF 200 of the second example embodiment. Each VNF 200 includes, for example, a control function 201 and a signal processing function 202. The control function 201 and the signal processing function 202 have functions equivalent to those of the control unit 70 and the signal processing unit 71 in each communication device 7, respectively.

The control function 201 includes functions that correspond to what is called C-Plane. The C-Plane contains functions of processing control signals transmitted in the communication system.

The signal processing function 202 includes functions that correspond to what is called U-Plane. The U-Plane contains functions of processing data transmitted in the communication system.

Figure 12:
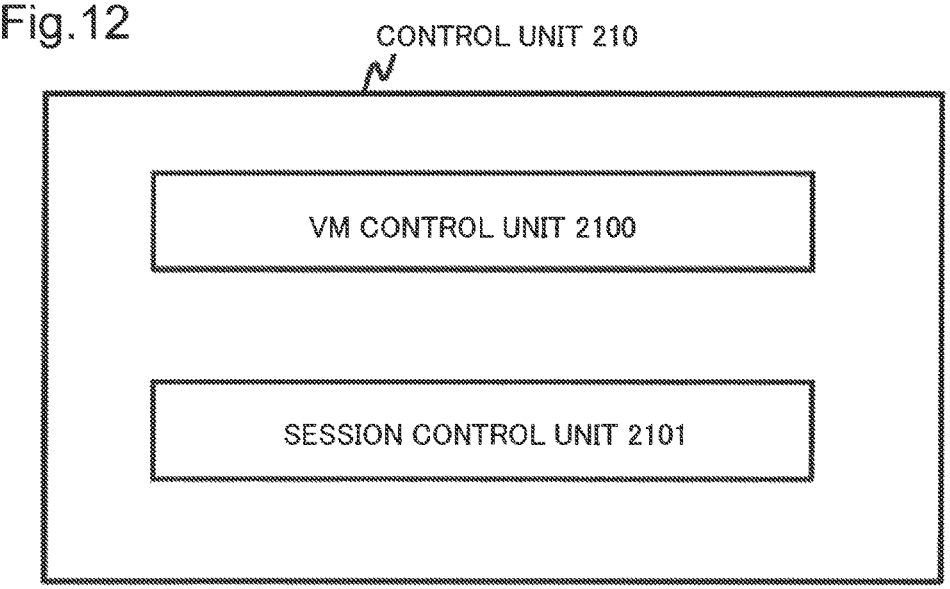
FIG. 12 is a configuration example of a control unit 210 of the second example embodiment.

FIG. 12 is a configuration example of the control unit 210 of the second example embodiment. The control unit 210 includes, for example, a VM (Virtual Machine) control unit 2100 and a session control unit 2101.

The VM control unit 2100 controls virtual machines for operating the VNFs 200 which correspond to signal processing that the network nodes perform. For example, the VM control unit 2100 is capable of performing at least one of start, removal, and stop of the virtual machines. In addition, the VM control unit 2100 is, for example, capable of migrating a virtual machine in operation to another virtual machine.

The VM control unit 2100 controls start, stop, migration, or the like of the virtual machines, for example, in response to a request from the controller 6. For example, the VM control unit 2100 performs start, stop, migration, or the like of the virtual machines dynamically in response to a request from the controller 6. In addition, the VM control unit 2100 is also capable of controlling start, stop, migration, or the like of the virtual machines, for example, depending on the conditions of the communication system. For example, the VM control unit 2100 performs start, stop, migration, or the like of the virtual machines dynamically depending on the amount of communication, congestion status in the communication system, a load on the server 20, and the like or in response to an instruction that the controller 6 has issued on the basis of an amount of resources calculated using a traffic feature value described above.

The session control unit 2101 is capable of transferring received signals to a VNF 200 corresponding to the received signals. In addition, the session control unit 2101 is capable of transferring signals that the VNFs 200 have issued to destinations corresponding to the signals.

Figure 13:
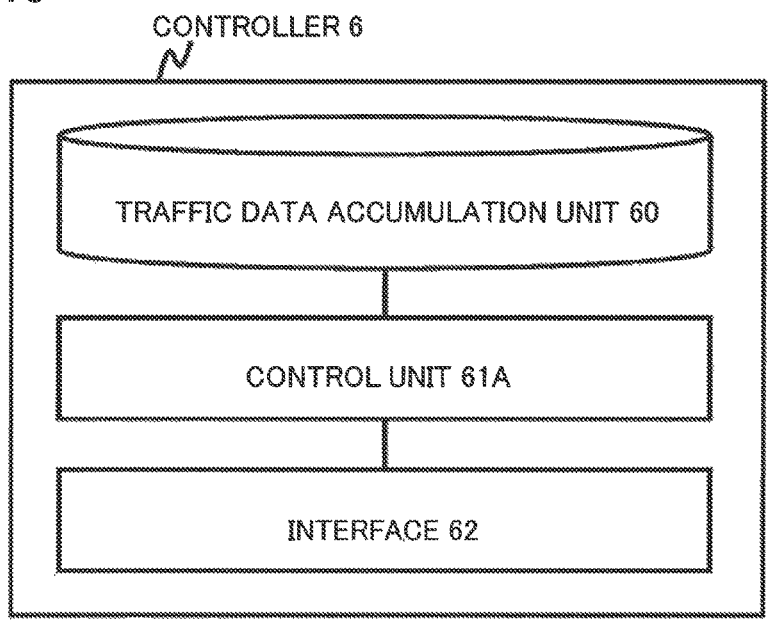
FIG. 13 is a configuration example of a controller 6 of the second example embodiment.

FIG. 13 is a configuration example of the controller 6 of the second example embodiment. In the example in FIG. 13, a control unit 61A of the controller 6 includes a function of performing provisioning of resources in the virtual network in addition to the functions of the control unit 61 of the first example embodiment.

An interface 62 is an interface to communicate with respective devices that correspond to the virtual network nodes 7A. The controller 6 is capable of communicating with the virtual base station 2A and the virtual MME 5A using a predetermined protocol via the interface 62. The controller 6, for example, collects traffic data from the virtual network nodes 7A via the interface 62.

A traffic data accumulation unit 60, for example, stores the traffic data collected from the virtual network nodes 7A.

The control unit 61A extracts a traffic feature value based on the traffic data collected from the virtual network nodes 7A. Since the processing in which the control unit 61A extracts a traffic feature value is the same as that of the control unit 61 exemplified in FIG. 5, a detailed description thereof will be omitted. The control unit 61A calculates an amount of resources of each virtual network node 7A required for satisfying a predetermined condition based on the extracted traffic feature value. The predetermined condition is, for example, a condition that requires a processing delay in signal processing in each virtual network 7A to be not more than a predetermined threshold value (satisfying an acceptable level). Since the processing in which the control unit 61A calculates an amount of resources of each virtual network node 7A is the same as that of the control unit 61 exemplified in FIG. 5, a detailed description thereof will be omitted.

The control unit 61A performs provisioning of resources of each virtual network node 7A. The control unit 61A, for example, requests the server 20 that operates virtual machines to allocate resources to each virtual network node 7A based on the calculated amount of resources. Alternatively, the control unit 61A, for example, requests to allocate resources (server resources, CPU resources, network resources, or the like) to each virtual network node 7A based on the calculated amount of resources. For example, the control unit 61A requests to allocate resources to the virtual MME 5A based on the calculated amount of resources of the virtual MME 5A.

Figure 14:
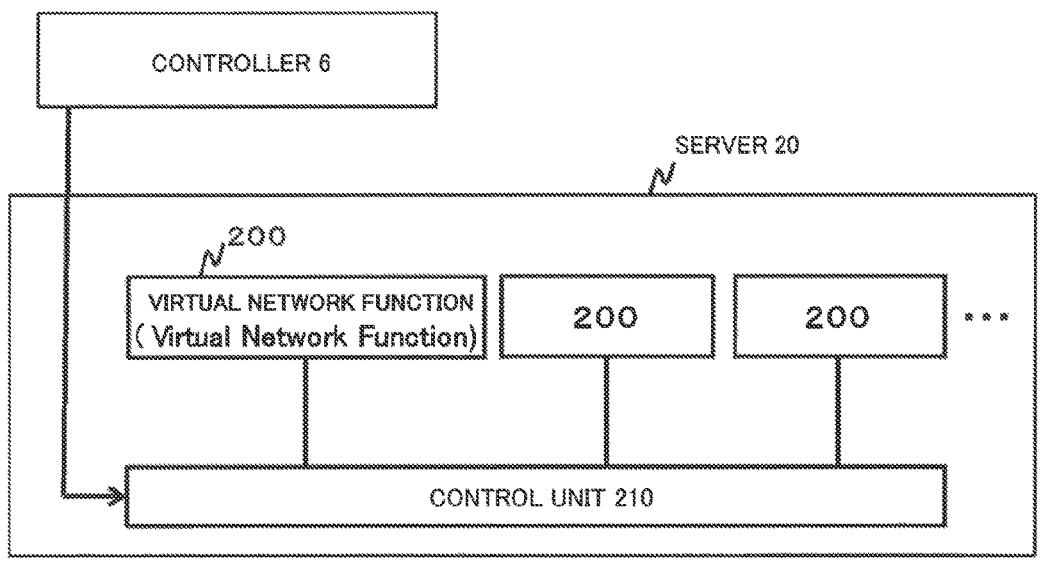
FIG. 14 is a diagram for a description of an operation in which the controller 6 makes the server 20 perform provisioning of resources of virtual network nodes 7A.

FIG. 14 is a diagram for a description of an operation in which the controller 6 makes the server 20 perform provisioning of resources of each virtual network node 7A in the second example embodiment.

As exemplified in FIG. 14, the controller 6 requests the control unit 210 of the server 20 to perform provisioning of resources (server resources, CPU resources, network resources, or the like) of each virtual network node 7A. For example, the control unit 61A requests the server 20 that operates virtual machines to allocate resources to the virtual MME 5A based on a calculated amount of resources of the virtual MME 5A.

The control unit 210 of the server 20 allocates resources to each virtual network node 7A, which is operated in a virtual machine, in response to the request from the control unit 61A of the controller 6. For example, the control unit 210 allocates an amount of resources requested by the control unit 61A to the virtual MME 5A, which is operated in a virtual machine.

Figure 15:
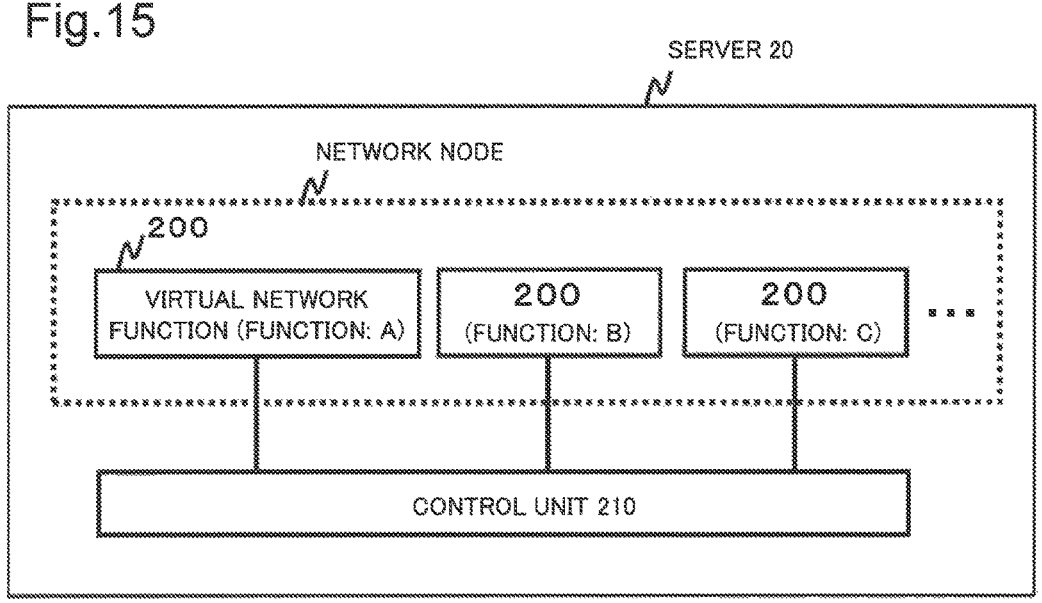
FIG. 15 is another configuration example of the server 20 of the second example embodiment.

FIG. 15 is another configuration example of the server 20 that achieves each virtual network node 7A of the second example embodiment. As exemplified in FIG. 15, the control unit 210 is capable of performing the respective ones of a plurality of sub-functions (for example, functions A, B, and C in FIG. 15) that compose the network functions of each network node exemplified in FIGS. 1 and 2 in a plurality of virtual machines each of which corresponds to one of the sub-functions. The control unit 210 operates virtual machines that perform VNFs 200 each of which corresponds to one of the sub-functions, as exemplified in FIG. 15.

An example of sub-functions corresponding to network functions of each network node will be described below.

The sub-functions of a P-GW include:
functions of processing packets (User-Plane function);
functions of managing charging status based on communication (PCEF: Policy and Charging Enforcement Function);
functions of controlling policies such as a QoS policy (PCRF: Policy and Charging Rule Function); and
lawful interception (LI: Lawful Interception) function for intercepting communication.

The sub-functions of an S-GW include:
functions of processing packets (User-Plane function); and
functions of processing control signaling (C-Plane function).

The sub-functions of an MME include:
functions of processing control signaling (C-Plane function) in cooperation with an HSS (Home Subscriber Server) that manages subscriber information of the communication system, including, for example, setting up and release of sessions for communication, control of handover, or the like.

The sub-functions of a base station (eNB) include:
functions of performing digital baseband signal processing; and
functions of performing analog Radio Frequency (RF) signal processing.

The control unit 210 is capable of operating a virtual machine that performs a VNF 200 with respect to each sub-function described above. The control unit 210 is capable of allocating resources to a virtual machine that performs a VNF 200 with respect to each sub-function described above in response to a request from the controller 6.

Figure 16:
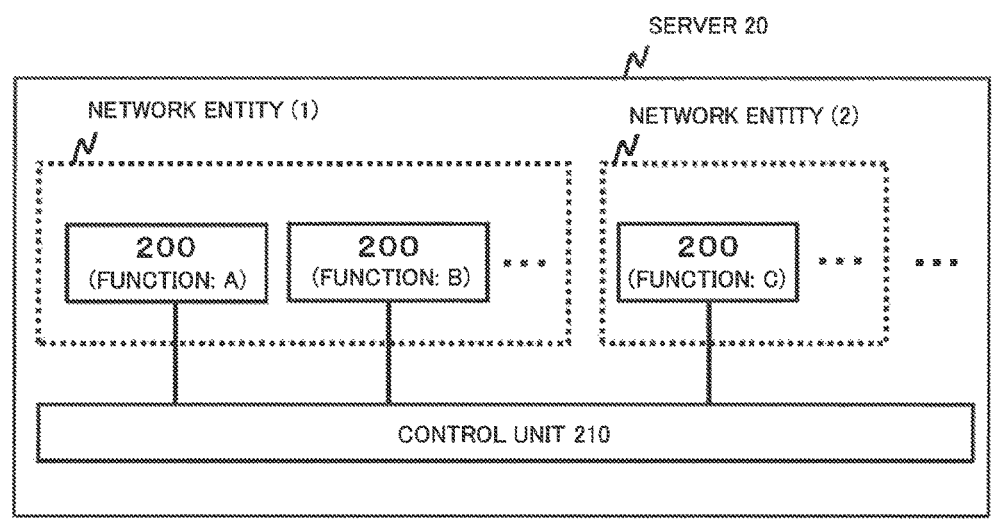
FIG. 16 is still another configuration example of the server 20 of the second example embodiment.

FIG. 16 is another configuration example of the server 20 that achieves the virtual network nodes 7A of the second example embodiment. As exemplified in FIG. 16, the control unit 210 is also capable of operating a plurality of types of network nodes (network entities (1) and (2) in FIG. 16) in virtual machines. The control unit 210 is capable of, with respect to each of the above-described plurality of types of network nodes, allocating resources to virtual machines that run the network node in response to a request from the controller 6.

The VNFs 200 may also be arranged in a separate manner in a plurality of servers 20. For example, in the example in FIG. 15, each of VNFs 200 that correspond to the functions "A" and "B" may be arranged in a server 20(1) and a VNF 200 that corresponds to the function "C" may be arrange in a server 20(2). In this case, the controller 6 requests the control units 210 of the respective servers 20 in which the VNFs 200 are arranged to allocate resources to virtual machines each of which performs one of the VNFs 200.

Figure 17:
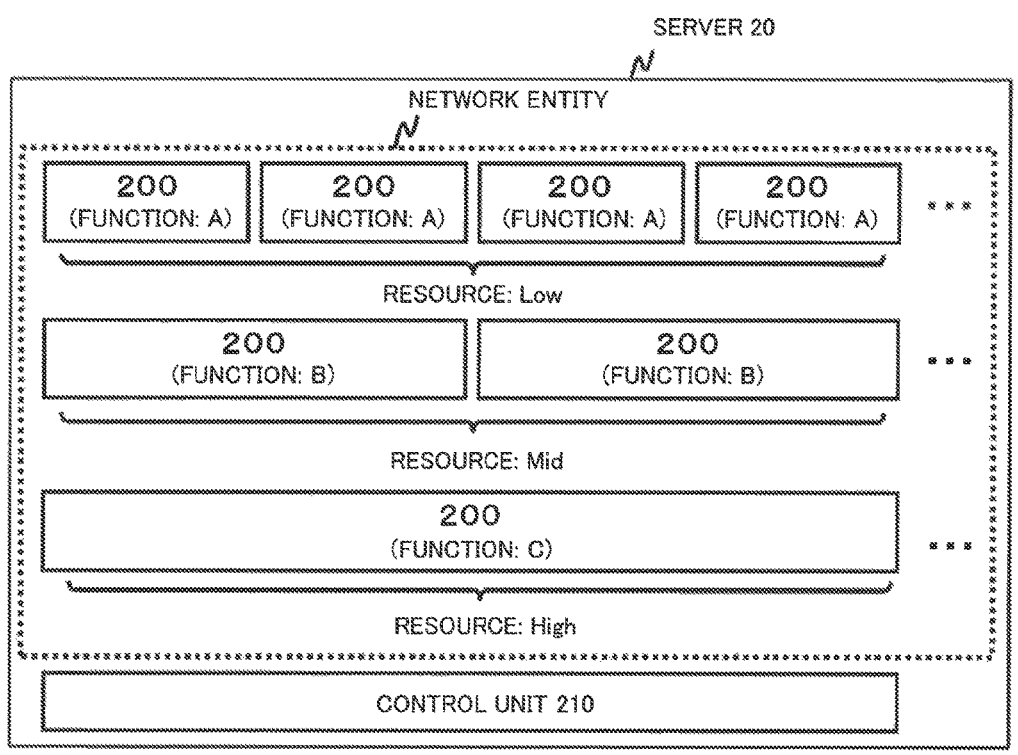
FIG. 17 is still another configuration example of the server 20 of the second example embodiment.

FIG. 17 is another configuration example of the server 20 that achieves the virtual network nodes 7A of the second example embodiment.

The VM control unit 2100 of the control unit 210 is capable of controlling computing resources that are allocated to a virtual machine corresponding to each VNF 200 according to a function that the VNF 200 provides. In the example in FIG. 17, the VM control unit 2100 changes an allocation of computing resources allocated to each VNF 200 according to a function (function "A", "B", or "C" in FIG. 15) that the VNF 200 provides. In the example in FIG. 17, the VM control unit 2100 controls an amount of resources ("Low", "Mid", or "High" in FIG. 17) allocated to each VNF 200 according to the function of the VNF 200.

The communication devices 7 may include a function that is required to manage communication status involving a plurality of state transitions depending on signal processing. For example, the MME 5 includes a function of managing bearer contexts. The bearer context is described in, for example, Section 5.7 of the document (TS23.401 V12.3.0) on a technical specification relating to wireless communication (3GPP: 3rd Generation Partnership Project) or the like. In addition, the P-GW 4 includes, for example, a function of managing charging depending on an amount of communication.

When a VNF 200 manages communication status, the VM control unit 2100 in, for example, migrating the VNF 200 to another virtual machine, migrates the VNF 200 to the another virtual machine in conjunction with the communication status of the VNF 200. As the amount of information of communication status increases, the time required for migrating the communication status becomes long, and the performance of communication services relating to the VNF 200 during migration is expected to be reduced. Therefore, when, for example, a VNF 200 provides a function of managing communication status, deterring execution of scale-out, such as setting up an additional VNF 200 and migrating the VNF 200, enables a reduction in the performance of communication services to be suppressed.

With regard to a VNF 200 that includes a management function of communication status, the VM control unit 2100 may allocate more resources to the VNF 200 than resources to be set based on a request from the controller 6. In other words, by allocating excess resources to VNFs 200, the VM control unit 2100 may suppress a processing delay caused by scale-out, such as setting up an additional VNF, migrating a VNF, or the like, and avoid the above-described reduction in performance. The VM control unit 2100 may also control an amount of resources to be allocated to each VNF 200 on the basis of update frequency of communication status by the VNF 200. For example, the VM control unit 2100 may allocate excess resources to a VNF 200 that provides a function having a high update frequency of communication status (for example, PCEF of the P-GW 4 and the like).

Figure 18:
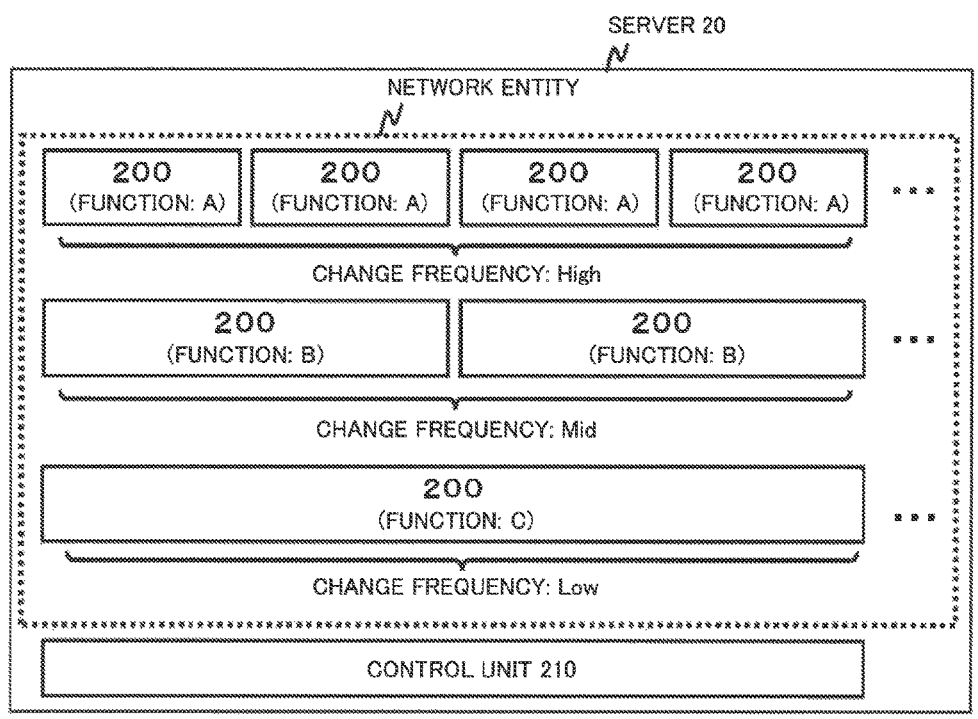
FIG. 18 is still another configuration example of the server 20 of the second example embodiment.

FIG. 18 is another configuration example of the server 20 that achieves the virtual network nodes 7A of the second example embodiment.

In the example in FIG. 18, the VM control unit 2100 is capable of controlling frequency of dynamic scaling (hereinafter, referred to as change frequency), such as setting up an additional VNF 200, migrating a VNF 200, or the like, according to the function of each VNF 200. The additional set-up and migration of a VNF 200 are performed, for example, in response to a request from the controller 6. The VM control unit 2100 controls the change frequency of each VNF by, for example, adjusting a threshold value of the status of a load from performing additional set-up and migration of a VNF 200.

The VM control unit 2100 controls the change frequency of each VNF depending on, for example, the existence or non-existence of a management function of communication status and the update frequency of communication status. For example, when a VNF 200 includes a function (for example, PCEF) that updates communication status frequently, the VM control unit 2100 may lower the change frequency of the VNF 200 to below a change frequency that is set based on a request from the controller 6. In addition, for example, when a VNF 200 includes a function (for example, a U-Plane function) that has a low update frequency of communication status, the VM control unit 2100 may increase the change frequency of the VNF 200 to above a change frequency that is set based on a request from the controller 6. Alternatively, when a VNF 200 includes a function that has a low update frequency of communication status, the VM control unit 2100 may set the change frequency of the VNF 200 to the same level as a change frequency that is set based on a request from the controller 6.

Controlling the change frequency of each VNF as in the example in FIG. 18 suppresses a reduction in performance due to control that involves reconfiguration caused by scale-out of the VNF 200.

Figure 19:
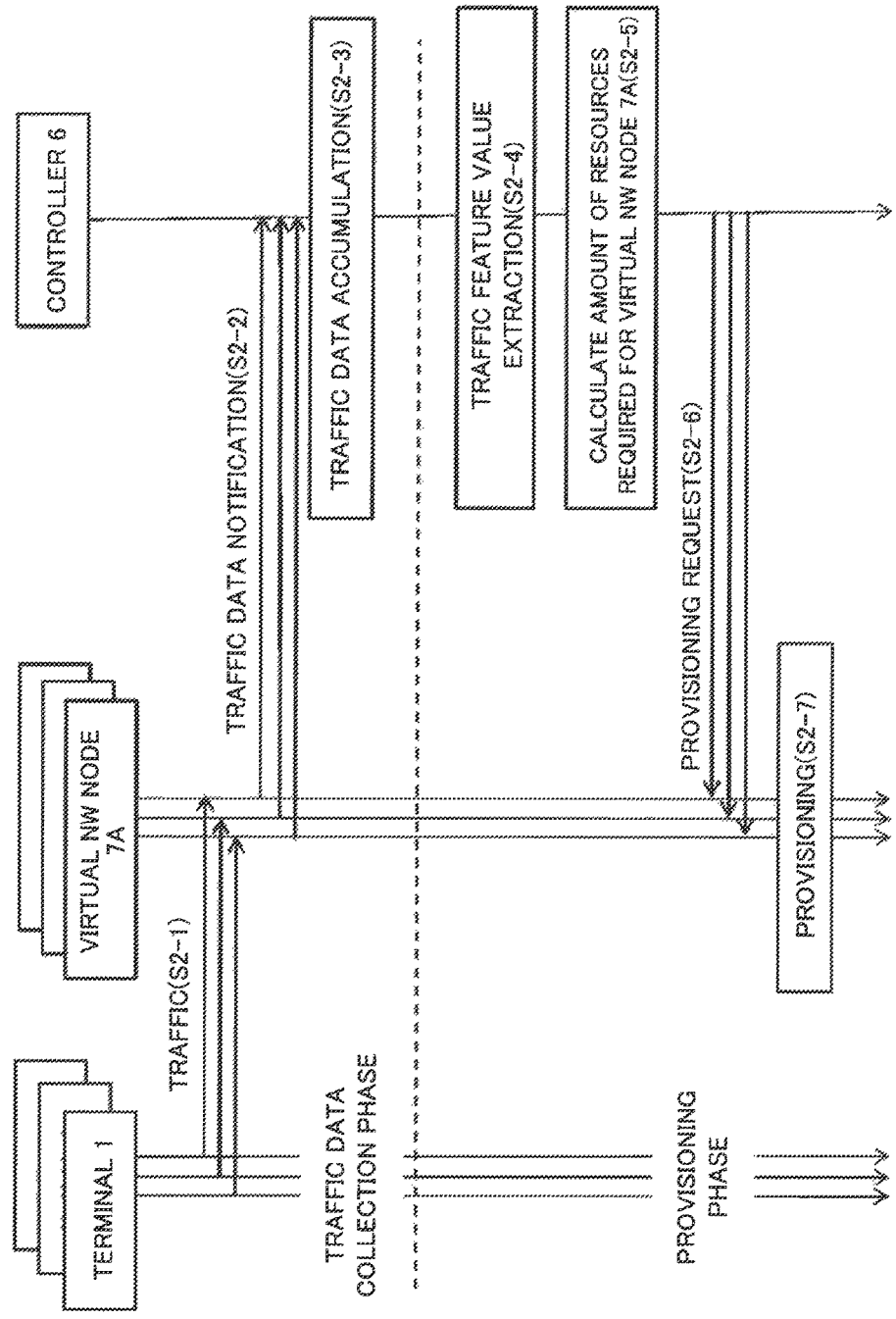
FIG. 19 is a sequence chart illustrating an operation example of the communication system of the second example embodiment.

FIG. 19 is a sequence chart illustrating an operation example of the communication system of the second example embodiment.

The communication unit(s) 11 of the terminal(s) 1 perform(s) communication with the virtual network nodes 7A (traffic in S2-1). The communication unit(s) 11 of the terminal(s) 1, for example, transmit(s) at least one of traffic of control signals and traffic of user data to the virtual network nodes 7A. In addition, each virtual network node 7A may transmit the at least one of traffic of control signals and traffic of user data to another virtual network node 7A. For example, the virtual eNB transmits traffic of control signals to the virtual MME 5A.

The control function 201 of each virtual network node 7A communicates traffic data, which are information relating to the above-described at least one of traffic of control signals and traffic of user data, to the controller 6 (S2-2). The control function 201 communicates the traffic data to the controller 6, for example, with a predetermined period, in response to a request from the controller 6, or at the afore-described predetermined timing, such as a timing at which predetermined traffic data are collected.

The control unit 61A of the controller 6 accumulates the communicated traffic data in the traffic data accumulation unit 60 (S2-3).

The control unit 61A of the controller 6 extracts a traffic feature value based on the traffic data accumulated in the traffic data accumulation unit 60 (S2-4). For example, the control unit 61A calculates a burstiness index of packets as a traffic feature value based on the accumulated traffic data, using the equation (2).

The control unit 61A of the controller 6 calculates an amount of resources required for each virtual network node 7A based on the extracted traffic feature value (S2-5). For example, the control unit 61A calculates an amount of resources of each virtual network node 7A required for the mean delay E of the virtual network node 7A to be lower than an acceptable level D (a predetermined threshold value) based on the extracted burstiness index B and the relationships in FIG. 7.

The control unit 61A of the controller 6 requests the server 20 that operates virtual machines to allocate resources to each virtual network node 7A based on the amount of resources that the control unit 61A has calculated (provisioning request in S2-6). For example, the control unit 61A requests the server 20 to allocate resources to the virtual MME 5A based on an amount of resources of the virtual MME 5A that the control unit 61A has calculated.

In response to the request from the controller 6, the control unit 210 of the server 20 allocates an amount of resources, based on the request, to each virtual network node 7A (provisioning in S2-7). For example, in response to a request from the controller 6, the control unit 210 allocates an amount of resources, based on the request, to the virtual MME 5A.

As described above, in the second example embodiment, the controller 6 calculates an amount of resources required for each virtual network node 7A based on a traffic feature value extracted from traffic data and requests the server 20 that operates virtual machines to allocate the amount of resources. The server 20 allocates the requested amount of resources to each virtual network node 7A. Therefore, in the second example embodiment, it may become possible to perform provisioning of the virtual network nodes 7A on the basis of the calculated amount of resources, which may enable at least one of preventing, for example, performance degradation, such as an increase in a processing delay of the virtual network nodes 7A, which is generated due to characteristics of traffic such as burstiness or the like, and improving the stability of the network.

<Third Example Embodiment>

A third example embodiment of the present invention will be described with reference to the drawings. A technique used in the third example embodiment is applicable to techniques of both the above-described respective example embodiments and example embodiments that will be described later.

In the third example embodiment of the present invention, a controller 6 performs provisioning of a virtual MME 5A based on a traffic feature value extracted from collected traffic.

Performance characteristics of an MME are influenced by a burstiness index of communication traffic (a simultaneous arrival rate of packets). Therefore, when the resources of the MME are determined without consideration of a traffic feature value, there is a possibility that the performance characteristics of the MME become unstable for traffic having burstiness.

Thus, in the third example embodiment of the present invention, the controller 6 performing provisioning of the virtual MME 5A based on an amount of resources calculated by use of an extracted traffic feature value reduces the possibility of the performance characteristics of the virtual MME 5A becoming unstable.

Figure 20:
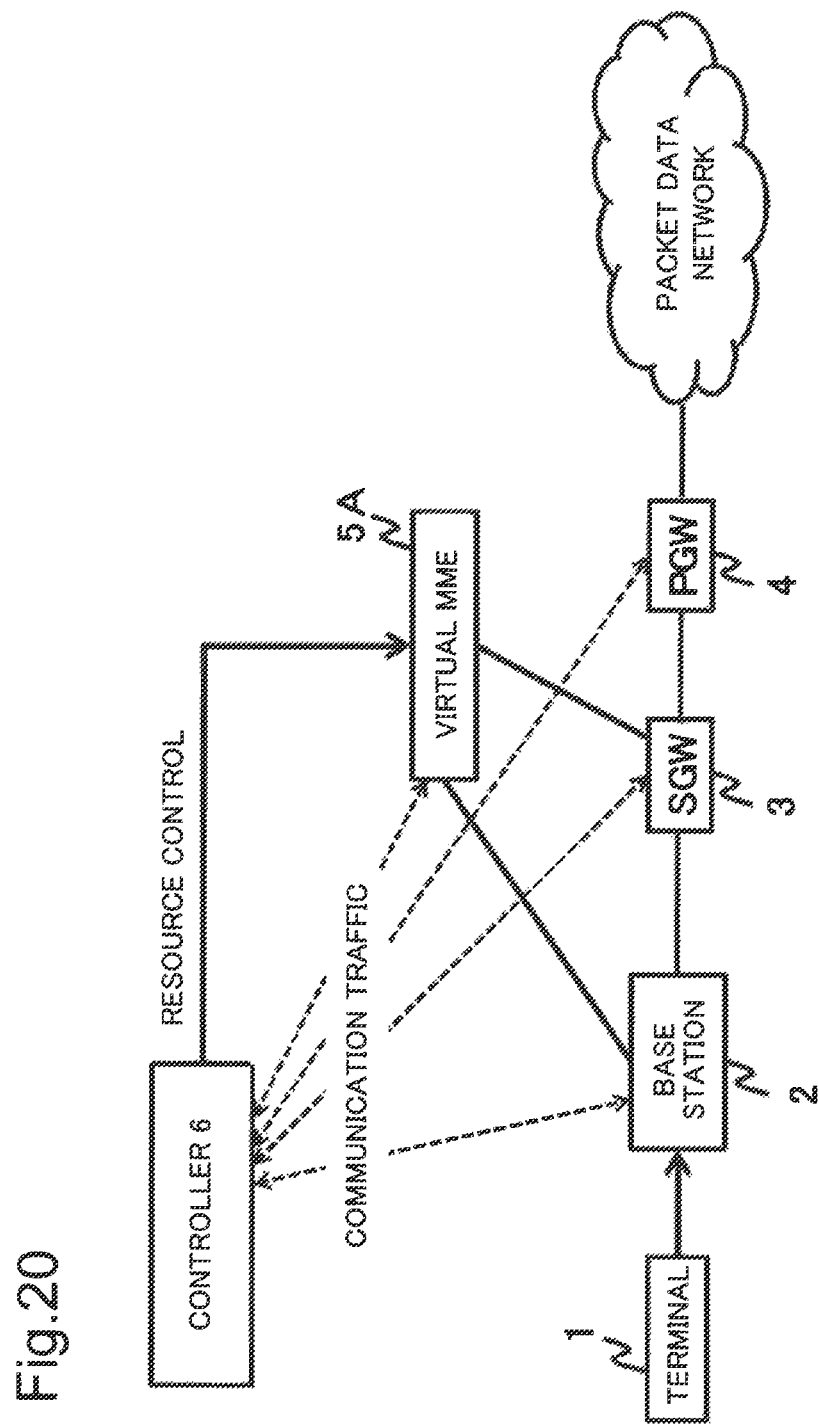
FIG. 20 is a configuration example of a communication system of a third example embodiment.

FIG. 20 is a configuration example of a communication system of the third example embodiment. As exemplified in FIG. 20, in the third example embodiment, network functions relating to signal processing that is performed by an MME 5 are performed by software such as a virtual machine or the like as the virtual MME 5A.

Network functions that are performed in virtual machines can be dynamically scaled-out or scaled-in. Thus, the controller 6 extracts a traffic feature value from traffic collected from any or all of communication devices 7B (a base station 2, an S-GW 3, a P-GW 4, and the like) and the virtual MME 5A. Subsequently, the controller 6 is able to request dynamic scale-out or scale-in of the virtual MME 5A on the basis of an amount of resources calculated from the extracted traffic feature value.

Figure 21:
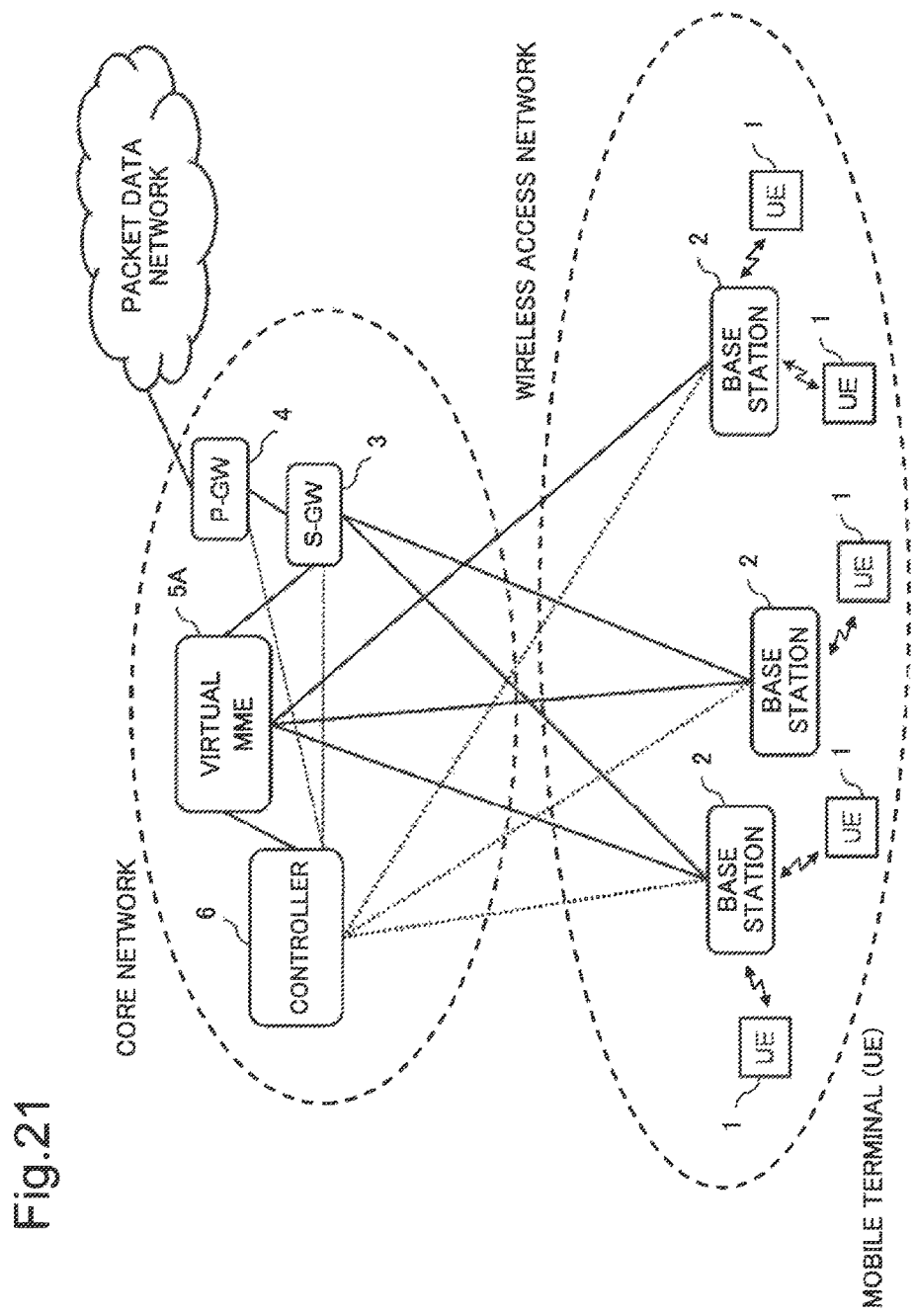
FIG. 21 is another configuration example of the communication system of the third example embodiment.

FIG. 21 is another configuration example of the communication system of the third example embodiment. As exemplified in FIG. 21, the communication system of the third example embodiment includes a plurality of terminals (UE) 1, a plurality of base stations 2, the S-GW 3, the P-GW 4, the virtual MME 5A, and the controller 6.

The controller 6 may collect traffic data from the plurality of base stations 2, the S-GW 3, the P-GW 4, and the virtual MME 5A and extract a traffic feature value, as illustrated in FIG. 21. On the basis of an amount of resources of the virtual MME 5A that is calculated from the extracted traffic feature value, the controller 6 controls the amount of resources of the virtual MME 5A.

The controller 6 may collect traffic data of control signals processed by the virtual MME 5A from the virtual MME 5A to extract a traffic feature value. The controller 6 may control the amount of resources of the virtual MME 5A based on an amount of resources of the virtual MME 5A calculated from the extracted traffic feature value. In the above, the control signals processed by the virtual MME 5A are, for example, control signals (messages) that the terminals 1 transmit in order to connect to the network.

Figure 22:
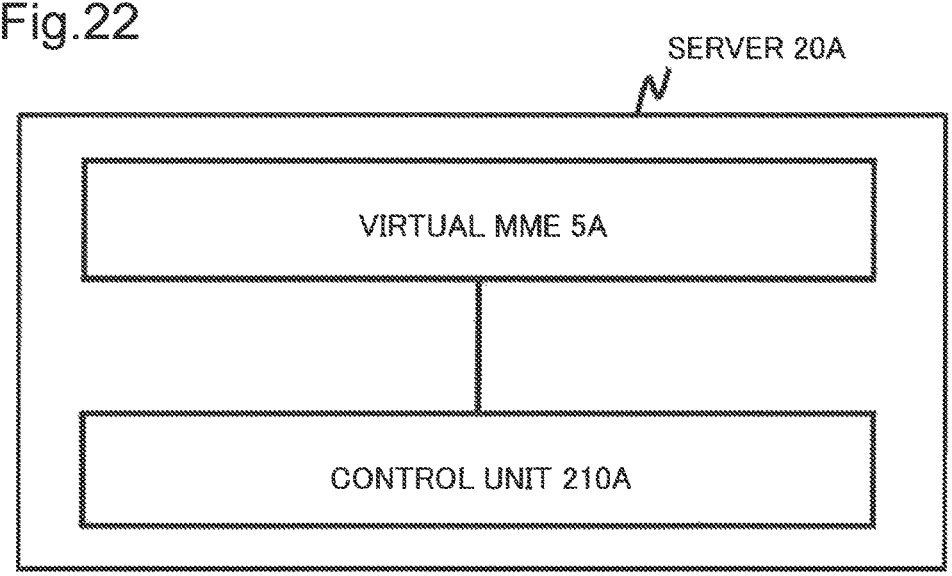
FIG. 22 is a configuration example of a server 20A that achieves a virtual MME (Mobility Management Entity) 5A of the third example embodiment.

FIG. 22 is a configuration example of a server 20A that achieves the virtual MME 5A of the third example embodiment. The server 20A includes, for example, a control unit 210A and the virtual MME 5A. In this case, the server 20A, which achieves the virtual MME 5A, may have the same configuration as that of the server 20 illustrated in each of FIGS. 10 and 15 to 18.

The control unit 210A has functions that are equivalent to those of the control unit 210 of the server 20 exemplified in FIG. 10. In addition, the virtual MME 5A has functions that are equivalent to functions of a VNF 200 exemplified in FIG. 10 when the VNF 200 operates as the virtual MME 5. The devices that achieve the virtual MME 5A are, however, not limited to the server 20A and may be, for example, a router, a switch, or the like.

The control unit 210A is capable of operating network functions performed by the MME 5 in a virtual machine as the virtual MME 5A. For example, the virtual MME 5A can be run by software such as a virtual machine or the like. The control unit 210A may, for example, be made up of control software, such as a Hypervisor or the like, that is capable of performing virtualization of a computer.

The control unit 210A is capable of making the virtual MME 5A perform processing of control signaling, which includes setting up and release of sessions for communication, control of handover, or the like. For example, the control unit 210A is capable of making the virtual MME 5A perform processing of control signals (messages) that the terminals 1 transmit in order to connect to the network.

Since a configuration example of the control unit 210A is the same as that of the control unit 210 exemplified in FIG. 12 in the second example embodiment, a detailed description thereof will be omitted.

Figure 23:
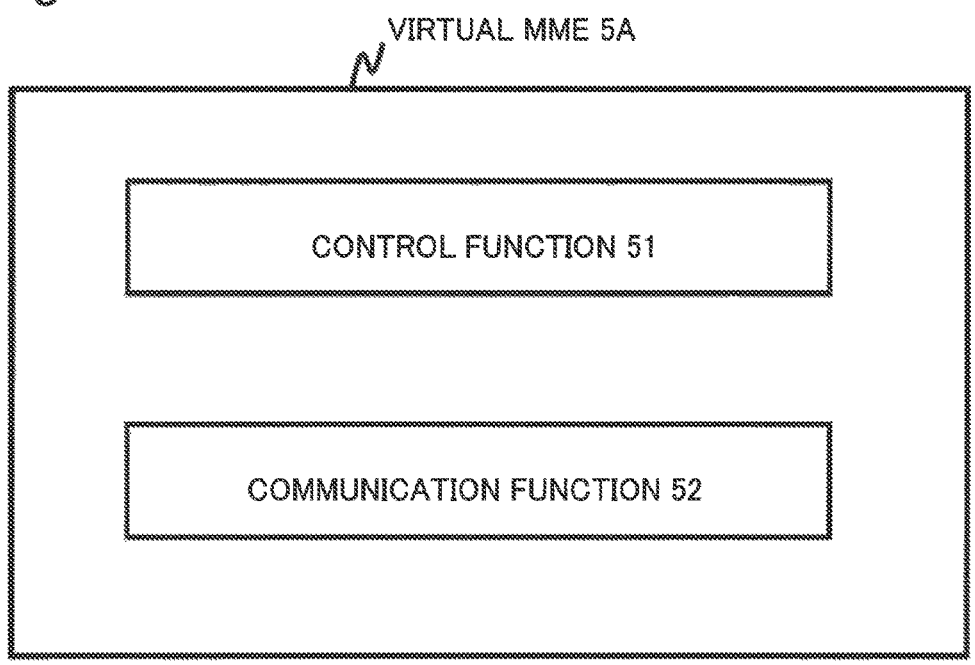
FIG. 23 is a configuration example of the virtual MME 5A of the third example embodiment.

FIG. 23 is a configuration example of the virtual MME 5A of the third example embodiment. The virtual MME 5A includes, for example, a control function 51 and a communication function 52.

The control function 51 has functions that correspond to the C-Plane. The C-Plane contains functions of processing control signaling, such as setting up and release of sessions for communication, control of handover, or the like. The control function 51 transmits and receives such control signaling via the communication function 52.

Figure 24:
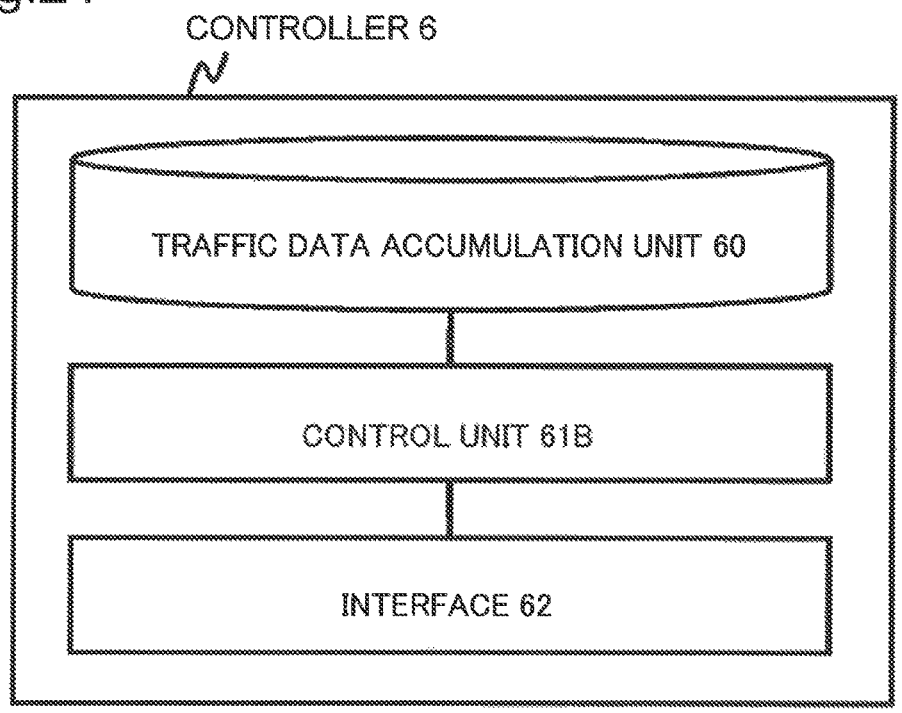
FIG. 24 is a configuration example of a controller 6 of the third example embodiment.

FIG. 24 is a configuration example of the controller 6 of the third example embodiment. In the example in FIG. 24, a control unit 61B of the controller 6 includes a function of performing provisioning of resources of the virtual MME 5A.

An interface 62 is an interface to communicate with the respective ones of the communication devices 7B (the base station 2, the S-GW 3, and the P-GW 4) and the virtual MME 5A in FIG. 20. The controller 6 is capable of communicating with the communication devices 7B and the virtual MME 5A using a predetermined protocol via the interface 62. The controller 6, for example, collects traffic data from the communication devices 7B and the virtual MME 5A via the interface 62.

A traffic data accumulation unit 60, for example, stores the traffic data that are collected from the communication devices 7B and the virtual MME 5A.

The control unit 61B extracts a traffic feature value based on the traffic data collected from the communication devices 7B and the virtual MME 5A. Since the processing in which the control unit 61B extracts a traffic feature value is the same as that of the control unit 61 exemplified in FIG. 5, a detailed description thereof will be omitted. The control unit 61B calculates an amount of resources of the virtual MME 5A required for satisfying a predetermined condition based on the extracted traffic feature value. The predetermined condition is, for example, a condition that requires a processing delay in signal processing in the virtual MME 5A to be not more than a predetermined threshold value (satisfying an acceptable level). Since the processing in which the control unit 61B calculates an amount of resources of the virtual MME 5A is the same as that of the control unit 61 exemplified in FIG. 5, a detailed description thereof will be omitted.

The control unit 61B performs provisioning of resources of the virtual MME 5A. The control unit 61B, for example, requests the server 20 that operates the virtual MME 5A to allocate resources to the virtual MME 5A based on the calculated amount of resources. The control unit 61B, for example, requests to allocate resources (server resources, CPU resources, network resources, or the like) to the virtual MME 5A based on the calculated amount of resources.

Since a configuration example of the communication devices 7B is the same as that of the communication devices 7 exemplified in FIG. 4 in the first example embodiment, a detailed description thereof will be omitted.

Figure 25:
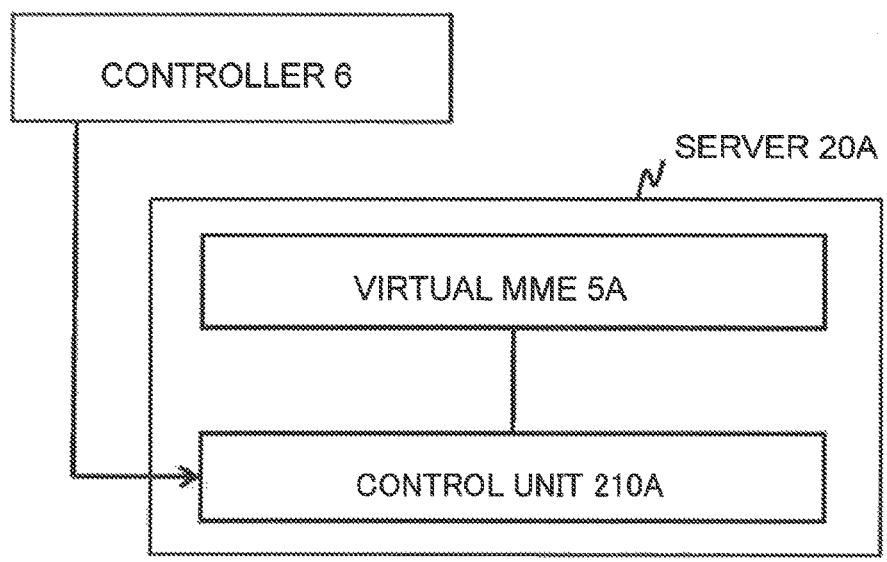
FIG. 25 is a diagram for a description of an operation in which the controller 6 makes the server 20A perform provisioning of resources of the virtual MME 5A in the third example embodiment.

FIG. 25 is a diagram for a description of an operation in which the controller 6 makes the server 20A perform provisioning of resources of the virtual MME 5A in the third example embodiment.

As exemplified in FIG. 25, the controller 6 requests the control unit 210A of the server 20A to perform provisioning of resources (server resources, CPU resources, network resources, or the like) of the virtual MME 5A. The control unit 61B of the controller 6, for example, requests the server 20 that operates virtual machines to allocate resources to a virtual network node 7A based on a calculated amount of resources. For example, the control unit 61B requests the server 20A that operates virtual machines to allocate resources to the virtual MME 5A based on a calculated amount of resources of the virtual MME 5A.

The control unit 210A of the server 20A allocates resources to the virtual MME 5A that is operated in a virtual machine in response to the request from the control unit 61B of the controller 6.

Figure 26:
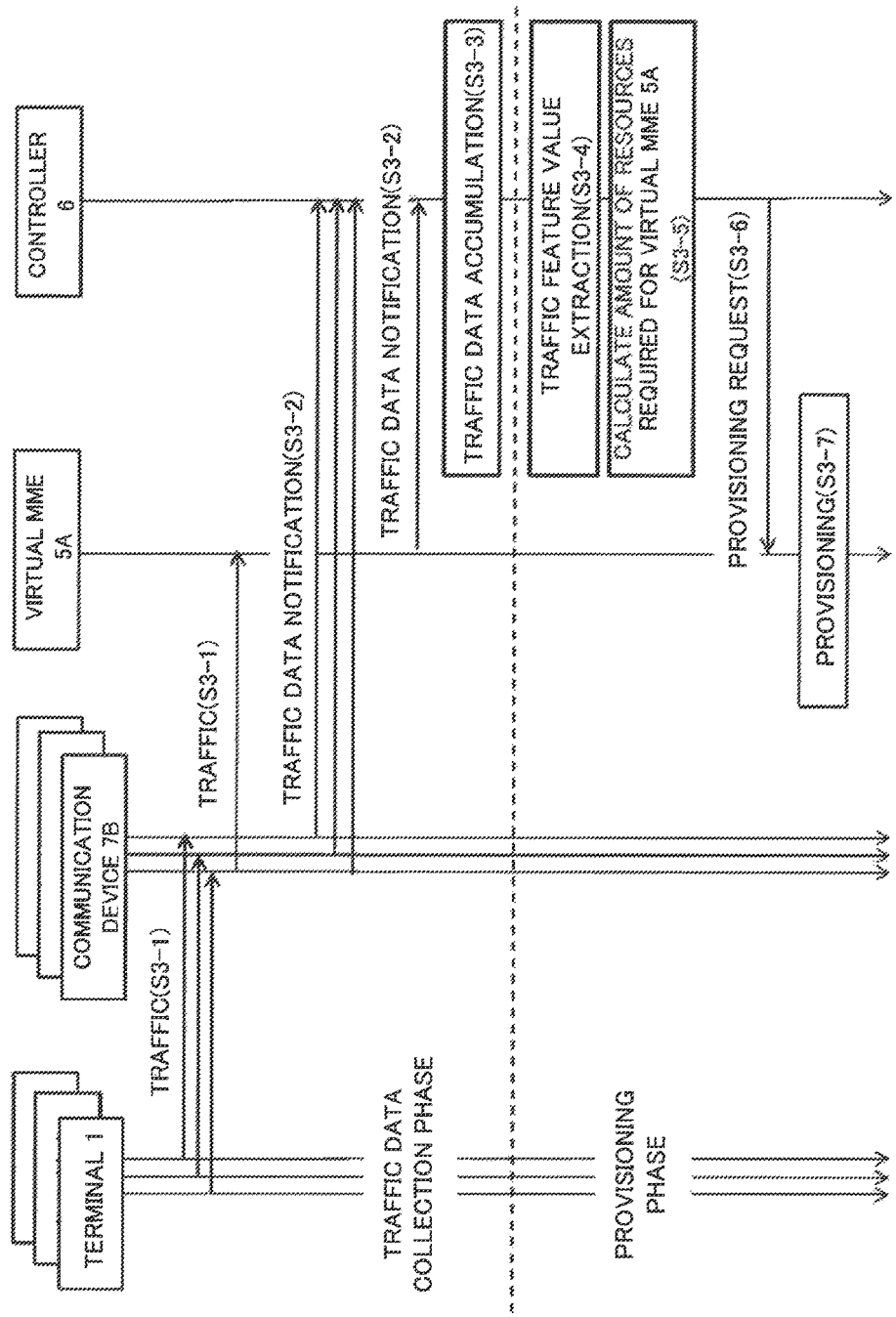
FIG. 26 is a sequence chart illustrating an operation example of the communication system of the third example embodiment.

FIG. 26 is a sequence chart illustrating an operation example of the communication system of the third example embodiment.

The communication unit(s) 11 of the terminal(s) 1 perform(s) communication with the communication devices 7B (traffic in S3-1). The communication unit(s) 11 of the terminal(s) 1, for example, transmit(s) at least one of traffic of control signals and traffic of user data to the communication devices 7B. In addition, the communication devices 7B transmit control signals that the terminal(s) has/have transmitted in order to connect to the network to the virtual MME 5A (traffic in S3-1).

The control unit 70 of each communication device 7B and the control function 51 of the virtual MME 5A communicate traffic data to the controller 6 (S3-2). The control unit 70 and the control function 51 communicate the traffic data to the controller 6, for example, at a predetermined timing.

The control unit 61B of the controller 6 accumulates the communicated traffic data in the traffic data accumulation unit 60 (S3-3).

The control unit 61B of the controller 6 extracts a traffic feature value based on the traffic data accumulated in the traffic data accumulation unit 60 (S3-4). For example, the control unit 61B calculates a burstiness index of packets as a traffic feature value based on the accumulated traffic data, using the equation (2).

The control unit 61B of the controller 6 calculates an amount of resources required for the virtual MME 5A based on the extracted traffic feature value (S3-5). For example, the control unit 61B calculates an amount of resources of the virtual MME 5A required for the mean delay E of the virtual MME 5A to be lower than an acceptable level D (a predetermined threshold value) based on the extracted burstiness index B and the relationships in FIG. 7.

The control unit 61B of the controller 6 requests the server 20A that operates the virtual MME 5A to allocate resources to the virtual MME 5A based on the calculated amount of resources (provisioning request in S3-6).

The control unit 210A of the server 20A, in response to the request from the controller 6, allocates an amount of resources, based on the request, to the virtual MME 5A (provisioning in S3-7).

As described above, in the third example embodiment of the present invention, the controller 6 performs provisioning of the virtual MME 5A based on an amount of resources of the virtual MME 5A calculated from an extracted traffic feature value. Therefore, in the third example embodiment of the present invention, it may be possible to reduce occurrences of instability in the performance characteristics of the virtual MME 5A for traffic having, for example, burstiness and the like.

<Fourth Example Embodiment>

A fourth example embodiment of the present invention will be described with reference to the drawings. A technique used in the fourth example embodiment is applicable to techniques of both the above-described respective example embodiments and example embodiments that will be described later.

Figure 27:
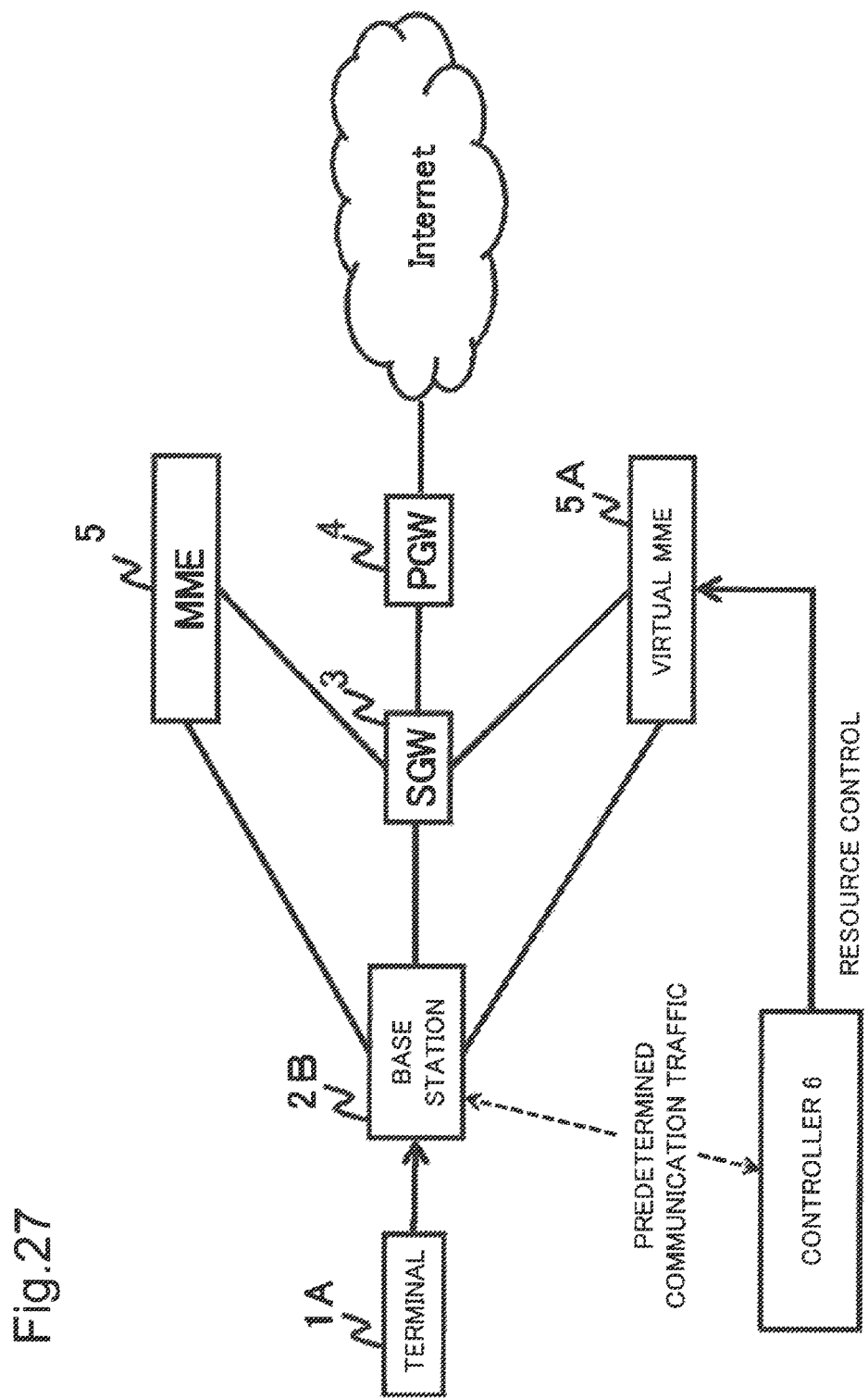
FIG. 27 is a configuration example of a communication system of a fourth example embodiment.

FIG. 27 illustrates a configuration example of a communication system of the fourth example embodiment. As exemplified in FIG. 27, the communication system of the fourth example embodiment includes an MME 5 and a virtual MME 5A, and control signaling transmitted from a base station 2B is distributed to a plurality of MMEs (the MME 5 and the virtual MME 5A). In FIG. 27, the base station 2B distributes traffic between the MME 5 and the virtual MME 5A on the basis of the type of the traffic and the attribute and type of a terminal 1A.

Figure 28:
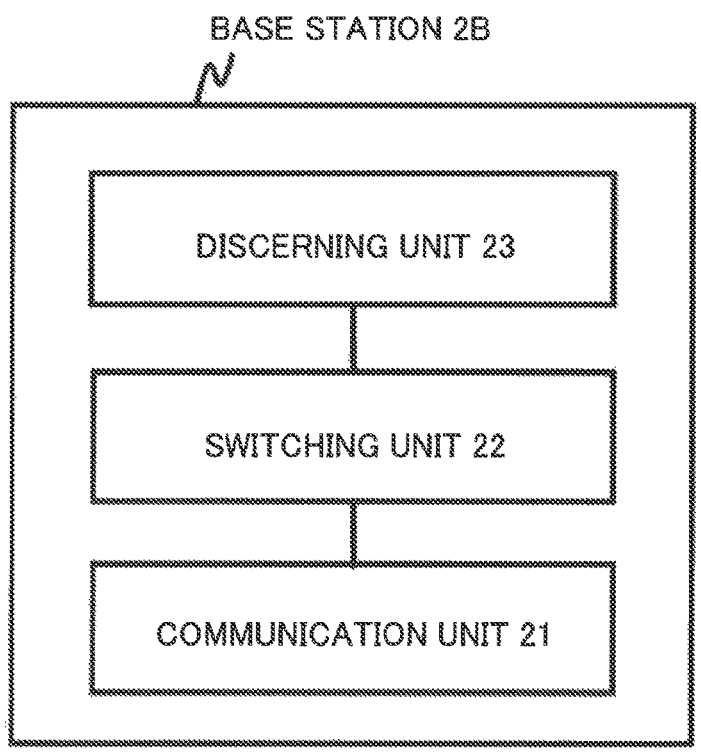
FIG. 28 is a configuration example of a base station 2B of the fourth example embodiment.

FIG. 28 illustrates a configuration example of the base station 2B of the fourth example embodiment of the present invention. The base station 2B includes a communication unit 21, a switching unit 22, and a discerning unit 23.

The communication unit 21 is an interface to communicate with the terminal 1A, the MME 5, the virtual MME 5A, or the like.

The discerning unit 23 discerns the type of traffic and the attribute and type of the terminal 1A. The discerning unit 23, for example, discerns whether or not the terminal 1A is an MTC (Machine Type Communication) device. In addition, the discerning unit 23 discerns, for example, traffic that is required to be processed by the virtual MME 5 (or the MME 5) on the basis of the discerned type of traffic and attribute and type of the terminal 1A.

The MTC devices include, for example, a smart device (a smart meter that monitors power consumption in a home, a smart TV, and a wearable terminal), industrial equipment, a vehicle, health care equipment, a home electric appliance, or the like. The MTC means a form of data communication, such as a smart meter or the like, that does not necessarily require intervention by a person. In other words, an MTC device is capable of autonomous communication with equipment of a communication counterpart. The MTC has been standardized in technical standard specifications (3GPP TS22.368 or the like). For an MTC device, a case may be supposed in which communication is performed at specific times (for example, "everyday, at 12:00 pm", "every Friday, at 3:00 am", or the like). In this case, it is expected that a lot of MTC devices of the same type (for example, smart meters) start communication at the same time and a great amount of traffic is generated at a specific time. Since an enormous number of MTC devices are expected to be connected to a communication system in the future, such a great amount of traffic may cause a large amount of load to be generated on the MME 5.

Thus, in the fourth example embodiment of the present invention, by discerning MTC traffic using the discerning unit 23, the base station 2B may, for example, offload communication traffic from MTC devices onto the virtual MME 5A. Therefore, with the fourth example embodiment, a load on the MME 5 due to communication traffic from the MTC devices may be reduced. For example, the base station 2B may transmit control signals for connecting the MTC devices to the network to the virtual MME 5A. The base station 2B offloading the above-described control signals onto the virtual MME 5A reduces a load on the MME 5 necessary to process the above-described control signals.

The switching unit 22 manages, for example, information relating to the MME 5 and information relating to the virtual MME 5A in a distinguishable manner from each other. For example, the switching unit 22 manages identification information relating to the MME 5 (for example, an address of the MME 5 or the like) and identification information relating to the virtual MME 5A (for example, an address of the virtual MME 5A and the like) in a distinguishable manner from each other. With the above-described configuration, the switching unit 22 is able to transmit traffic that is required to be offloaded onto the virtual MME 5A to the virtual MME 5A.

The switching unit 22, for example, transfers communication traffic discerned by the discerning unit 23 to the virtual MME 5A. The switching unit 22, for example, transfers predetermined traffic discerned by the discerning unit 23 to the virtual MME 5A. The switching unit 22, for example, transfers traffic of the terminal 1A that the discerning unit 23 has discerned to be an MTC device to the virtual MME 5A.

When the terminal 1A is an MTC device, the discerning unit 23 may, for example, discern an MTC device group to which the terminal belongs. The switching unit 22, for example, switches MMEs (the MME 5 or the virtual MME 5A) to which communication traffic relating to the terminal 1A is transferred depending on the discerned MTC device group.

The discerning unit 23 discerns, for example, communication traffic corresponding to a predetermined application. The discerning unit 23 discerns, for example, communication traffic corresponding to an application related to M2M (Machine-to-Machine). The switching unit 22, for example, transfers M2M-related communication traffic discerned by the discerning unit 23 to the virtual MME 5A.

The discerning unit 23 may discern, for example, communication traffic corresponding to an SNS (Social Network Service) application or the like. In addition, the discerning unit 23 may discern communication traffic corresponding to an application that operates in the background of the terminal 1A (for example, an application that automatically performs communication with a predetermined time interval without relation to a user operation).

The discerning unit 23 discerns, for example, communication traffic corresponding to a predetermined location (for example, a predetermined base station, a predetermined cell, and the like). For example, the discerning unit 23 discerns communication traffic corresponding to a location where a lot of users convene (an event site, a shopping mall, and the like).

The discerning unit 23 may, for example, discern the type of communication traffic and the type of the terminal 1A in accordance with a predetermined discerning policy. The discerning unit 23, for example, discerns communication traffic that is required to be processed by the virtual MME 5A in accordance with a discerning policy. In addition, for example, the discerning unit 23 discerns whether or not a control signal from the terminal 1A indicates the terminal 1A of a type that is required to be processed by the virtual MME 5A in accordance with a discerning policy. For example, a discerning policy used by the discerning unit 23 is changed dynamically. For example, a network operator may change a discerning policy dynamically.

The discerning unit 23 communicates traffic data, which are information relating to discerned traffic, to the controller 6. The discerning unit 23 communicates, for example, traffic data relating to traffic of the terminal 1A that has been discerned to be an MTC device to the controller 6. The discerning unit 23 communicates, for example, traffic data relating to traffic of the terminal 1A that has been discerned to belong to the MTC device group to the controller 6. The discerning unit 23 communicates, for example, traffic data relating to traffic that is discerned to correspond to a predetermined application to the controller 6. The discerning unit 23 communicates, for example, traffic data relating to traffic that has been discerned to correspond to an SNS application and the like to the controller 6.

The discerning unit 23 communicates, for example, traffic data relating to traffic that is discerned to be required to be processed by the virtual MME 5A to the controller 6. The discerning unit 23 communicates traffic data relating to traffic that is discerned to be required to be processed by the virtual MME 5A to the controller 6, for example, in accordance with a discerning policy. Alternatively, the discerning unit 23 may communicate, for example, traffic data relating to traffic that is discerned to be required to be processed by the MME 5 to the controller 6.

The discerning unit 23 may communicate, for example, traffic data relating to traffic that has been transferred to the virtual MME 5A to the controller 6. Alternatively, the discerning unit 23 may communicate, for example, traffic data relating to traffic that has been transferred to the MME 5 to the controller 6.

The discerning unit 23 communicates traffic data to the controller 6, for example, at a predetermined timing. The discerning unit 23 communicates traffic data to the controller, for example, with a predetermined period. The timings at which the discerning unit 23 communicates traffic data, however, are not limited to the above examples and may be any timing, such as when being requested from the controller 6.

The base station 2B may also select an MME (the MME 5 or the virtual MME 5A) on the basis of a predetermined message that the terminal 1A transmits.

Figure 29:
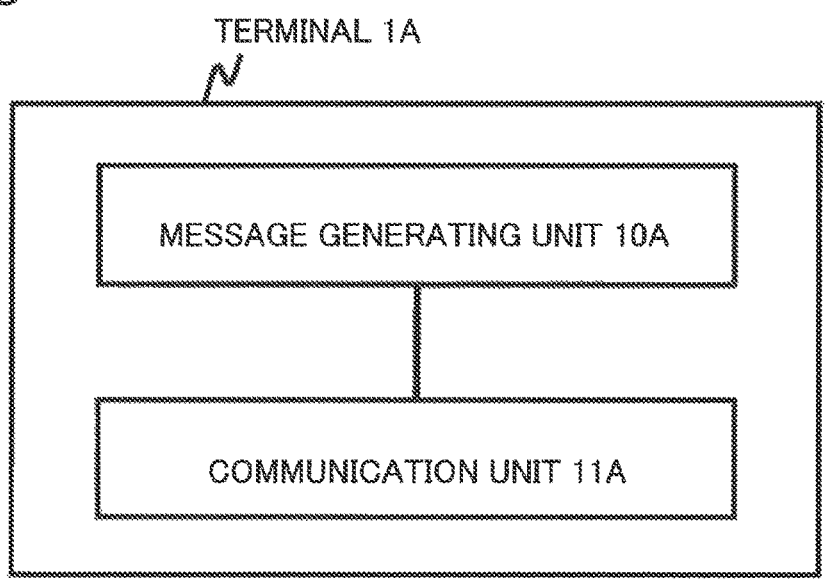
FIG. 29 is a configuration example of a terminal 1A of the fourth example embodiment.

FIG. 29 illustrates a configuration example of the terminal 1A that is capable of transmitting a predetermined message to the base station 2B.

The terminal 1A includes a message generating unit 10A and a communication unit 11A. The terminal 1A transmits a connection request (for example, an "RRC (Radio Resource Control) Connection Request") to the base station 2B.

The message generating unit 10A generates a message for the base station 2B to select an MME (the MME 5 or the virtual MME 5A). For example, the message generating unit 10A generates a message that includes information indicating whether or not the terminal 1A is an MTC device. Alternatively, for example, the message generating unit 10A generates a message that includes information indicating an application corresponding to communication traffic.

The message generating unit 10A may, for example, generate an "RRC Connection Request" message. For example, the message generating unit 10A may include information indicating the priority of the terminal 1A in the "RRC Connection Request" message according to the attribute of the terminal 1A. For example, the message generating unit 10A may include an "LAPI (Low Access Priority Indicator)" in the "RRC Connection Request". Alternatively, for example, the message generating unit 10A generates a message that includes information indicating an application corresponding to communication traffic.

The communication unit 11A transmits the generated message to the base station 2B.

The discerning unit 23 of the base station 2B discerns a terminal attribute in response to reception of a connection request. For example, the discerning unit 23 discerns a terminal attribute on the basis of whether or not the "LAPI" is included in an "RRC Connection Request" received from the terminal 1A. For example, since the "LAPI" is not included in an "RRC Connection Request" transmitted from a terminal 1A that is a non-MTC device, the discerning unit 23 discerns the terminal 1A to be a non-MTC device. On the other hand, since the "LAPI" is included in an "RRC Connection Request" transmitted from a terminal 1A that is an MTC device, the discerning unit 23 discerns the terminal 1A to be an MTC device on the basis of the "LAPI".

A configuration example of the controller 6 in the fourth example embodiment of the present invention is the same as that of the controller 6 of the third example embodiment illustrated in FIG. 24.

An interface 62 is an interface to communicate with the respective ones of the base station 2B, the S-GW 3, the P-GW 4, the MME 5, and the virtual MME 5A in FIG. 27. The controller 6 is capable of communicating with the base station 2B and the virtual MME 5A using a predetermined protocol via the interface 62. The controller 6, for example, collects traffic data from the base station 2B via the interface 62.

A traffic data accumulation unit 60, for example, stores the traffic data that have been collected from the base station 2B.

A control unit 61B extracts a traffic feature value based on the traffic data that have been collected from the base station 2B. Since the processing in which the control unit 61B extracts a traffic feature value is the same as that of the control unit 61 exemplified in FIG. 5, a detailed description thereof will be omitted.

The traffic data that the control unit 61B collects are traffic data relating to traffic that has been discerned by the discerning unit 23 of the base station 2B. For example, the traffic data that the control unit 61B collects are traffic data relating to traffic that has been discerned to an MTC device by the discerning unit 23. For example, the traffic data that the control unit 61B collects are traffic data relating to traffic of the terminal 1A that has been discerned to belong to the MTC device group by the discerning unit 23. For example, the traffic data that the control unit 61B collects are traffic data relating to traffic that has been discerned to correspond to a predetermined application by the discerning unit 23. For example, the traffic data that the control unit 61B collects are traffic data relating to traffic that has been discerned to correspond to an SNS application and the like by the discerning unit 23. For example, the traffic data that the control unit 61B collects are traffic data relating to traffic that has been discerned to correspond to a predetermined location (for example, a predetermined base station, a predetermined cell, and the like) by the discerning unit 23.

For example, the traffic data that the control unit 61B collects are traffic data relating to traffic that has been discerned, by the discerning unit 23, to be required to be processed by the virtual MME 5A. For example, the traffic data that the control unit 61B collects are traffic data relating to traffic that has been discerned, by the discerning unit 23, to be required to be processed by the MME 5.

For example, the traffic data that the control unit 61B collects are traffic data relating to traffic that has been transferred to the virtual MME 5A by the discerning unit 23. Alternatively, the traffic data that the control unit 61B collects may be traffic data relating to traffic that has been transferred to the MME 5 by the discerning unit 23.

The control unit 61B calculates an amount of resources of the virtual MME 5A required for satisfying a predetermined condition based on the extracted traffic feature value. The predetermined condition is, for example, a condition that requires a processing delay in signal processing in the virtual MME 5A to be not more than a predetermined threshold value (satisfying an acceptable level). Since the processing in which the control unit 61B calculates an amount of resources of the virtual MME 5A is the same as that of the control unit 61 exemplified in FIG. 5, a detailed description thereof will be omitted.

The control unit 61B performs provisioning of resources of the virtual MME 5A.

The control unit 61B, for example, requests a server 20A that operates the virtual MME 5A to allocate resources to the virtual MME 5A based on the calculated amount of resources. The control unit 61B, for example, requests to allocate resources (server resources, CPU resources, network resources, or the like) to the virtual MME 5A based on the calculated amount of resources.

A configuration example of the server 20A that operates the virtual MME 5A of the fourth example embodiment of the present invention is the same as that of the server 20A of the third example embodiment illustrated in FIG. 22.

A control unit 210A of the server 20A allocates resources to the virtual MME 5A that is operated in a virtual machine in response to the request from the control unit 61B of the controller 6.

Figure 30:
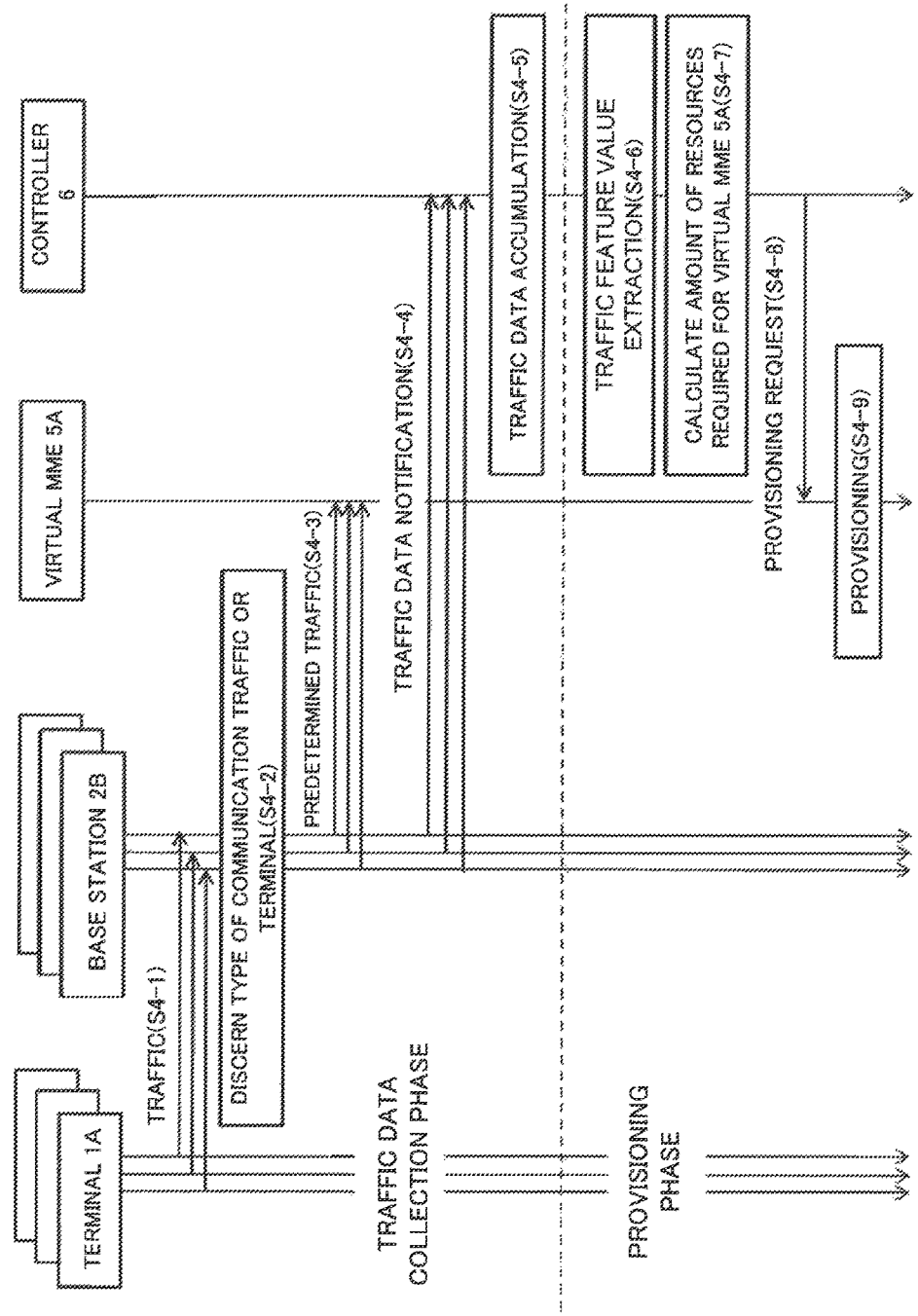
FIG. 30 is a sequence chart illustrating an operation example of the communication system of the fourth example embodiment.

FIG. 30 is a sequence chart illustrating an operation example of the communication system of the fourth example embodiment.

The communication unit(s) 11A of the terminal(s) 1A perform(s) communication with the base station(s) 2B (traffic in S4-1). The communication unit(s) 11A of the terminal(s) 1A, for example, transmit(s) at least one of traffic of control signals and traffic of user data to the base station(s) 2B. For example, the communication unit(s) 11A of the terminal(s) 1A that is/are an MTC device(s) transmit(s) an "RRC Connection Request(s)" including the "LAPI(s)" to the base station(s) 2B.

The discerning unit(s) 23 of the base station(s) 2B discern(s) the type of traffic and the attribute(s) and type(s) of the terminal(s) 1A (S4-2). The discerning unit(s) 23, for example, discern(s) whether or not the terminal(s) 1A is/are an MTC device(s). In addition, the discerning unit(s) 23, for example, discern(s) traffic that is required to be processed by the virtual MME 5A (or the MME 5) on the basis of the discerned type of traffic and attribute(s) and type(s) of the terminal(s) 1A.

The switching unit(s) 22 of the base station(s) 2B transfer(s) communication traffic (predetermined traffic) that has been discerned by the discerning unit(s) 23 to the virtual MME 5A (S4-3). The switching unit(s) 22, for example, transfer(s) traffic of the terminal(s) 1A that has/have been discerned to be an MTC device(s) by the discerning unit(s) 23 to the virtual MME 5A.

The discerning unit(s) 23 of the base station(s) 2B communicate(s) traffic data, which are information relating to discerned traffic, to the controller 6 (S4-4). The discerning unit(s) 23, for example, communicate(s) traffic data relating to traffic of the terminal(s) 1A that has/have been discerned to be an MTC device(s) to the controller 6. Alternatively, the virtual MME 5A may communicate, to the controller 6, traffic data relating to traffic that has been received from the base station(s) 2B.

The control unit 61B of the controller 6 accumulates the communicated traffic data in the traffic data accumulation unit 60 (S4-5).

The control unit 61B of the controller 6 extracts a traffic feature value based on the traffic data accumulated in the traffic data accumulation unit 60 (S4-6). For example, the control unit 61B calculates a burstiness index of packets as a traffic feature value based on the accumulated traffic data, using the equation (2).

The control unit 61B of the controller 6 calculates an amount of resources required for the virtual MME 5A based on the extracted traffic feature value (S4-7). For example, the control unit 61B calculates an amount of resources of the virtual MME 5A required for the mean delay E of the virtual MME 5A to be lower than an acceptable level D (a predetermined threshold value) based on the extracted burstiness index B and the relationships in FIG. 7.

The control unit 61B of the controller 6 requests the server 20A that operates the virtual MME 5A to allocate resources to the virtual MME 5A based on the calculated amount of resources (provisioning request in S4-8).

The control unit 210A of the server 20A, in response to the request from the controller 6, allocates an amount of resources, based on the request, to the virtual MME 5A (provisioning in S4-9).

As described above, in the fourth example embodiment of the present invention, the controller 6 collects traffic data relating to predetermined traffic that is to be processed by the virtual MME 5A and extracts a traffic feature value from the collected traffic data. Subsequently, the controller 6 performs provisioning of the virtual MME 5A based on an amount of resources of the virtual MME 5A calculated from the extracted traffic feature value. Therefore, in the fourth example embodiment of the present invention, it may be possible to reduce occurrences of instability in the performance characteristics of the virtual MME 5A even for traffic having, for example, burstiness and the like.

<Fifth Example Embodiment>

A fifth example embodiment of the present invention will be described with reference to the drawings. A technique used in the fifth example embodiment is applicable to techniques of both the above-described respective example embodiments and example embodiments that will be described later.

Figure 31:
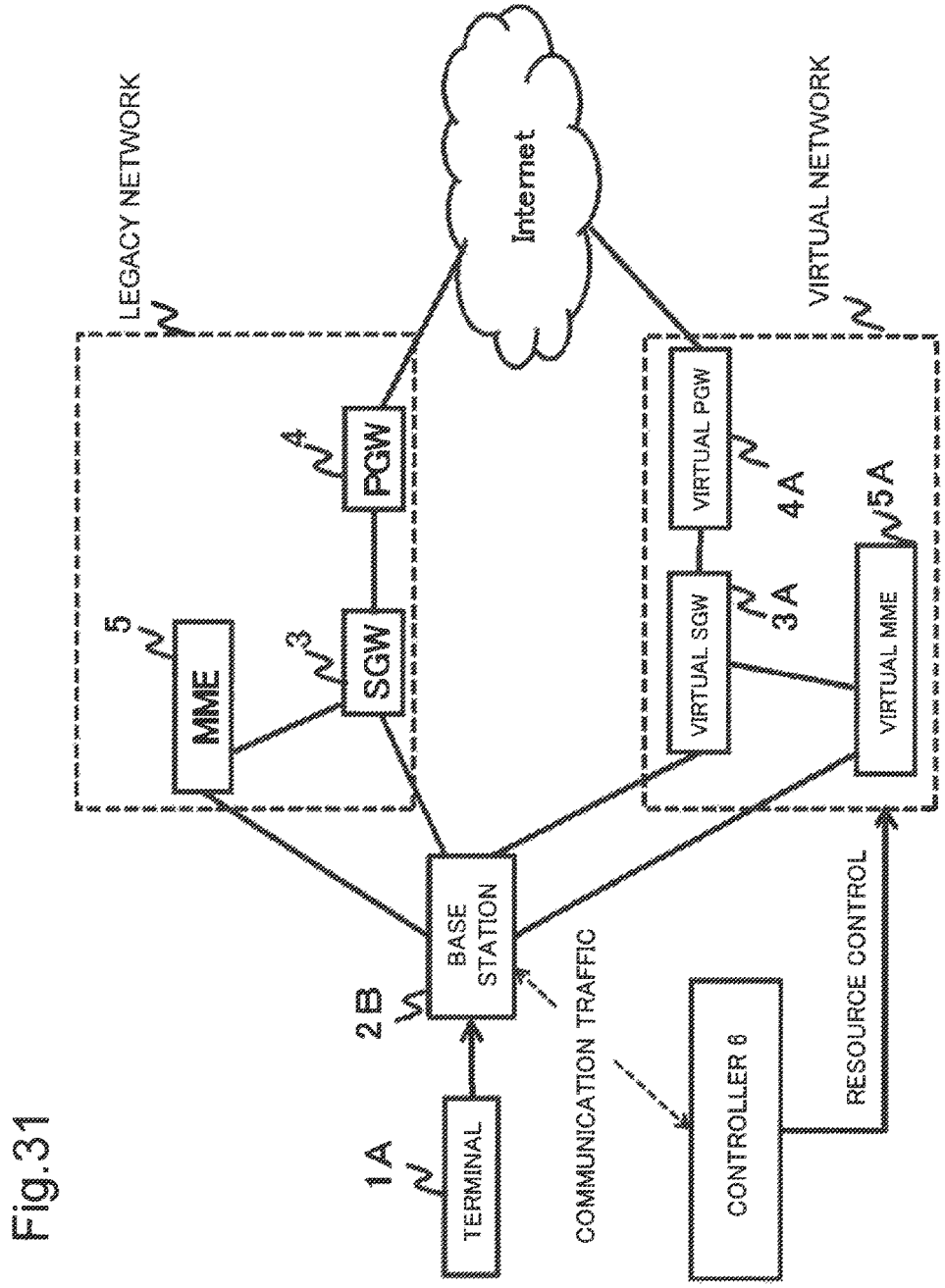
FIG. 31 is a configuration example of a communication system of a fifth example embodiment.

FIG. 31 illustrates a configuration example of a communication system of the fifth example embodiment. As exemplified in FIG. 31, the communication system of the fifth example embodiment is configured including a legacy network and a virtual network. The legacy network and the virtual network are backbone networks, such as an EPC (Evolved Packet Core) or the like. The legacy network and the virtual network are backbone networks for a terminal 1A to communicate with an external network, such as the Internet or the like, via a base station 2B.

In the example in FIG. 31, communication traffic from the terminal 1A with a predetermined attribute (for example, an MTC device) is offloaded onto the virtual network. Therefore, the communication system may, for example, reduce a load on the legacy network due to communication traffic of MTC devices. For example, transmitting control signals for connecting MTC devices to the network to the virtual network reduces a load on the legacy network to process the control signals from the MTC devices.

As exemplified in FIG. 31, the communication system of the fifth example embodiment includes a controller 6. The controller 6, for example, collects communication traffic to be offloaded onto the virtual network and extracts a traffic feature value from the collected communication traffic. The controller 6 calculates an amount of resources required for virtual network nodes 7A included in the virtual network using the extracted traffic feature value. In the above, the virtual network nodes are network nodes, such as a virtual SGW 3A, a virtual PGW 4A, a virtual MME 5A or the like. In the description hereinafter set forth, the virtual network nodes are collectively referred to as virtual network nodes 7A. The controller 6 performs provisioning of the virtual network nodes 7A based on the calculated amount of resources. Therefore, the communication system may, for example, prevent a processing delay or the like of the virtual network nodes 7A that are generated due to characteristics of traffic, such as burstiness of communication traffic to be offloaded onto the virtual network nodes 7A, or enhance the stability of the communication network. In addition, the controller 6 has the same functions as those of the controller 6 exemplified in FIG. 13.

The legacy network includes a plurality of network nodes (an SGW 3, a PGW 4, and an MME 5) for providing the terminal 1A with communication services. Each network node is, for example, a communication device 7 that has predetermined communication functions.

In the virtual network, at least some of the functions of the network nodes in the legacy network are operated virtually by software. For example, functions of such a network node are operated by applications in a virtual machine. The virtual network is, for example, constructed by means of a data center that is made up of servers and communication equipment (switches, routers, or the like).

The virtual network is, for example, constructed by means of dynamic scale-out and scale-in of virtual machines. For example, a network operator may construct the virtual network by starting virtual machines dynamically depending on the conditions of communication traffic in the network or in response to a request from the controller 6. In addition, for example, the network operator may also construct the virtual network by starting virtual machines dynamically during a predetermined time period via the controller 6. The network operator may construct the virtual network dynamically by starting virtual machines corresponding to predetermined communication traffic or communication traffic of a predetermined terminal 1A via the controller 6. The network operator may construct the virtual network dynamically by starting virtual machines, via the controller 6, so as to satisfy a requirement (for example, an SLA (Service Level Agreement)) for processing of communication traffic.

The network operator may, for example, also reduce resources allocated to the virtual network and suppress power consumption in the data center by, via the controller 6, stopping virtual machines during a predetermined time period for which little communication traffic is generated.

The communication system exemplified in FIG. 31 may include another network in addition to the legacy network and the virtual network. In addition, each of the legacy network and the virtual network may include a plurality of types of networks. For example, each of the legacy network and the virtual network may include a plurality of types of networks, such as an LTE network, a GPRS network, a UMTS network, or the like.

Since a configuration example of the base station 2B in the fifth example embodiment of the present invention is the same as the configuration example of the base station 2B in the fourth example embodiment of the present invention illustrated in FIG. 28, a detailed description thereof will be omitted.

A discerning unit 23 of the base station 2B in the fifth example embodiment may discern, for example, traffic that is required to be offloaded onto the virtual network on the basis of the discerned type of traffic and attribute and type of the terminal 1A. The discerning unit 23 may discern communication traffic that is required to be processed in the virtual network, for example, in accordance with a discerning policy. In addition, for example, the discerning unit 23 may also discern, in accordance with a discerning policy, whether or not the terminal 1A is the terminal 1A of a type which is required to be processed in the virtual network.

Furthermore, the discerning unit 23 may, for example, communicate traffic data relating to traffic that is discerned to be required to be processed in the virtual network to the controller 6. The discerning unit 23 may, for example, communicate traffic data relating to traffic that is discerned, in accordance with a discerning policy, to be required to be processed in the virtual network to the controller 6.

A switching unit 22 of the fifth example embodiment may, for example, transfer communication traffic that has been discerned by the discerning unit 23 to the virtual network. The switching unit 22 may transfer, for example, predetermined traffic that has been discerned by the discerning unit 23 to the virtual network. The switching unit 22 may transfer, for example, traffic of the terminal 1A that has been discerned to be an MTC device by the discerning unit 23 to the virtual network.

Since a configuration example of the terminal 1A in the fifth example embodiment of the present invention is the same as the configuration example of the terminal 1A in the fourth example embodiment of the present invention illustrated in FIG. 29, a detailed description thereof will be omitted.

A configuration example of the controller 6 in the fifth example embodiment of the present invention is the same as the configuration example of the controller 6 of the third example embodiment illustrated in FIG. 24.

An interface 62 is an interface to communicate with the respective ones of the base station 2B, the virtual network nodes 7A (the virtual S-GW 3A, the virtual P-GW 4A, and the virtual MME 5A) in FIG. 31. The controller 6 is capable of communicating with the base station 2B and the virtual MME 5A using a predetermined protocol via the interface 62. The controller 6, for example, collects traffic data from the base station 2B via the interface 62. In addition, the interface 62 may communicate with the respective ones of the SGW 3, the PGW 4, and the virtual MME 5A in FIG. 31.

A traffic data accumulation unit 60, for example, stores the traffic data collected from the base station 2B.

A control unit 61B extracts a traffic feature value based on the traffic data that have been collected from the base station 2B. The traffic data that the control unit 61B collects are traffic data relating to traffic that has been discerned by the discerning unit 23 of the base station 2B. In the fifth example embodiment of the present invention, the traffic data that the control unit 61B collects may be, for example, traffic data relating to traffic that has been discerned to be required to be offloaded onto the virtual network. The traffic data that the control unit 61B collects may be, for example, traffic data relating to traffic that has been discerned to be required to be processed in the virtual network. The traffic data that the control unit 61B collects may be, for example, traffic data relating to traffic from the terminal 1A that has been, in accordance with a discerning policy, discerned to be a type which is required to be processed in the virtual network.

The control unit 61B calculates an amount of resources of each virtual network node 7A (the virtual S-GW 3A, the virtual P-GW 4A, and the virtual MME 5A) required for satisfying a predetermined condition based on the extracted traffic feature value. The predetermined condition is, for example, a condition that requires a processing delay in signal processing in each virtual network node 7A to be not more than a predetermined threshold value (satisfying an acceptable level).

The control unit 61B performs provisioning of resources of the virtual MME 5A.

The control unit 61B, for example, requests the server 20 that operates the virtual network nodes 7A included in the virtual network to allocate resources to each virtual network node 7A based on the calculated amount of resources. The control unit 61B, for example, requests to allocate resources (server resources, CPU resources, network resources, or the like) to each virtual network node 7A based on the calculated amount of resources.

A configuration example of a server that operates the virtual network nodes 7A of the fifth example embodiment of the present invention is the same as that of the server 20 of the second example embodiment illustrated in any of FIGS. 10 and 15 to 18.

A control unit 210 of a server 20, in response to the request from the control unit 61B of the controller 6, allocates resources to each virtual network node 7A that is operated in a virtual machine.

Figure 32:
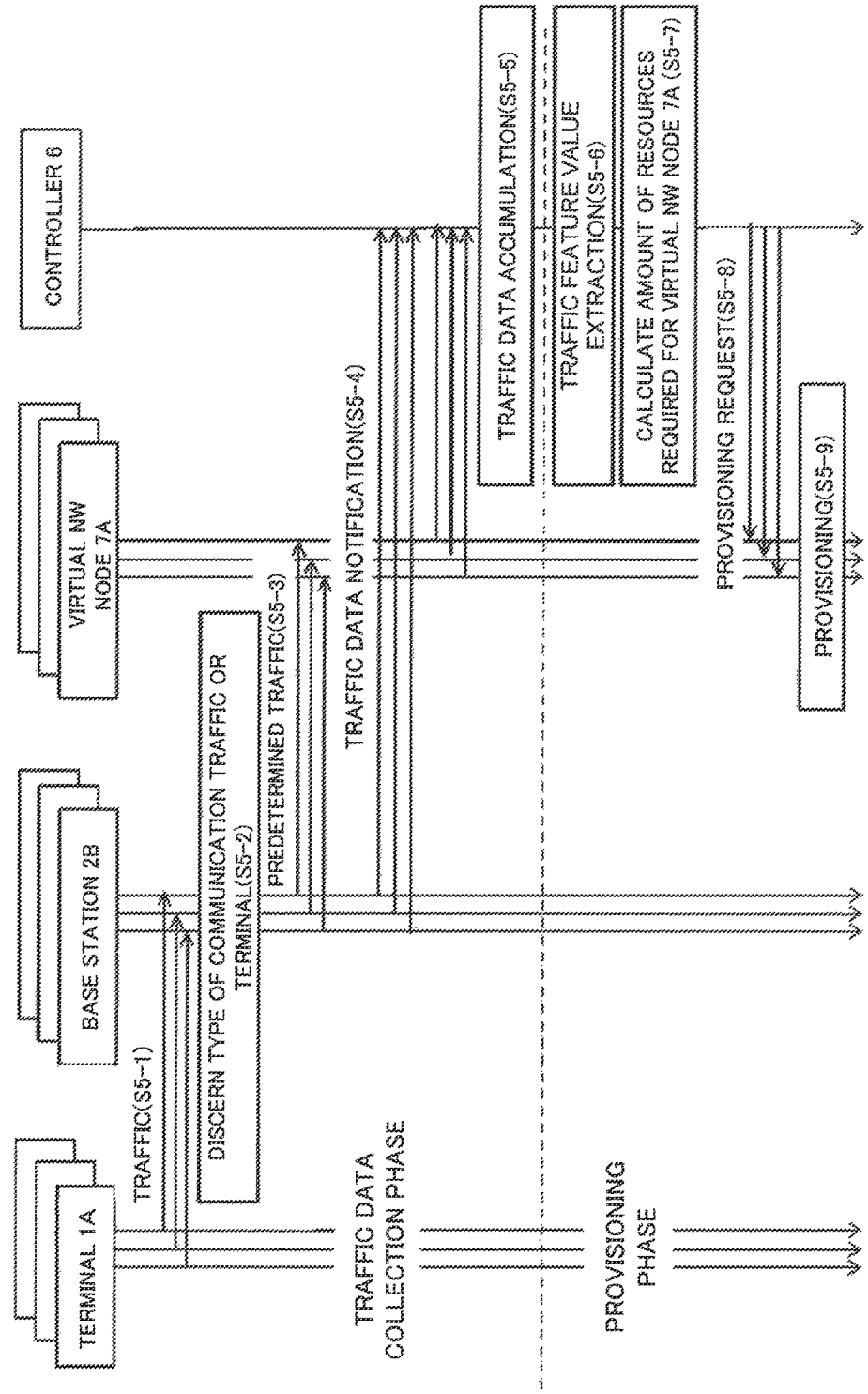
FIG. 32 is a sequence chart illustrating an operation example of a communication system of a sixth example embodiment.

FIG. 32 is a sequence chart illustrating an operation example of the communication system of the fifth example embodiment.

The communication unit(s) 11A of the terminal(s) 1A perform(s) communication with the base station(s) 2B (traffic in S5-1). The communication unit(s) 11A of the terminal(s) 1A, for example, transmit(s) at least one of traffic of control signals and traffic of user data to the base station(s) 2B. For example, the communication unit(s) 11A of the terminal(s) 1A that is/are an MTC device(s) transmit(s) an "RRC Connection Request(s)" including an "LAPI(s)" to the base station(s) 2B.

The discerning unit(s) 23 of the base station(s) 2B discern(s) the type of traffic and the attribute(s) and type(s) of the terminal(s) 1A (S5-2). The discerning unit(s) 23, for example, discern(s) whether or not the terminal(s) 1A is/are an MTC device(s). In addition, the discerning unit(s) 23 discern(s) traffic that is, for example, to be processed in the virtual network on the basis of the discerned type of traffic and attribute(s) and type(s) of the terminal(s) 1A.

The switching unit(s) 22 of the base station(s) 2B transfer(s) communication traffic (predetermined traffic) that has been discerned by the discerning unit(s) 23 to the virtual network nodes 7A included in the virtual network (S5-3). The switching unit(s) 22, for example, transfer(s) traffic of the terminal(s) 1A that has/have been discerned to be an MTC device(s) by the discerning unit(s) 23 to the virtual network nodes 7A included in the virtual network.

The discerning unit(s) 23 of the base station(s) 2B communicate(s) traffic data, which are information relating to the discerned traffic, to the controller 6 (S5-4). The discerning unit(s) 23, for example, communicate(s) traffic data relating to traffic from the terminal(s) 1A that has/have been discerned to be an MTC device(s) to the controller 6. Alternatively, each virtual network node 7A included in the virtual network may communicate traffic data relating to traffic that is to be processed in the virtual network to the controller 6.

The control unit 61B of the controller 6 accumulates the communicated traffic data in the traffic data accumulation unit 60 (S5-5).

The control unit 61B of the controller 6 extracts a traffic feature value based on the traffic data accumulated in the traffic data accumulation unit 60 (S5-6). For example, the control unit 61B extracts a burstiness index of packets as a traffic feature value from the accumulated traffic data, using the equation (2).

The control unit 61B of the controller 6 calculates an amount of resources required for each virtual network node 7A based on the extracted traffic feature value (S5-7). For example, the control unit 61B calculates an amount of resources of the virtual MME 5A required for the mean delay E of the virtual MME 5A to be lower than an acceptable level D (a predetermined threshold value) based on the extracted burstiness index B and the relationships in FIG. 7.

The control unit 61B of the controller 6 requests the server 20 that operates the virtual network nodes 7A to allocate resources to each virtual network node 7A based on the calculated amount of resources (provisioning request in S5-8).

The control unit 210 of the server 20, in response to the request from the controller 6, allocates an amount of resources, based on the request, to each virtual network node 7A (provisioning in S5-9).

As described above, in the fifth example embodiment of the present invention, the controller 6 collects traffic data relating to predetermined traffic that is to be processed in the virtual network (to be offloaded onto the virtual network) and extracts a traffic feature value from the collected traffic data. Subsequently, the controller 6, on the basis of an amount of resources of each virtual network node 7A calculated from the extracted traffic feature value, performs provisioning of the virtual network node 7A. Therefore, in the fifth example embodiment of the present invention, it may be possible to reduce occurrences of instability in the performance characteristics of the virtual network nodes 7A even for traffic having, for example, burstiness and the like.

<Sixth Example Embodiment>

A sixth example embodiment of the present invention will be described with reference to the drawings. A technique used in the sixth example embodiment is applicable to techniques of both the above-described respective example embodiments and example embodiments that will be described later.

In the sixth example embodiment, a virtual MME 5A calculates an amount of resources required for the own device (that is, the virtual MME 5A) based on traffic data collected from a base station 2, an S-GW 3, a P-GW 4, or the like. The virtual MME 5A may, by acquiring a calculated amount of resources, prevent a delay or the like, generated due to characteristics of traffic such as burstiness or the like, in processing of control signals.

Figure 33:
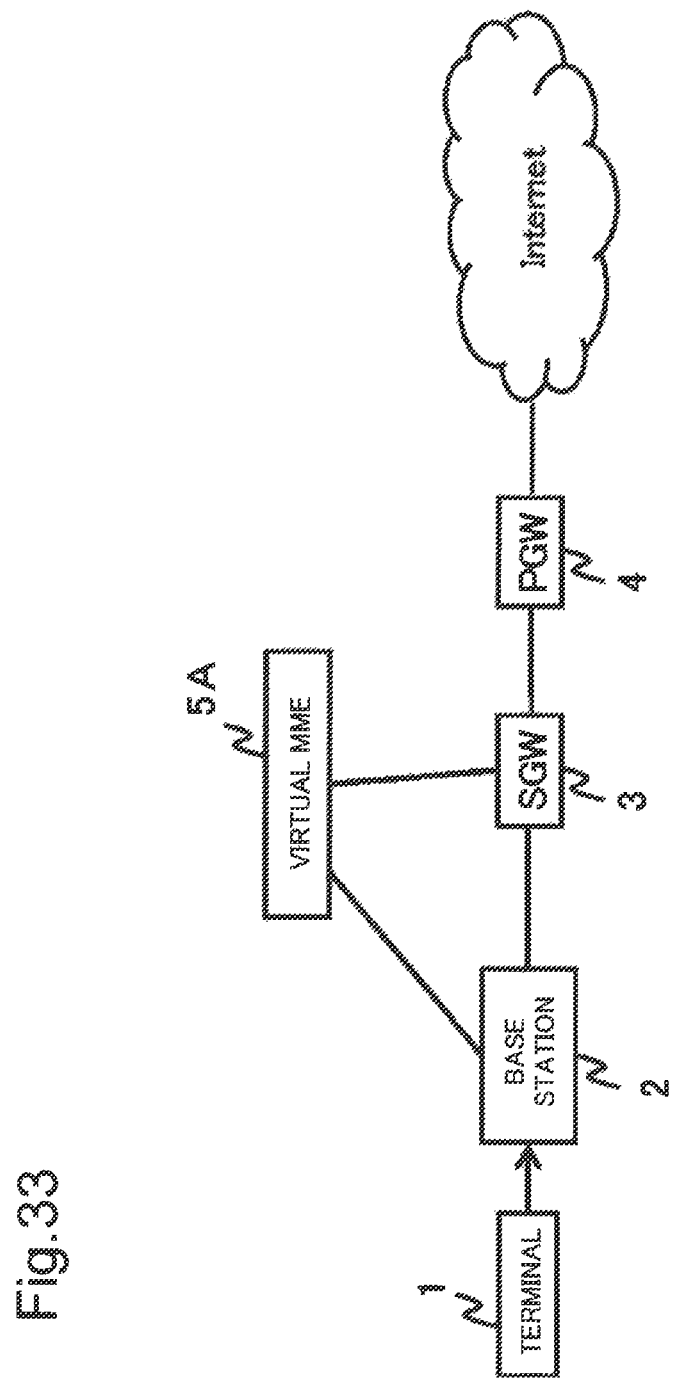
FIG. 33 is a configuration example of a communication system of a sixth example embodiment.

FIG. 33 illustrates a configuration example of a communication system of the sixth example embodiment. As exemplified in FIG. 33, the communication system of the sixth example embodiment includes communication devices 7 (the base station 2, the S-GW 3, and the P-GW 4) and the virtual MME 5A. Since the base station 2, the S-GW 3, and the P-GW 4 have the same functions as those of the base station 2, the S-GW 3, and the P-GW 4 exemplified in FIG. 1 or the like, a detailed description thereof will be omitted.

It is noted that, in the communication system of the sixth example embodiment, network functions relating to each of the communication devices 7 (the base station 2, the S-GW 3, and the P-GW 4) may be performed, as a virtual network node 7A, by software such as a virtual machine. In FIG. 33, the base station 2, the S-GW 3, and the P-GW 4 may be a virtual base station 2A, a virtual S-GW 3A, and a virtual P-GW 4A, respectively. Since the virtual base station 2A, the virtual S-GW 3A, and the virtual P-GW 4A have the same functions as those of the virtual base station 2A, the virtual S-GW 3A, and the virtual P-GW 4A exemplified in FIG. 9 or the like, a detailed description thereof will be omitted. Although, in the following description, the description will be made under the assumption that the communication system includes the base station 2, the S-GW 3, and the P-GW 4, the communication system may include the virtual base station 2A, the virtual S-GW 3A, and the virtual P-GW 4A in any of the cases described below.

Figure 34:
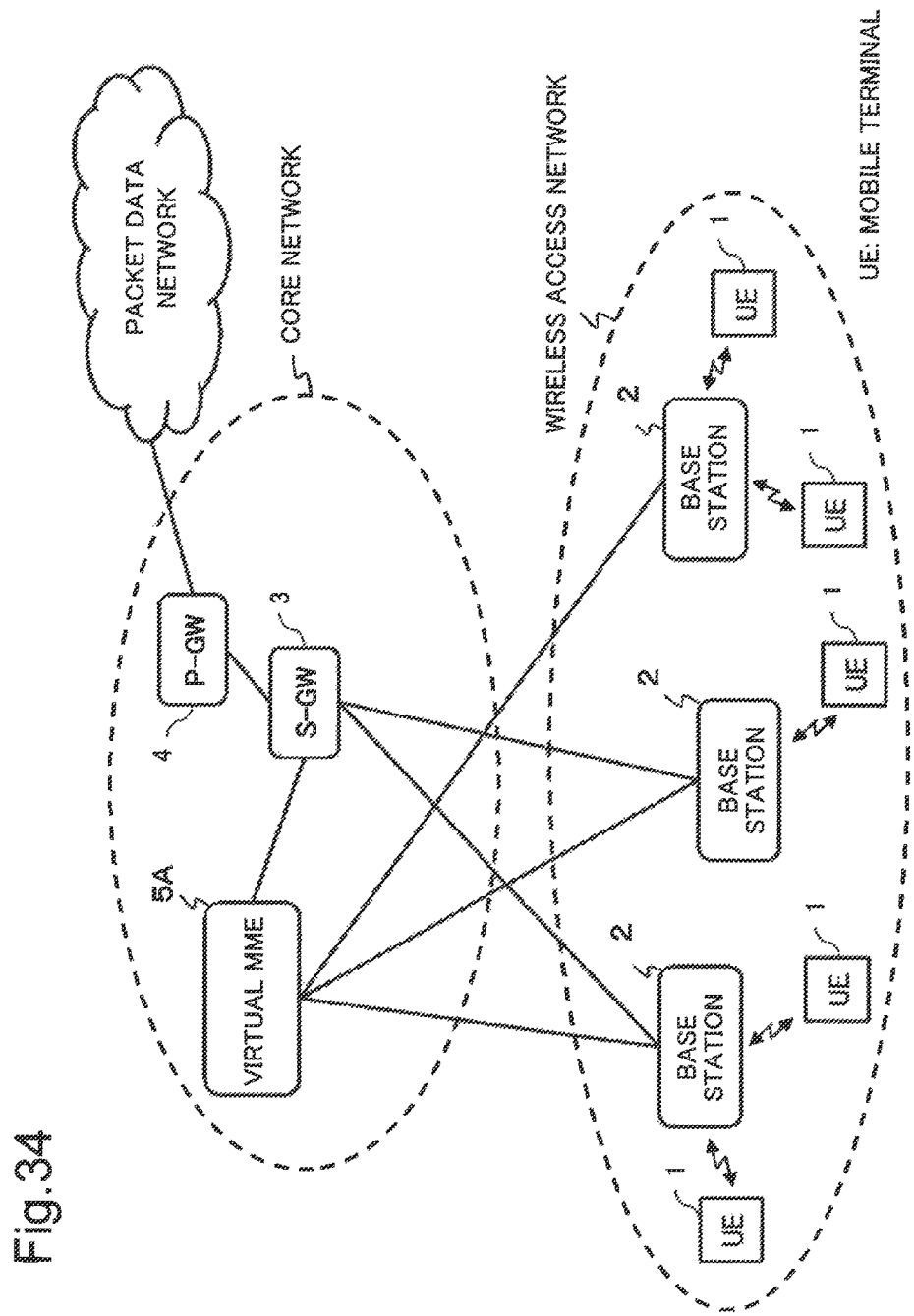
FIG. 34 is another configuration example of the communication system of the sixth example embodiment.

FIG. 34 is another configuration example of the communication system of the sixth example embodiment. As exemplified in FIG. 34, the communication system of the sixth example embodiment includes a plurality of terminals (UE) 1, a plurality of base stations 2, the S-GW 3, the P-GW 4, and the virtual MME 5A.

The virtual MME 5A collects traffic data from the plurality of base stations 2 and the S-GW 3 and extracts a traffic feature value, as illustrated in FIG. 34. The virtual MME 5A may collect traffic data from the P-GW 4 via the S-GW 3. Alternatively, the virtual MME 5A may collect traffic data directly from the P-GW 4. The virtual MME 5A controls an amount of resources of the own device (the virtual MME 5A) based on the amount of resources of the own device (the virtual MME 5A) calculated from the extracted traffic feature value.

Figure 35:
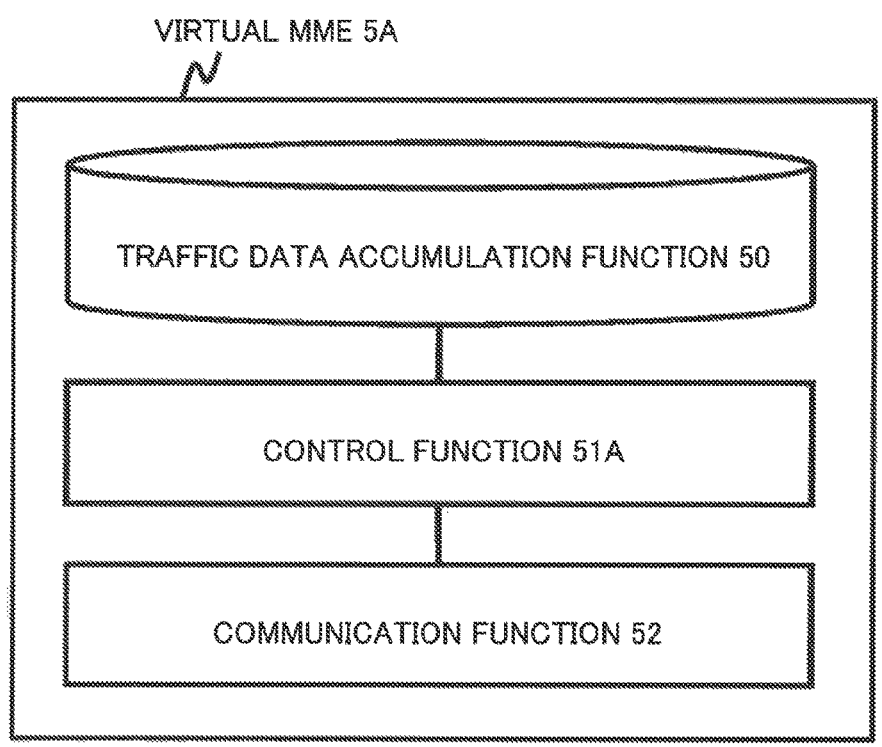
FIG. 35 is a diagram illustrating a configuration example of a virtual MME 5A of the sixth example embodiment.

FIG. 35 is a diagram illustrating a configuration example of the virtual MME 5A in the sixth example embodiment. As exemplified in FIG. 35, in the sixth example embodiment, the virtual MME 5A includes a traffic data accumulation function 50, a control function 51A, and a communication function 52. Since the communication function 52 has the same functions as those of the communication function 52 exemplified in FIG. 23, a detailed description thereof will be omitted.

The traffic data accumulation function 50, for example, stores traffic data collected from the respective ones of the base station 2, the S-GW 3, and the P-GW 4. The traffic data accumulation function 50 may store traffic data collected from the respective ones of the base station 2, the S-GW 3, and the P-GW 4, for example, with respect to each of the base station 2, the S-GW 3, and the P-GW 4. The traffic data accumulation function 50 may store traffic data collected from the respective ones of the base station 2, the S-GW 3, and the P-GW 4, for example, with respect to each collection time.

The control function 51A has functions that correspond to the C-Plane. The C-Plane contains functions of processing control signaling, such as setting up and release of sessions for communication, control of handover, or the like. The control function 51A transmits and receives control signaling via the communication function 52. The control function 51A collects traffic data from the respective ones of the base station 2, the S-GW 3, and the P-GW 4 and stores the collected traffic data in the traffic data accumulation function 50.

The control function 51A extracts a traffic feature value using the traffic data stored in the traffic data accumulation function 50. In the above, the control function 51A extracts a traffic feature value in the same manner as in the case of the control unit 61 illustrated in FIG. 5.

The control function 51A calculates an amount of resources of the virtual MME 5A required for satisfying a predetermined condition based on the extracted traffic feature value. The predetermined condition is, for example, a condition that requires a processing delay in signal processing in the virtual MME 5A to be not more than a predetermined threshold value (satisfying an acceptable level). In the above, the control function 51A calculates an amount of resources of the virtual MME 5A in the same manner as in the case of the control unit 61 illustrated in FIG. 5.

The control function 51A performs provisioning of resources of the own device (the virtual MME 5A). The control function 51A, for example, requests the server 20 that operates virtual machines to allocate resources to the own device (the virtual MME 5A) based on the calculated amount of resources.

Figure 36:
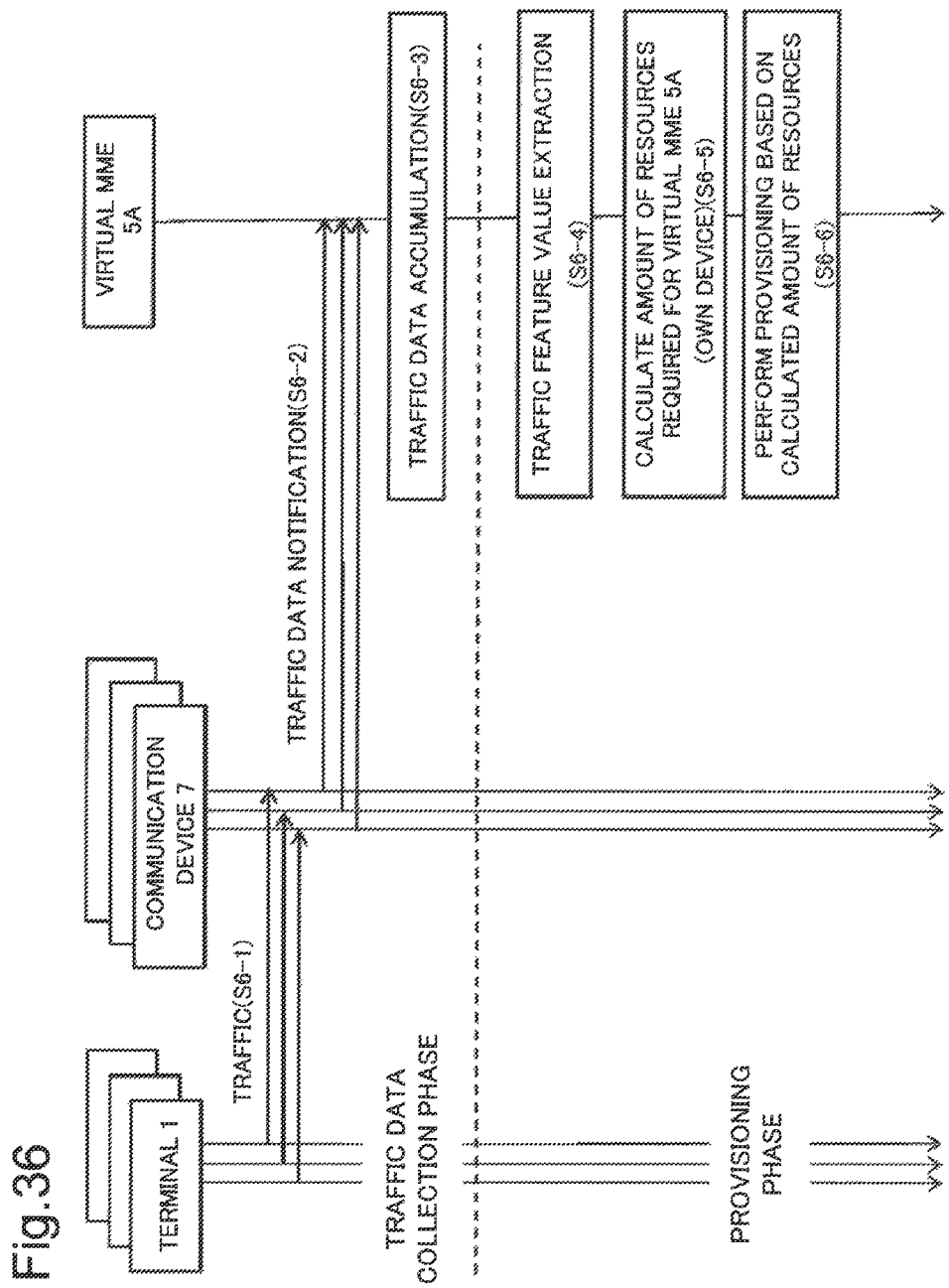
FIG. 36 is a sequence chart illustrating an operation example of the communication system of the sixth example embodiment.

FIG. 36 is a sequence chart illustrating an operation example of the communication system of the sixth example embodiment. Although, in FIG. 36, the description will be made using an example including the communication devices 7, the same description may apply to a case in which the communication devices 7 are replaced by the virtual network nodes 7A.

A communication unit(s) 11 of the terminal(s) 1, for example, perform(s) communication with the communication devices 7 (traffic in S6-1). The communication unit(s) 11 of the terminal(s) 1, for example, transmit(s) at least one of traffic of control signals and traffic of user data to the communication devices 7.

A control unit 70 of each communication device 7 communicates traffic data, which are information relating to at least one of traffic of control signals and traffic of user data, to the virtual MME 5A (S6-2). The control unit 70 communicates the traffic data to the virtual MME 5A, for example, at a predetermined timing.

The control function 51A of the virtual MME 5A accumulates the communicated traffic data in the traffic data accumulation function 50 (S6-3). The control function 51A of the virtual MME 5A extracts a traffic feature value based on the traffic data accumulated in the traffic data accumulation function 50 (S6-4). The control function 51A, for example, calculates a burstiness index of packets as a traffic feature value based on the accumulated traffic data, using the equation (2).

The control function 51A of the virtual MME 5A calculates an amount of resources required for the virtual MME 5A (the own device) based on the extracted traffic feature value (S6-5). The control function 51A, for example, calculates an amount of resources of the virtual MME 5A required for the mean delay E of the virtual MME 5A to be lower than an acceptable level D (a predetermined threshold value) based on the extracted burstiness index B and the relationships in FIG. 7.

The control function 51A of the virtual MME 5A acquires an amount of resources of the virtual MME 5A based on the calculated amount of resources (S6-6).

As described above, in the sixth example embodiment of the present invention, the virtual MME 5A calculates an amount of resources required for the own device (the virtual MME 5A) based on traffic data collected from the base station 2, the S-GW 3, the P-GW 4, and the like. Acquiring a calculated amount of resources may enable the virtual MME 5A to prevent a delay or the like, generated due to characteristics of traffic such as burstiness or the like, in processing of control signals.

<Seventh Example Embodiment>

A seventh example embodiment of the present invention will be described with reference to the drawings. A technique used in the seventh example embodiment is applicable to techniques of both the above-described respective example embodiments and example embodiments that will be described later.

In the seventh example embodiment, a resource control device 8, on the basis of traffic data that a virtual MME 5A has collected from a base station 2, an S-GW 3, a P-GW 4, and the like, calculates an amount of resources required for the virtual MME 5A. The virtual MME 5A may, by acquiring the amount of resources upon receiving the amount of resources that the resource control device 8 has calculated, prevent a delay or the like, generated due to characteristics of traffic such as burstiness or the like, in processing of control signals.

Figure 37:
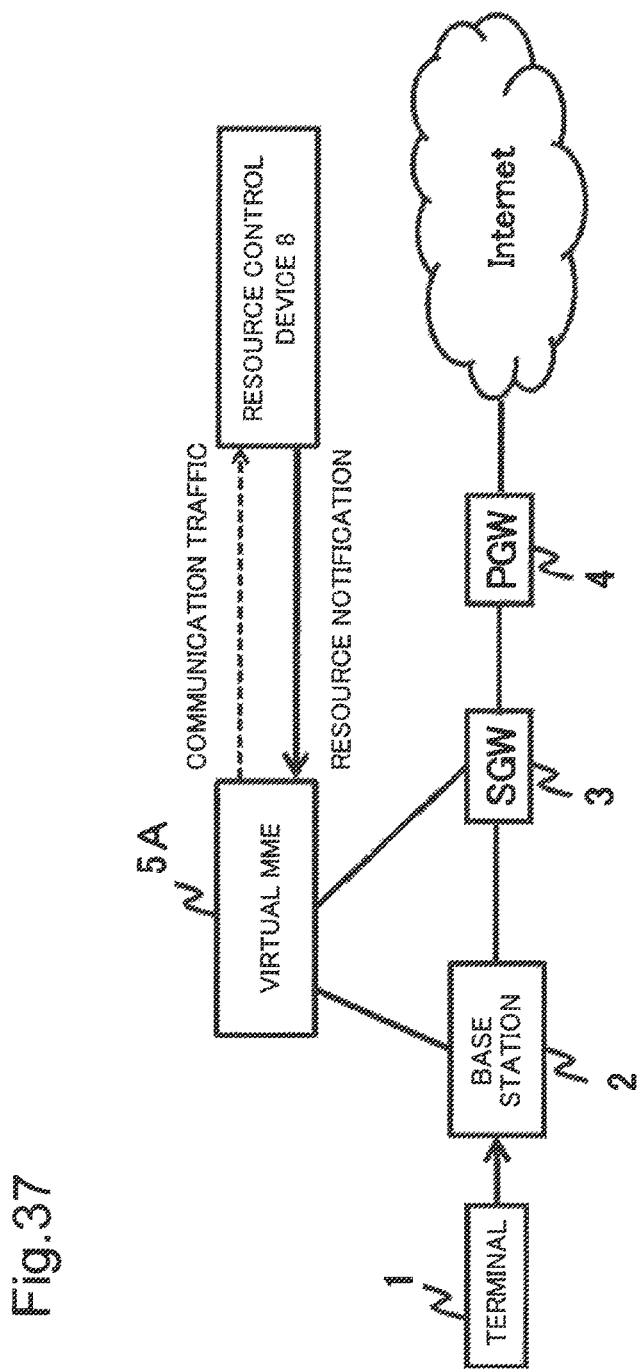
FIG. 37 illustrates a configuration example of a communication system of a seventh example embodiment.

FIG. 37 illustrates a configuration example of a communication system of the seventh example embodiment. As exemplified in FIG. 37, the communication system of the seventh example embodiment includes the base station 2, the S-GW 3, the P-GW 4, the virtual MME 5A, and the resource control device 8. Since the base station 2, the S-GW 3, and the P-GW 4 have the same functions as those of the base station 2, the S-GW 3, and the P-GW 4 exemplified in FIG. 1 or the like, a detailed description thereof will be omitted. Network functions of the respective ones of the base station 2, the S-GW 3, and the P-GW 4 may be performed, as virtual network nodes 7A, by software such as a virtual machine or the like.

Figure 38:
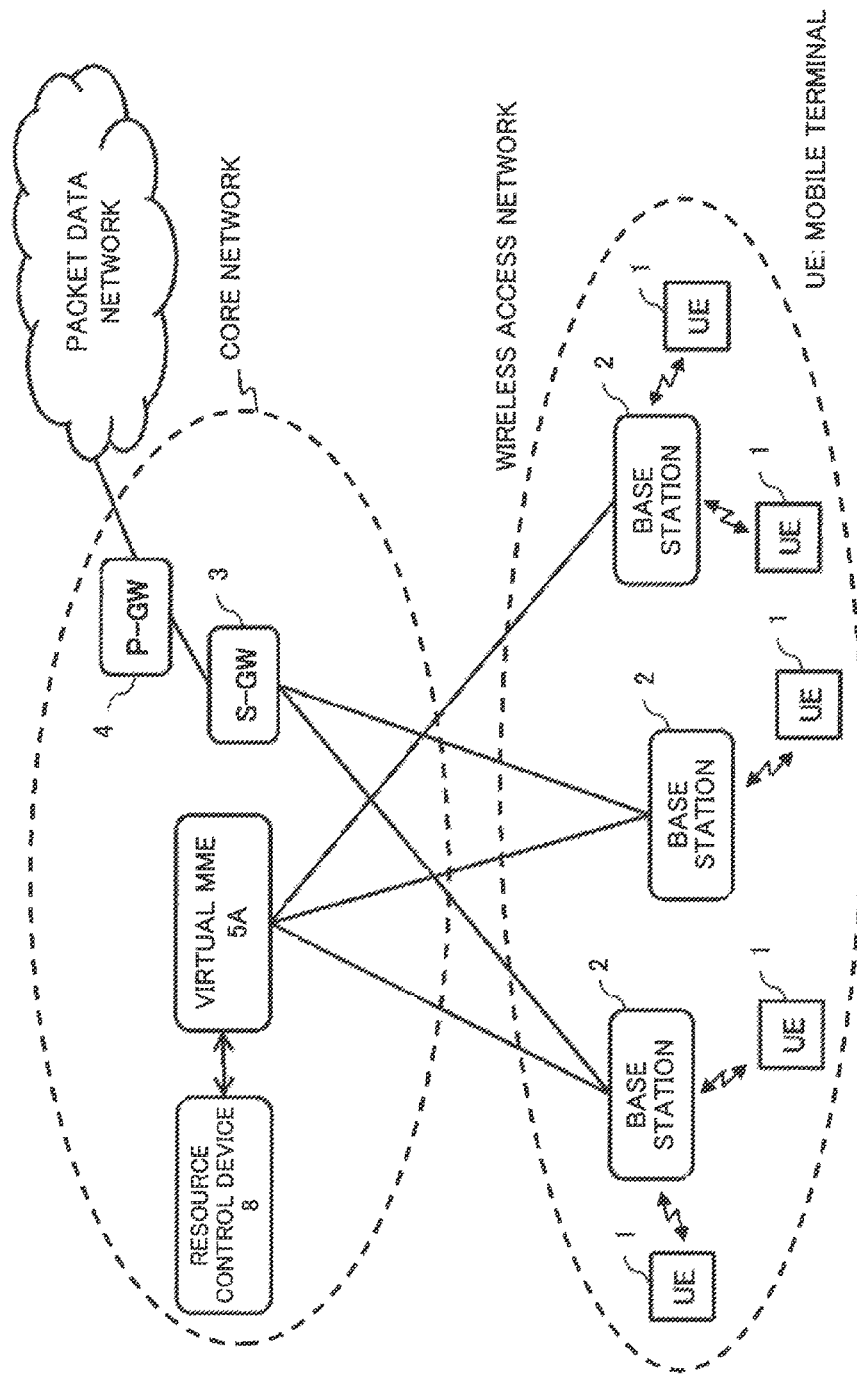
FIG. 38 is another configuration example of the communication system of the seventh example embodiment.

FIG. 38 is another configuration example of the communication system of the seventh example embodiment. As exemplified in FIG. 38, the communication system of the seventh example embodiment includes a plurality of terminals (UE) 1, a plurality of base stations 2, the S-GW 3, the P-GW 4, the virtual MME 5A, and the resource control device 8.

The virtual MME 5A collects traffic data from the plurality of base stations 2 and the S-GW 3 and communicates the collected traffic data to the resource control device 8, as illustrated in FIG. 38. The virtual MME 5A may collect traffic data from the P-GW 4 via the S-GW 3. Alternatively, the virtual MME 5A may collect traffic data directly from the P-GW 4. The virtual MME 5A, on the basis of an amount of resources of the own device (the virtual MME 5A) communicated from the resource control device 8, controls the amount of resources of the own device (the virtual MME 5A).

Figure 39:
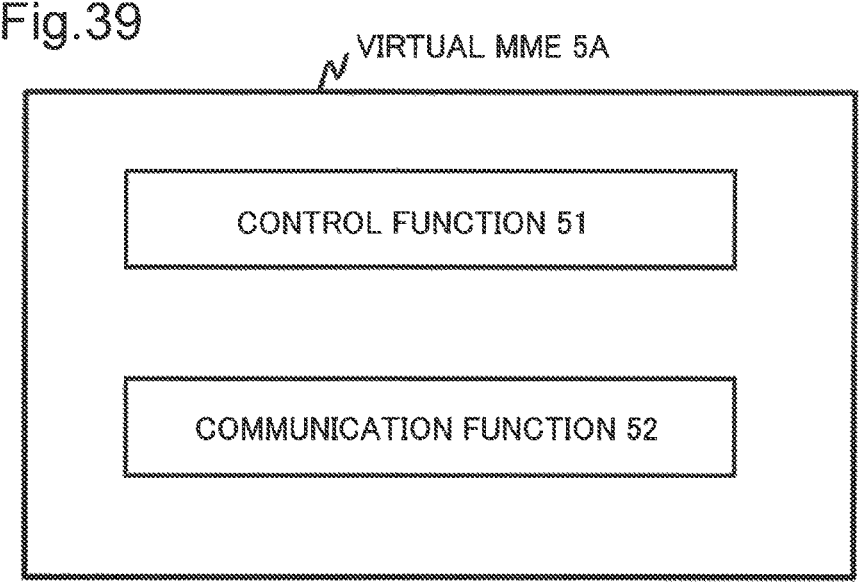
FIG. 39 is a diagram illustrating a configuration example of a virtual MME 5A in the seventh example embodiment.

FIG. 39 is a diagram illustrating a configuration example of the virtual MME 5A in the seventh example embodiment.

As exemplified in FIG. 39, in the seventh example embodiment, the virtual MME 5A includes a control function 51 and a communication function 52.

The control function 51 of the virtual MME 5A has functions that correspond to the C-Plane. The C-Plane contains functions of processing control signaling, such as setting up and release of sessions for communication, control of handover, or the like. The control function 51 transmits and receives control signaling via the communication function 52. The control function 51 collects traffic data from the respective ones of the base station 2, the S-GW 3, and the P-GW 4 and communicates the collected traffic data to the resource control device 8 via the communication function 52. The control function 51 communicates the collected traffic data to the resource control device 8 via the communication function 52, for example, every time traffic data are collected.

The control function 51 performs provisioning of resources of the own device (the virtual MME 5A) based on an amount of resources of the virtual MME 5A communicated from the resource control device 8. The control function 51, for example, requests the server 20 that operates virtual machines to allocate resources to the own device (the virtual MME 5A) based on the calculated amount of resources.

Figure 40:
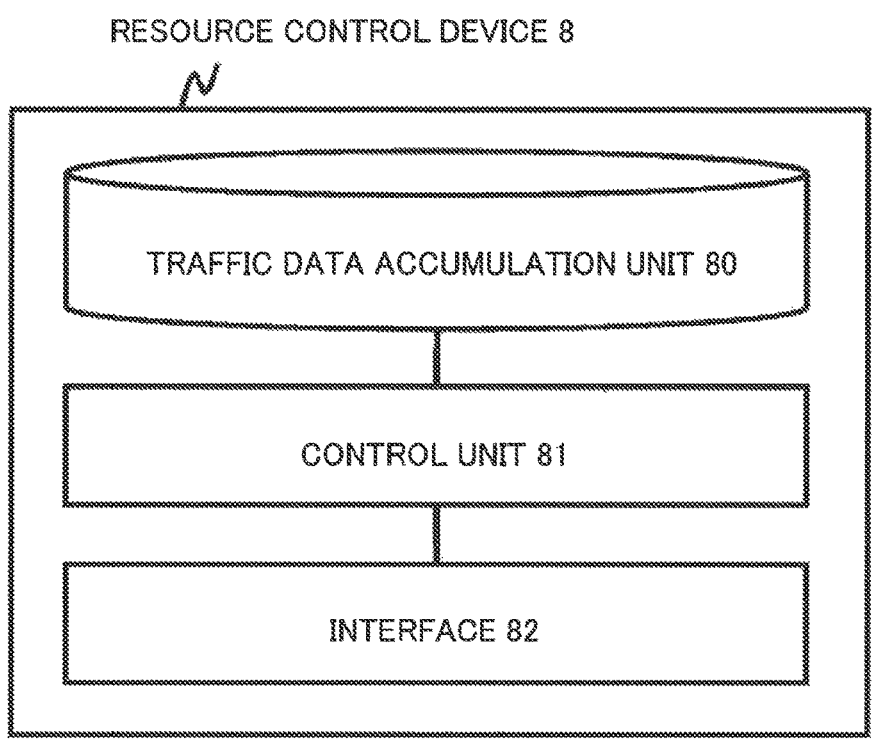
FIG. 40 is a diagram illustrating a configuration example of a resource control device 8 in the seventh example embodiment.

FIG. 40 is a diagram illustrating a configuration example of the resource control device 8 in the seventh example embodiment. As exemplified in FIG. 40, in the seventh example embodiment, the resource control device 8 includes a traffic data accumulation unit 80, a control unit 81, and an interface 82.

The interface 82 is an interface to communicate with the virtual MME 5A. The resource control device 8 is capable of communicating with the virtual MME 5A using a predetermined protocol via the interface 82. The resource control device 8, for example, receives a communication of traffic data from the virtual MME 5A via the interface 82. The resource control device 8, for example, communicates a calculated amount of resources required for the virtual MME 5A to the virtual MME 5A via the interface 82.

The traffic data accumulation unit 80, for example, stores the traffic data communicated from the virtual MME 5A. The traffic data accumulation unit 80 may store the traffic data communicated from the virtual MME 5A, for example, with respect to each of the base station 2, the S-GW 3, and the P-GW 4. The traffic data accumulation unit 80 may store the traffic data communicated from the virtual MME 5A, for example, with respect to each collection time.

The control unit 81 extracts a traffic feature value using the traffic data stored in the traffic data accumulation unit 80. In the above, the control unit 81 extracts a traffic feature value in the same manner as in the case of the control unit 61 illustrated in FIG. 5.

The control unit 81 calculates an amount of resources of the virtual MME 5A required for satisfying a predetermined condition based on the extracted traffic feature value. The predetermined condition is, for example, a condition that requires a processing delay in signal processing in the virtual MME 5A to be not more than a predetermined threshold value (satisfying an acceptable level). In the above, the control unit 81 calculates an amount of resources of the virtual MME 5A in the same manner as in the case of the control unit 61 illustrated in FIG. 5.

The control unit 61 communicates the calculated amount of resources to the virtual MME 5A via the interface 82.

Figure 41:
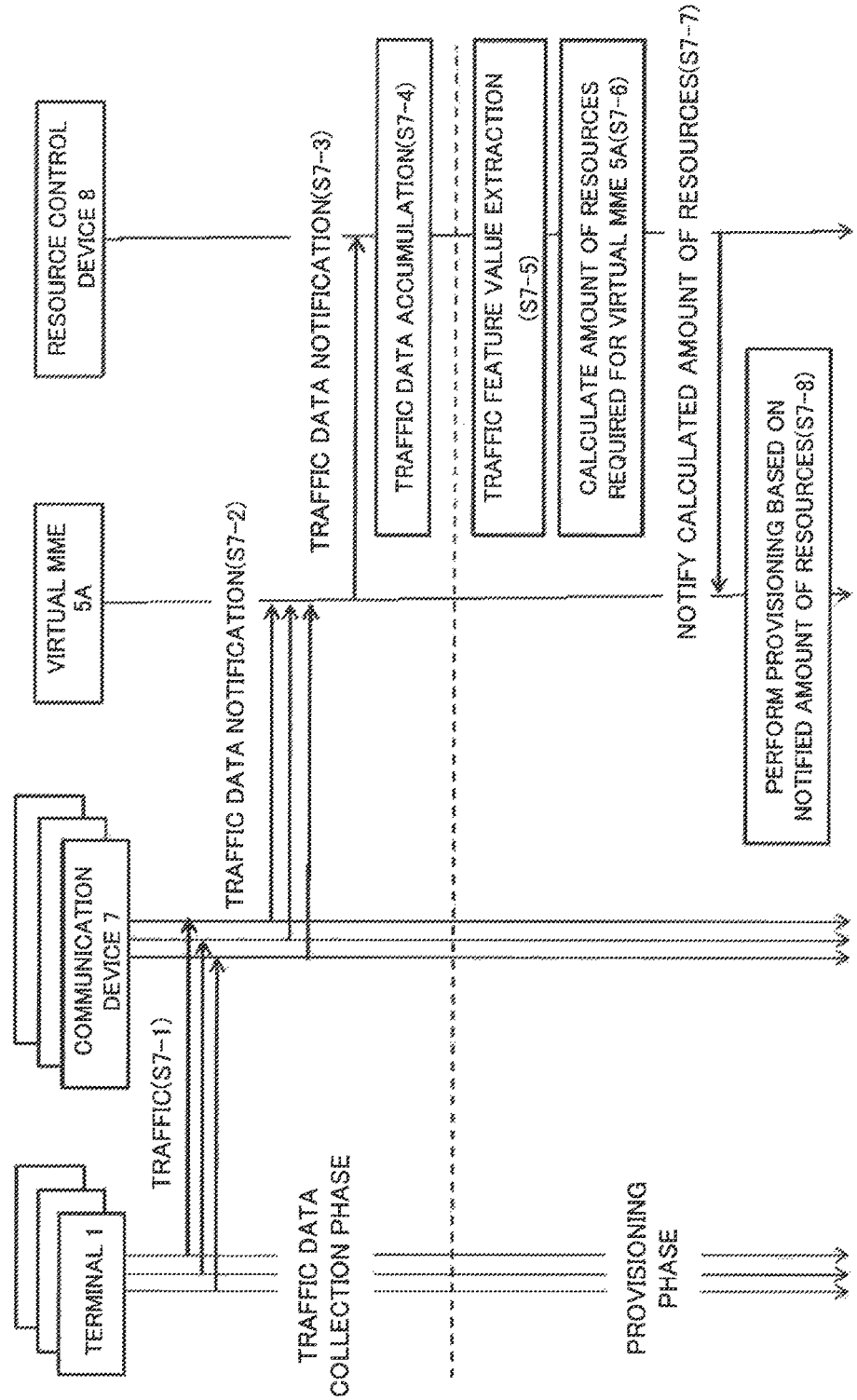
FIG. 41 is a sequence chart illustrating an operation example of the communication system of the seventh example embodiment.

FIG. 41 is a sequence chart illustrating an operation example of the communication system of the seventh example embodiment.

Although, in FIG. 41, the description will be made using an example including communication devices 7, the same description may apply to a case in which the communication devices 7 are replaced by the virtual network nodes 7A.

A communication unit(s) 11 of the terminal(s) 1, for example, perform(s) communication with the communication devices 7 (traffic in S7-1). The communication unit(s) 11 of the terminal(s) 1, for example, transmit(s) at least one of traffic of control signals and traffic of user data to the communication devices 7.

A control unit 70 of each communication device 7 communicates traffic data, which are information relating to at least one of traffic of control signals and traffic of user data, to the virtual MME 5A (S7-2). The control unit 70 communicates traffic data to the virtual MME 5A, for example, at a predetermined timing.

The control function 51 of the virtual MME 5A communicates the traffic data communicated from the communication devices 7 to the resource control device 8 (S7-3). The control function 51 communicates the traffic data to the resource control device 8, for example, at a predetermined timing.

The control unit 81 of the resource control device 8 accumulates the traffic data communicated from the virtual MME 5A in the traffic data accumulation unit 80 (S7-4). The control unit 81 extracts a traffic feature value based on the traffic data accumulated in the traffic data accumulation unit 80 (S7-5). The control unit 81, for example, calculates a burstiness index of packets as a traffic feature value based on the accumulated traffic data, using the equation (2).

The control unit 81 calculates an amount of resources required for the virtual MME 5A based on the extracted traffic feature value (S7-6). The control unit 81, for example, calculates an amount of resources of the virtual MME 5A required for the mean delay E of the virtual MME 5A to be lower than an acceptable level D (a predetermined threshold value) based on the extracted burstiness index B and the relationships in FIG. 7.

The control unit 81 communicates the calculated amount of resources to the virtual MME 5A via the interface 82 (S7-7).

The control function 51 of the virtual MME 5A acquires an amount of resources of the virtual MME 5A based on the communicated amount of resources (S7-8).

As described above, in the seventh example embodiment of the present invention, the resource control device 8 calculates an amount of resources required for the virtual MME 5A based on traffic data that the virtual MME 5A has collected from the base station 2, the S-GW 3, the P-GW 4, or the like. Based on receiving the notice of the amount of resources which is calculated by the resource control device 8, the virtual MME 5A may enable at least one of preventing a delay or the like, generated due to characteristics of traffic such as burstiness or the like, in processing of control signals, and improving the stability of the network by acquiring the amount of resources.

<Eighth Example Embodiment>

An eighth example embodiment of the present invention will be described with reference to the drawings. A technique used in the eighth example embodiment is applicable to techniques of both the above-described respective example embodiments and example embodiments that will be described later.

The eighth example embodiment of the present invention relates to calculation of an amount of resources of and resource control performed by CSCFs (Call Session Control Function) that provide session control functions in an IMS (IP (Internet Protocol) Multimedia Subsystem) network.

Figure 42:
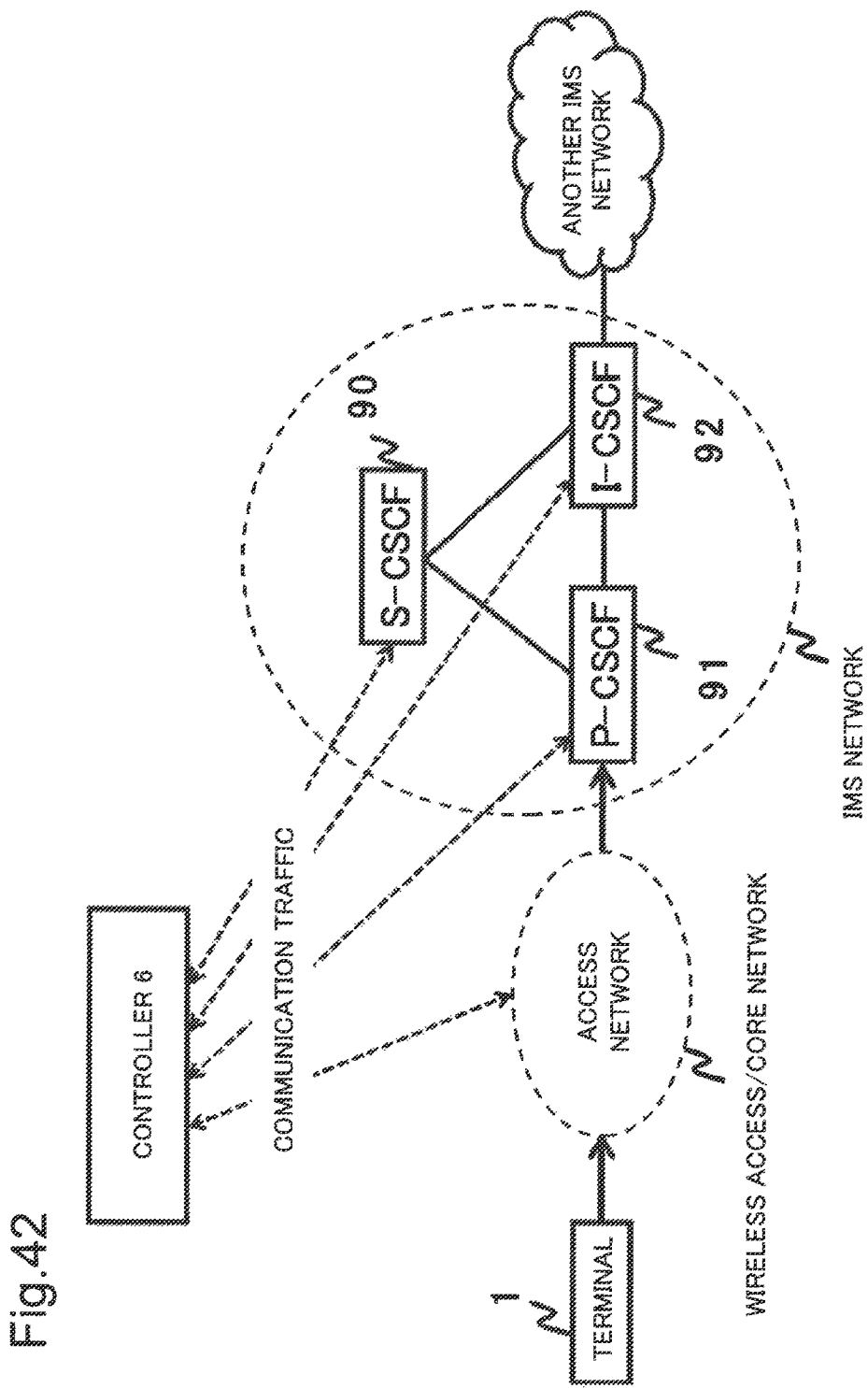
FIG. 42 illustrates a configuration example of a communication system of an eighth example embodiment.

FIG. 42 illustrates a configuration example of a communication system of the eighth example embodiment. As exemplified in FIG. 42, the communication system of the eighth example embodiment includes a terminal 1, an access network, a controller 6, communication devices, and another IMS network. In this case, the communication devices are, for example, an S-CSCF (Serving-CSCF) 90, a P-CSCF (Proxy-CSCF) 91, and an I-CSCF (Interrogating-CSCF) 92, which are CSCFs that provide session control functions in the IMS network. In the description hereinafter set forth, the communication devices are collectively referred to as communication devices 9.

Since the terminal 1 has the same functions as those of the terminal 1 exemplified in FIG. 1 or the like, a detailed description thereof will be omitted.

The access network includes a wireless access network and a core network. The access network includes, for example, the communication devices 7 (the base station 2, the S-GW 3, the P-GW 4, the MME 5, and the like) exemplified in FIG. 1 or the like. Network functions of each communication device 7 included in the access network may be performed, as a virtual network node 7A, by software such as a virtual machine or the like.

Each of the S-CSCF 90, the P-CSCF 91, and the I-CSCF 92 is capable of processing SIP (Session Initiation Protocol) signals.

The S-CSCF 90 performs session control and user authentication using subscriber information (user information) of the communication system, which is obtained from an HSS (Home Subscriber Server). The S-CSCF 90 has functions of, for example, receiving a session initiation signal from the terminal 1, selecting an application server (AS: Application Server) appropriate for a service, and relaying SIP signals to the application server. When, for example, the terminal 1 designates a communication destination using a phone number thereof, the S-CSCF 90 has a function of performing routing based on the phone number.

For control of media such as voices, images, and the like, the S-CSCF 90, for example, relays SIP signals from an application server (AS) to an MRFC (MRF Controller) included in an MRF (Media Resource Function), which provides functions of media control.

The S-CSCF 90, for example, transmits and receives SIP signals, which are transmitted to and received from the another network, with an MGCF (Media Gateway Controller Function), which performs conversion between call control protocols.

The P-CSCF 91 is arranged at the connection point between the IMS network and the access network. When, for example, the access network is made up of an LTE (Long Term Evolution) network and an EPC (Evolved Packet Core) network, the P-CSCF 91 is connected to the P-GW 4. When, for example, the access network is a W-CDMA (Wideband CDMA (Code Division Multiple Access)) network, the P-CSCF 91 is connected to a GGSN (Gateway GPRS (General Packet Radio Service) Support Node). In this case, the GGSN has a function of controlling connection with an external IP (Internet Protocol) network in accordance with a connection request from the terminal 1.

The P-CSCF 91, for example, relays SIP signals that are transmitted and received among the terminal 1, the S-CSCF 90, and the I-CSCF 92. The P-CSCF 91, for example, performs confirmation of the validity of a SIP signal transmitted from the terminal 1 and adds information (for example, charging information and the like) required for session control to the SIP signal for the S-CSCF 90. The P-CSCF 91, for example, communicates an application type, which is required for performing QoS (Quality of Service) control in the IMS, to a PCEF (Policy and Charging Enforcement Function), which provides functions of enforcing a policy and performing charging.

The I-CSCF 92, for example, relays SIP signals that are transmitted and received between the another network and the S-CSCF 90. The I-CSCF 92, for example, selects an S-CSCF 90 in accordance with user information in the HSS when registration to the IMS network or session control is performed.

The controller 6 has the same functions as those of the controller exemplified in FIG. 5.

A control unit 61 of the controller 6 collects traffic data from at least one of the communication devices 7 included in the access network and the communication devices 9, and stores the collected traffic data in a traffic data accumulation unit 60. The control unit 61 extracts a traffic feature value from the traffic data stored in the traffic data accumulation unit 60. The control unit 61 calculates an amount of resources of each communication device 9 (the S-CSCF 90, the P-CSCF 91, and the I-CSCF 92) required for satisfying a predetermined condition based on the extracted traffic feature value. The predetermined condition is, for example, a condition that requires a processing delay in signal processing in each communication device 9 to be not more than a predetermined threshold value ((satisfying an acceptable level). In the above, the functions of the control unit 61 are the same as the functions of the control unit 61 illustrated in FIG. 5 or the like.

Figure 43:
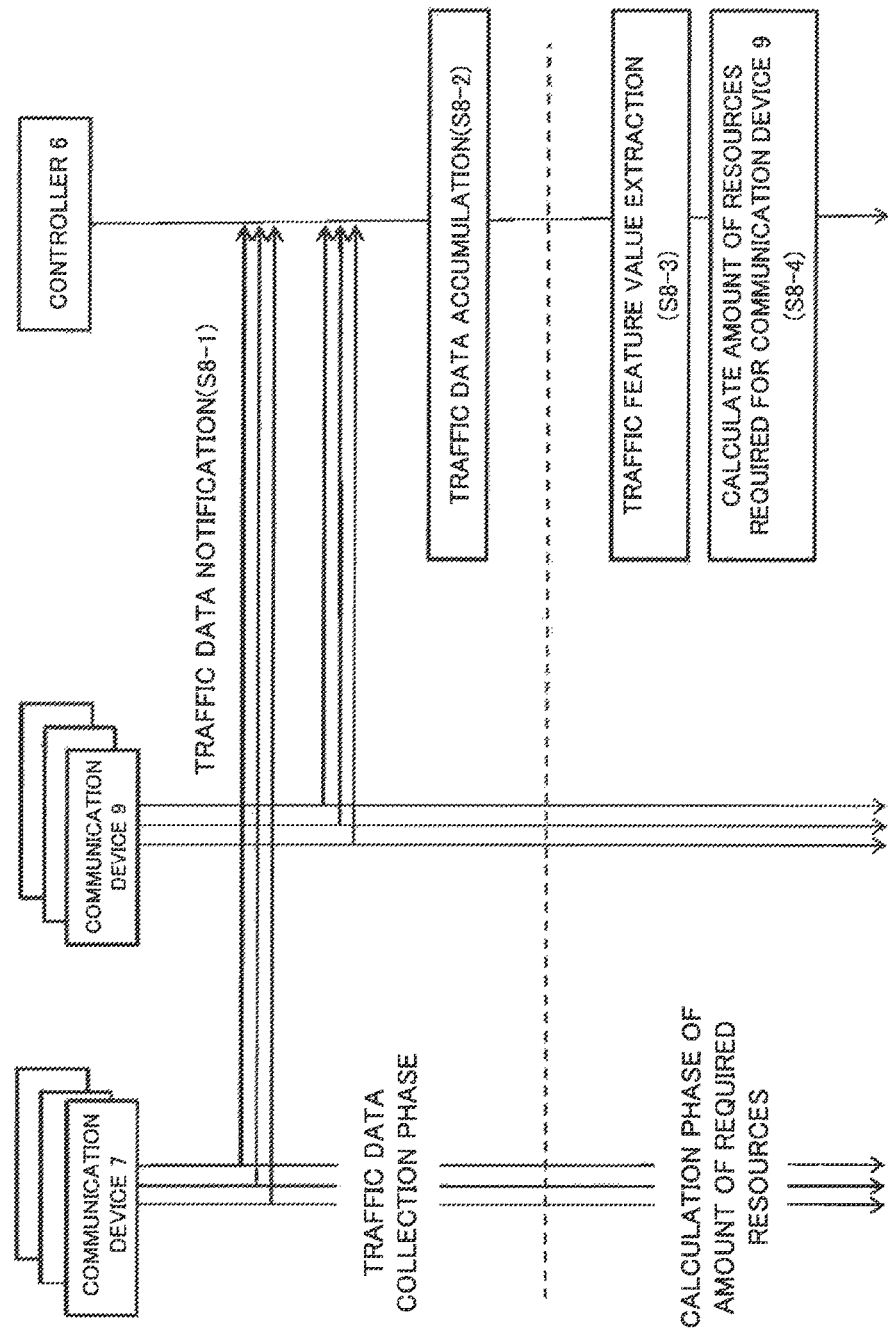
FIG. 43 is a sequence chart illustrating an operation example of the communication system of the eighth example embodiment.

FIG. 43 is a sequence chart illustrating an operation example of the communication system exemplified in FIG. 42.

At least one of the communication devices 7 included in the access network and the communication devices 9 communicates traffic data, which are information relating to at least one of traffic of control signals and traffic of user data, to the controller 6 (S8-1). At least one of the communication devices 7 and the communication devices 9 communicates the traffic data to the controller 6, for example, at a predetermined timing.

The control unit 61 of the controller 6 accumulates the communicated traffic data in the traffic data accumulation unit 60 (S8-2).

The control unit 61 of the controller 6 extracts a traffic feature value based on the traffic data accumulated in the traffic data accumulation unit 60 (S8-3). The control unit 61, for example, calculates a burstiness index of packets as a traffic feature value based on the accumulated traffic data, using the equation (2).

The control unit 61 of the controller 6 calculates an amount of resources required for each communication device 9 based on the extracted traffic feature value (S8-4).

Figure 44:
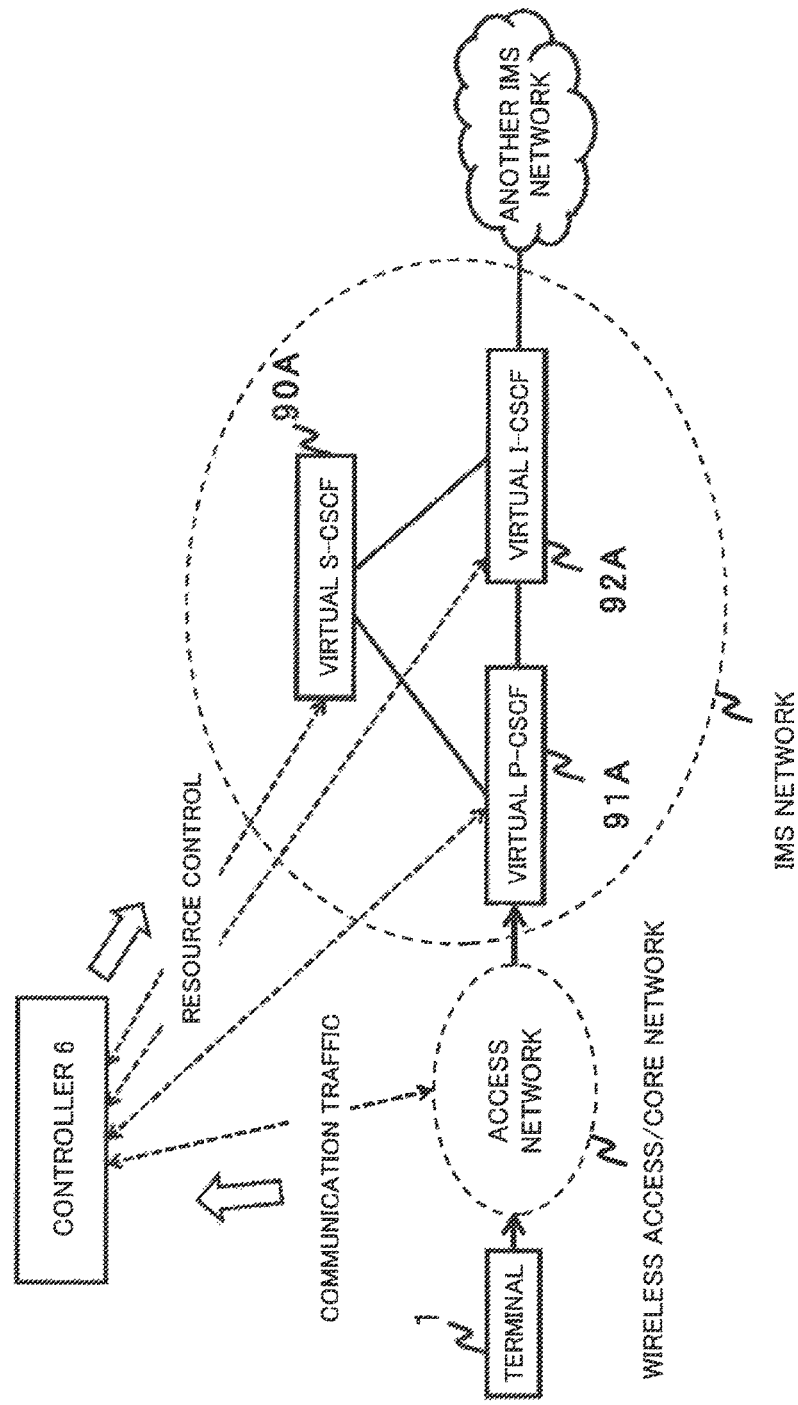
FIG. 44 is another configuration example of the communication system of the eighth example embodiment.

FIG. 44 illustrates another configuration example of the communication system of the eighth example embodiment. In FIG. 44, the terminal 1, the access network, and the another IMS network have the same configuration as the configuration example exemplified in FIG. 42.

As exemplified in FIG. 44, in the another configuration example of the eighth example embodiment, the respective network functions of the communication devices 9 are performed by software such as a virtual machine or the like as virtual network nodes 9A (a virtual S-CSCF 90A, a virtual P-CSCF 91A, and a virtual I-CSCF 92A). In the configuration, the virtual network nodes 9A may be arranged at a location in a geographically concentrated manner or at a plurality of locations in a distributed manner. In the configuration, the virtual network nodes 9A are, for example, achieved by the server 20 exemplified in the respective ones of FIGS. 14 to 18.

The controller 6 has the same functions as those of the controller 6 exemplified in FIG. 13.

A control unit 61A of the controller 6 performs provisioning of resources of each virtual network node 7A. The control unit 61A, for example, requests the server 20 that operates virtual machines to allocate resources to each virtual network node 9A based on a calculated amount of resources. Alternatively, the control unit 61A, for example, requests to allocate resources (server resources, CPU resources, network resources, or the like) to each virtual network node 9A based on a calculated amount of resources. For example, the control unit 61A requests to allocate resources to the virtual S-CSCF 90A based on a calculated amount of resources of the virtual S-CSCF 90A.

Figure 45:
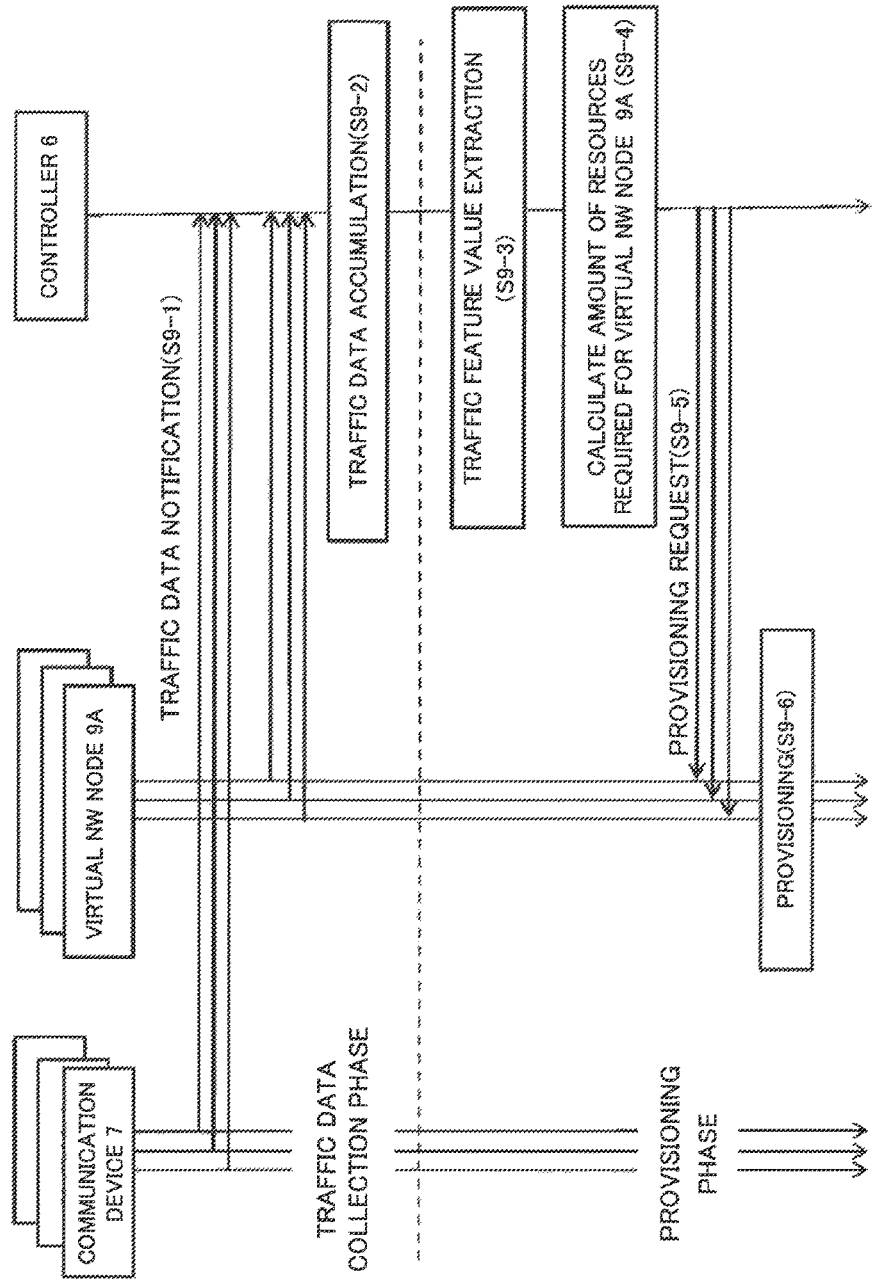
FIG. 45 is a sequence chart illustrating an operation example of the communication system of the eighth example embodiment.

FIG. 45 is a sequence chart illustrating an operation example of the communication system exemplified in FIG. 44.

The virtual network nodes 9A communicate traffic data, which are information relating to at least one of traffic of control signals and traffic of user data, to the controller 6 (S9-1). The virtual network nodes 9A communicate traffic data to the controller 6, for example, at the afore-described predetermined timing, such as with a predetermined period, in response to a request from the controller 6, or at a timing when predetermined traffic data are collected.

The control unit 61A of the controller 6 accumulates the communicated traffic data in the traffic data accumulation unit 60 (S9-2).

The control unit 61A of the controller 6 extracts a traffic feature value based on the traffic data accumulated in the traffic data accumulation unit 60 (S9-3). For example, the control unit 61A calculates a burstiness index of packets as a traffic feature value based on the accumulated traffic data, using the equation (2).

The control unit 61A of the controller 6 calculates an amount of resources required for each virtual network node 9A based on the extracted traffic feature value (S9-4).

The control unit 61A of the controller 6 requests the server 20 that operates virtual machines to allocate resources to each virtual network node 9A based on the amount of resources that the control unit 61 has calculated (provisioning request in S9-5). For example, the control unit 61A requests the server 20 to allocate resources to the virtual S-CSCF 90A based on an amount of resources of the virtual S-CSCF 90A that the control unit 61A has calculated.

A control unit 210 of the server 20, in response to the request from the controller 6, allocates an amount of resources, based on the request, to each virtual network node 9A (provisioning in S9-6).

As described above, in the eighth example embodiment of the present invention, the controller 6 performs resource control of the CSCFs (resource control of the communication devices 9 or the virtual network nodes 9A) based on a traffic feature value extracted from traffic data. Therefore, in the eighth example embodiment, it may enable at least one of, for example, preventing a processing delay or the like of the CSCFs (the communication devices 9 or the virtual network nodes 9A), generated due to characteristics of traffic such as burstiness or the like, and improving the stability of the network.

<Ninth Example Embodiment>

A ninth example embodiment of the present invention will be described with reference to the drawings. A technique used in the ninth example embodiment is applicable to techniques of both the above-described respective example embodiments and example embodiments that will be described later.

The ninth example embodiment of the present invention relates to calculation of an amount of resources of and resource control of an HSS.

Figure 46:
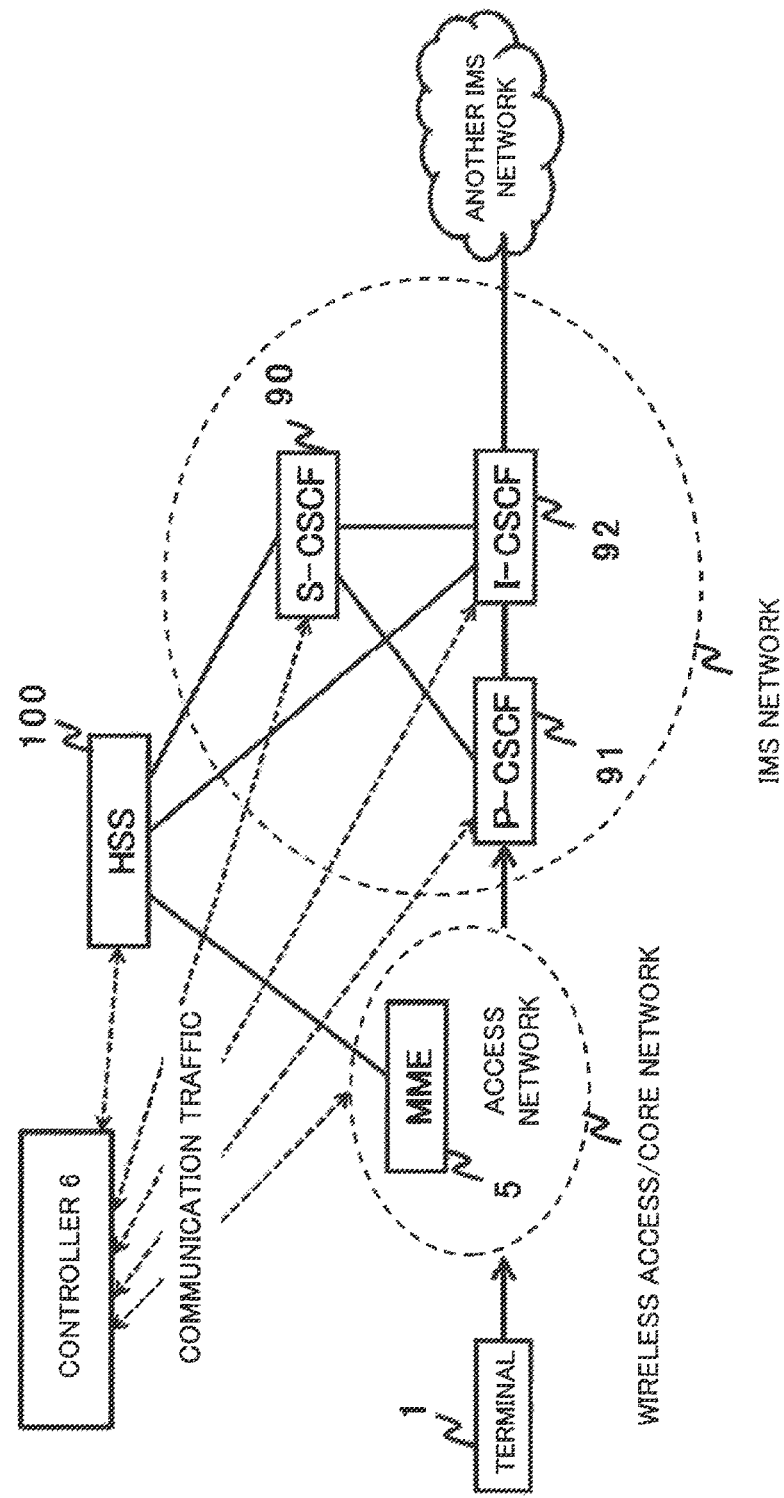
FIG. 46 is a configuration example of a communication system of a ninth example embodiment.

FIG. 46 illustrates a configuration example of a communication system of the ninth example embodiment. As exemplified in FIG. 46, the communication system of the ninth example embodiment includes a terminal 1, an access network, a controller 6, communication devices 9 (an S-CSCF 90, a P-CSCF 91, and an I-CSCF 92), another IMS network, and an HSS 100.

The access network includes an MME 5. Since the MME 5 has the same functions as those of the MME 5 exemplified in FIG. 1, a detailed description thereof will be omitted. The MME 5 processes control signaling in cooperation with the HSS 100, which manages subscriber information of the communication system. In this case, network functions of the MME 5 may be performed by software such as a virtual machine or the like as a virtual MME 5A.

Since the communication devices 9 (the S-CSCF 90, the P-CSCF 91, and the I-CSCF 92) have the same functions as those of the communication devices 9 (the S-CSCF 90, the P-CSCF 91, and the I-CSCF 92) exemplified in FIG. 42 or the like, a detailed description thereof will be omitted. In this case, network functions of the communication devices 9 (the respective ones of the S-CSCF 90, the P-CSCF 91, and the I-CSCF 92) may be performed by software such as a virtual machine or the like as virtual network nodes 9A (a virtual S-CSCF 90A, a virtual P-CSCF 91A, and a virtual I-CSCF 92A).

The HSS 100 manages subscriber information of the communication system. The HSS 100, for example, stores information relating to subscribers of the communication system and performs authentication and authorization of a user of the terminal 1. The HSS 100, for example, provides another device (for example, the MME 5) with the position information or the IP information of the terminal 1. In this case, network functions of the HSS 100 may be performed by software such as a virtual machine or the like as a virtual HSS 100A.

Figure 47:
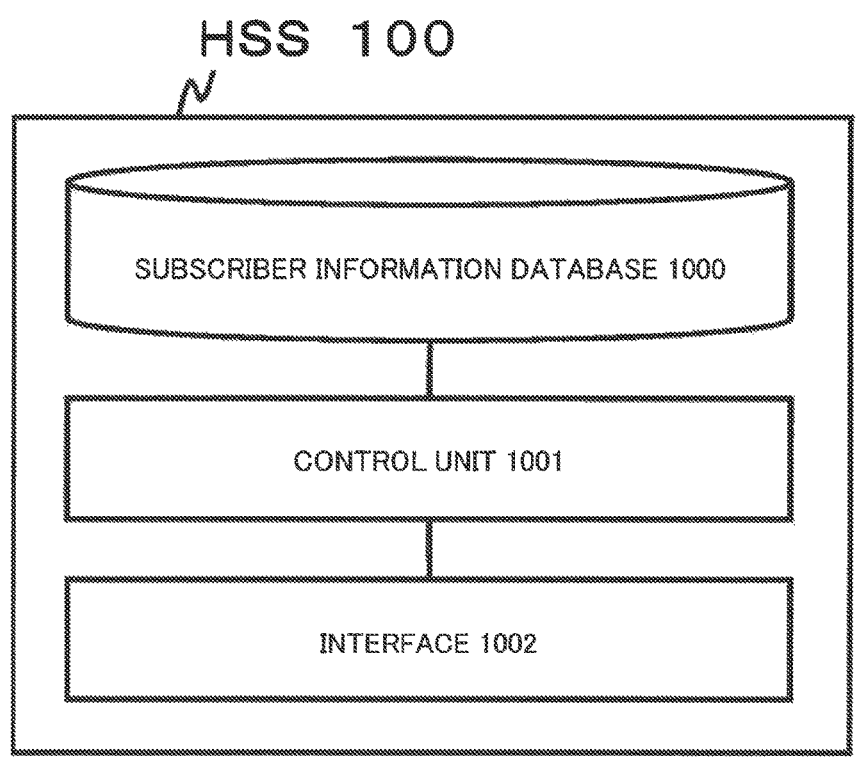
FIG. 47 illustrates a configuration example of an HSS (Home Subscriber Server) 100 in the ninth example embodiment.

FIG. 47 is a diagram illustrating a configuration example of the HSS 100. In the ninth example embodiment, the HSS 100 includes a subscriber information database 1000, a control unit 1001, and an interface 1002.

The subscriber information database 1000 holds user information and subscriber information of the communication system. The subscriber information database 1000 holds, for example, IMSIs (International Mobile Subscriber Identity), which are used for identification of users, and MSISDNs (Mobile Subscriber Integrated Services Digital Network Number), which correspond to phone numbers of users. The subscriber information database 1000 holds, for example, IMPIs (IP Multimedia Private Identity) and IMPUs (IP Multimedia Public Identity). The subscriber information database 1000 also holds other information relating to users and subscribers.

The control unit 1001 has functions that correspond to the C-Plane. The control unit 1001 transmits and receives control signaling via the interface 1002. The control unit 1001, for example, performs authentication and authorization of a user of the terminal 1 referring to the subscriber information database 1000. The control unit 1001, for example, provides another device (for example, the MME 5) with the position information or the IP information of the terminal 1 referring to the subscriber information database 1000.

The interface 1002 is an interface to communicate with the MME 5, the S-CSCF 90, the I-CSCF 92, and the like. The HSS 100 is capable of communicating with the MME 5, the S-CSCF 90, the I-CSCF 92, and the like using a predetermined protocol via the interface 1002. The HSS 100 is capable of communicating with the S-CSCF 90 and the I-CSCF 92 using, for example, the Diameter protocol via the interface 1002. The controller 6 has the same functions as those of the controller exemplified in FIG. 5.

A control unit 61 of the controller 6 collects traffic data from at least one of the MME 5 included in the access network and the communication devices 9 (the S-CSCF 90, the P-CSCF 91, and the I-CSCF 92) and stores the collected traffic data in a traffic data accumulation unit 60. The control unit 61 extracts a traffic feature value from the traffic data stored in the traffic data accumulation unit 60. The control unit 61 calculates an amount of resources of the HSS 100 required for satisfying a predetermined condition based on the extracted traffic feature value. The predetermined condition is, for example, a condition that requires a processing delay in signal processing in the HSS 100 to be not more than a predetermined threshold value (satisfying an acceptable level).

Figure 48:
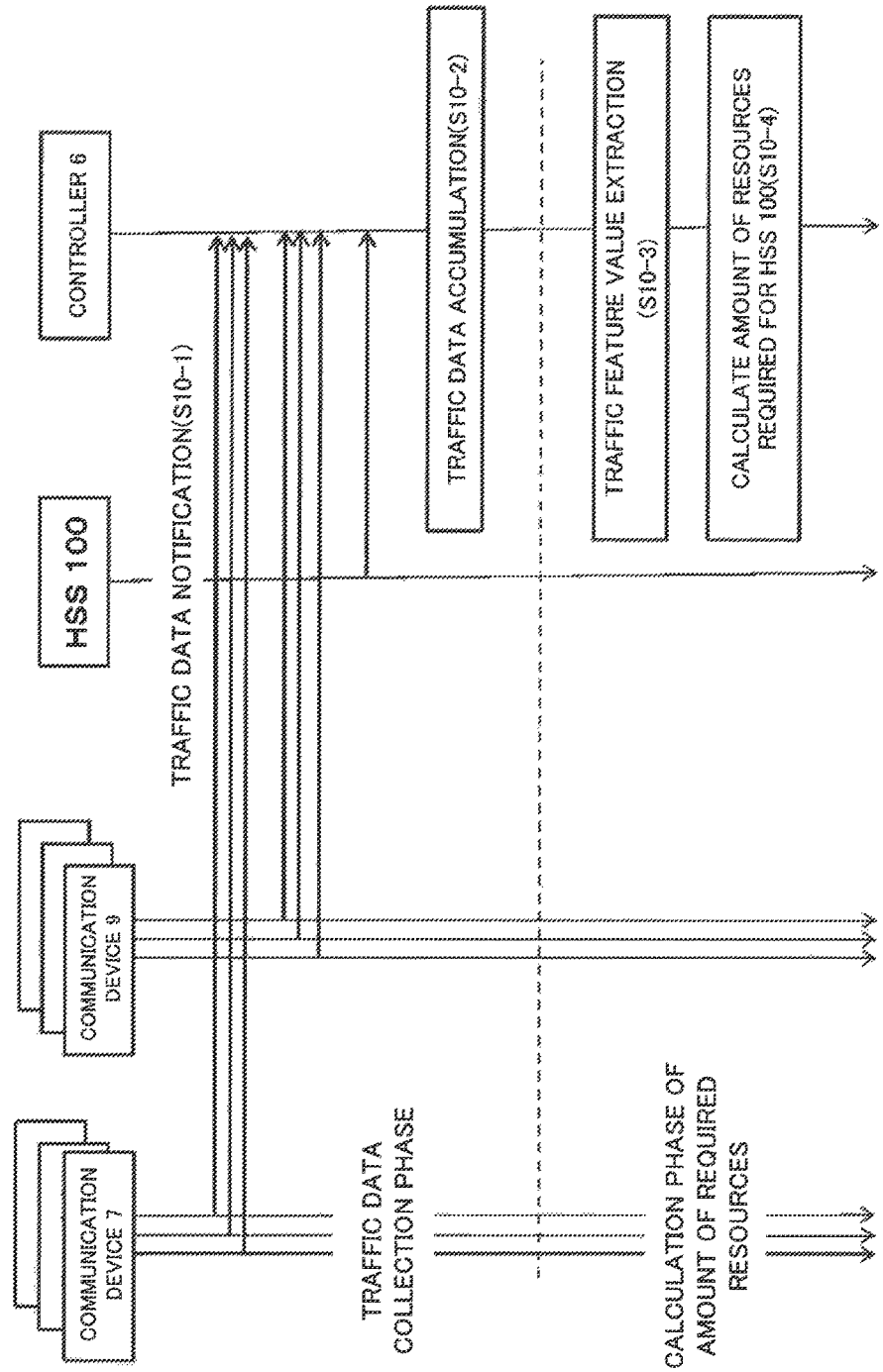
FIG. 48 is a sequence chart illustrating an operation example of the communication system of the ninth example embodiment.

FIG. 48 is a sequence chart illustrating an operation example of the communication system exemplified in FIG. 46. Although, in FIG. 48, the description will be made using an example in which the HSS 100 is used, the same description may apply to a case in which the HSS 100 is replaced by the virtual HSS 100A.

At least one of the MME 5 included in the access network, the communication devices 9 (the S-CSCF 90, the P-CSCF 91, and the I-CSCF 92), and the HSS 100 communicates traffic data, which are information relating to at least one of traffic of control signals and traffic of user data, to the controller 6 (S10-1). At least one of the MME 5, the communication devices 9, and the HSS 100 communicates the traffic data, for example, at a predetermined timing.

The control unit 61 of the controller 6 accumulates the communicated traffic data in the traffic data accumulation unit 60 (S10-2).

The control unit 61 of the controller 6 extracts a traffic feature value based on the traffic data accumulated in the traffic data accumulation unit 60 (S10-3). The control unit 61, for example, calculates a burstiness index of packets as a traffic feature value based on the accumulated traffic data, using the equation (2).

The control unit 61 of the controller calculates an amount of resources required for the HSS 100 based on the extracted traffic feature value (S10-4).

Figure 49:
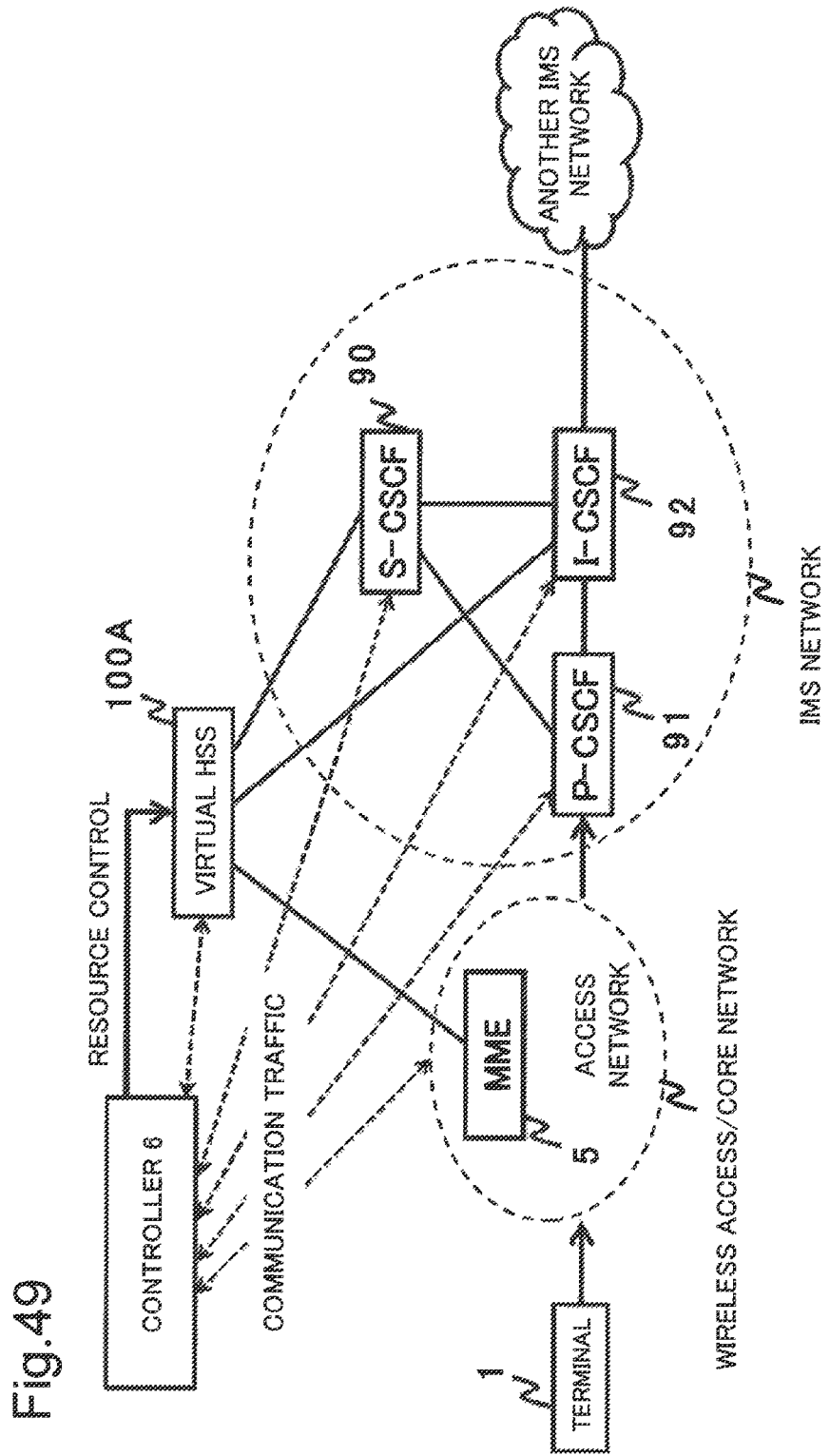
FIG. 49 is another configuration example of the communication system of the ninth example embodiment.

FIG. 49 illustrates another configuration example of the communication system of the ninth example embodiment. In FIG. 49, the terminal 1, the access network, the controller 6, the communication devices 9 (the S-CSCF 90, the P-CSCF 91, and the I-CSCF 92), and the another IMS network have the same configuration as the configuration example exemplified in FIG. 46.

As exemplified in FIG. 49, in the another configuration example of the ninth example embodiment, network functions of the HSS 100 are performed by software such as a virtual machine or the like as a virtual HSS 100A. In this case, the virtual HSS 100A is achieved by the server 20 exemplified in, for example, the respective ones of FIGS. 14 to 18.

Figure 50:
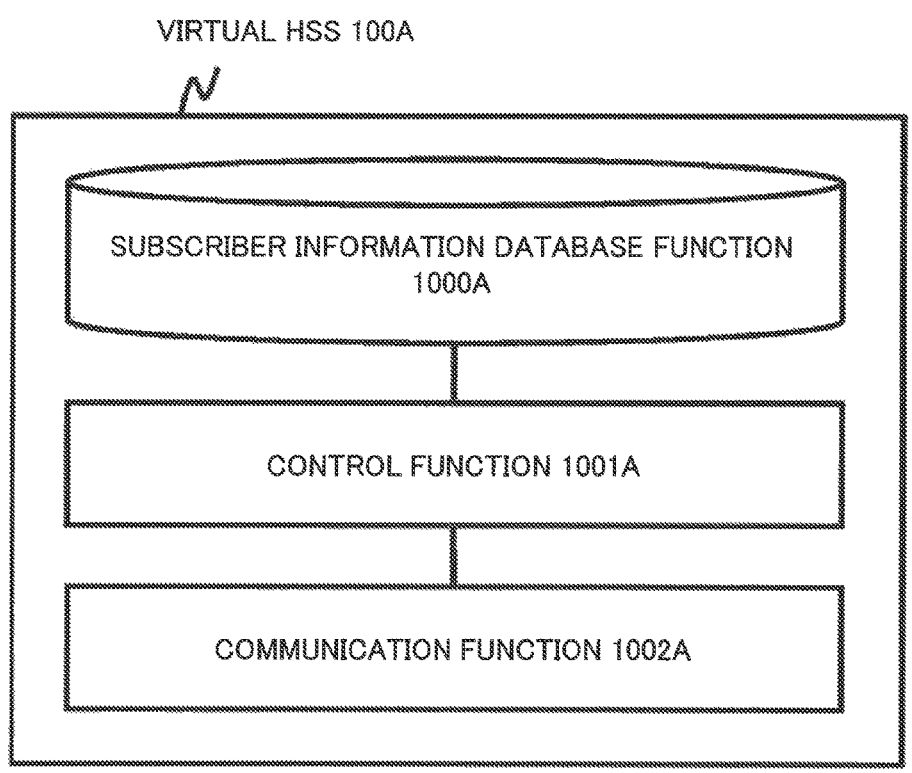
FIG. 50 illustrates a configuration example of a virtual HSS 100A in the ninth example embodiment.

FIG. 50 is a diagram illustrating a configuration example of the virtual HSS 100A. The virtual HSS 100A includes a subscriber information database function 1000A, a control function 1001A, and a communication function 1002A.

The subscriber information database function 1000A holds user information and subscriber information of the communication system. Since the subscriber information database function 1000A has the same functions as those of the subscriber information database 1000 of the HSS 100 illustrated in FIG. 47, a detailed description thereof will be omitted.

The control function 1001A has functions that correspond to the C-Plane. Since the control function 1001A has the same functions as those of the control unit 1001 of the HSS 100 illustrated in FIG. 47, a detailed description thereof will be omitted.

The communication function 1002A has functions for communicating with the MME 5, the S-CSCF 90, the I-CSCF 92, and the like. Since the communication function 1002A has the same functions as those of the interface 1002 of the HSS 100 illustrated in FIG. 47, a detailed description thereof will be omitted. The controller 6 has the same functions as those of the controller 6 exemplified in FIG. 13.

A control unit 61A of the controller 6 performs provisioning of resources of the virtual HSS 100A. The control unit 61A, for example, requests the server 20 that operates virtual machines to allocate resources to the virtual HSS 100A based on a calculated amount of resources. Alternatively, the control unit 61A, for example, requests to allocate resources (server resources, CPU resources, network resources, or the like) to the virtual HSS 100A based on a calculated amount of resources.

FIG. 51 is a sequence chart illustrating an operation example of the communication system exemplified in FIG. 49.

At least one of the MME 5 included in the access network, the communication devices 9 (the S-CSCF 90, the P-CSCF 91, and the I-CSCF 92), and the virtual HSS 100A communicates traffic data, which are information relating to at least one of traffic of control signals and traffic of user data, to the controller 6 (S11-1). At least one of the MME 5, the communication devices 9, and the virtual HSS 100A communicates the traffic data to the controller 6, for example, at a predetermined timing.

The control unit 61A of the controller 6 accumulates the communicated traffic data in the traffic data accumulation unit 60 (S11-2).

The control unit 61A of the controller 6 extracts a traffic feature value based on the traffic data accumulated in the traffic data accumulation unit 60 (S11-3). For example, the control unit 61A calculates a burstiness index of packets as a traffic feature value based on the accumulated traffic data, using the equation (2).

The control unit 61A of the controller 6 calculates an amount of resources required for the virtual HSS 100A based on the extracted traffic feature value (S11-4).

The control unit 61A of the controller 6 requests the server 20 that operates virtual machine to allocate resources to the virtual HSS 100A based on the amount of resources that the control unit 61A has calculated (provisioning request in S11-5).

The control unit 210 of the server 20, in response to the request from the controller 6, allocates an amount of resources, based on the request, to the virtual HSS 100A (provisioning in S11-6).

As described above, in the ninth example embodiment of the present invention, the controller 6 performs resource control of the HSS 100 (or the virtual HSS 100A) based on a traffic feature value extracted from traffic data. Therefore, in the ninth example embodiment, it may enable at least one of, for example, preventing a processing delay or the like of the HSS 100 (or the virtual HSS 100A), generated due to characteristics of traffic such as burstiness or the like, and improving the stability of the network.

The present invention was described above through example embodiments thereof, but the present invention is not limited to the respective example embodiments described above. The present invention can be carried out on the basis of any modification, substitution, or adjustment of each example embodiment. The present invention can also be carried out by arbitrarily combining respective example embodiments. In other words, the present invention includes various modifications and alterations that can be achieved according to the entire disclosure and technical ideas of the specification. Moreover, the present invention is also applicable to the technical field of an SDN (Software-Defined Network).

REFERENCE SIGNS LIST

1 Terminal
2, 2B Base station (eNB)
2A Virtual base station (virtual eNB)
3 S-GW
3A Virtual S-GW
4 P-GW
4A Virtual P-GW
5 MME
5A Virtual MME
6 Controller
7, 7B Communication device
7A Virtual network node
8 Resource control device
9 Communication device
9A Virtual network node
10, 10A Message generating unit
11, 11A Communication unit
20, 20A Server
21 Communication unit
22 Switching unit
23 Discerning unit
50 Traffic data accumulation function
51, 51A Control function
52 Communication function
60 Traffic data accumulation unit
61, 61A, 61B Control unit
62 Interface
70 Control unit
71 Signal processing unit
80 Traffic data accumulation unit
81 Control unit
82 Interface
90 S-CSCF
90A Virtual S-CSCF
91 P-CSCF
91A Virtual P-CSCF
92 I-CSCF
92A Virtual I-CSCF
100 HSS
100A Virtual HSS
200 Virtual network function (VNF)
201 Control function
202 Signal processing function
210, 210A Control unit
1000 Subscriber information database
1000A Subscriber information database function
1001 Control unit
1001A Control function
1002 Interface
1002A Communication function
2100 VM control unit
2101 Session control unit

The invention claimed is:

1. A communication device provided in a communication network, the communication device comprising:
a memory storing instructions; and
one or more processors configured to execute the instructions to:
from a virtual network node that provides network functions relating to signal processing by software of a virtual machine, collect traffic data that are packet related information transmitted and received among respective virtual network nodes in the communication network;
from the collected traffic data, extract a traffic feature value that includes a burstiness index, the burstiness index indicating a degree to which packets generated within a certain period of time at a plurality of communication devices in the communication network arrive simultaneously;
based on the extracted burstiness index and data that indicates relationships between an occurrence rate of the generated packets and the mean delay in signal processing by using the burstiness index as a parameter, calculate an amount of resources of the virtual network node, the amount of resources being required for the mean delay in signal processing to be not more than a predetermined threshold value; and
request the virtual network node to preform provisioning of resources by controlling the network functions for allocating the calculated amount of resources.

2. The communication device according to claim 1, wherein the traffic feature value including at least one of a statistic relating to an occurrence rate or arrival rate of connection requests, a periodic internal, a phase, and a phase shift.

3. The communication device according to claim 1, wherein
the collected traffic data is predetermined traffic data relating to a predetermined type of terminal, and
the one or more processors are configured to calculate an amount of resources required for processing the predetermined traffic of the virtual network node that handles the predetermined traffic data.

4. The communication device according to claim 3, wherein
the predetermined type of terminal is an MTC (Machine Type Communication) device.

5. The communication device according to claim 1, wherein
the communication device is one of the virtual communication nodes in the communication network, and
the one or more processors are configured to calculate the amount of resources of the virtual network nodes including the communication device for allocating necessary resources.

6. The communication device according to claim 1, wherein, the burstiness index is calculated by performing statistic processing on time information of generated packets and information of the number of packets.

7. The communication device according to claim 6, wherein, the burstiness index is obtained based on the mean of arrival time intervals between generated packets, the variance of the arrival time intervals between the generated packets and the maximum number of packets acceptable at the same time.

8. The communication device according to claim 1, wherein the amount of resources to be allocated to the virtual network node includes at least one of server resources, processor resources and network resources.

9. The communication device according to claim 1, wherein performing the provisioning of resources includes performing at least one of start, removal, and stop of the virtual machine in the virtual network node.

10. A communication method in a communication network comprising:

collecting traffic data, from a virtual network node that provides network functions relating to signal processing by software of a virtual machine, that are packet related information transmitted and received among the respective virtual network nodes in the communication network;

extracting, from the collected traffic data, a traffic feature value that includes a burstiness index, the burstiness index indicating a degree to which packets generated within a certain period of time at a plurality of communication devices in the communication network arrives simultaneously;

calculating, based on the extracted burstiness index and data that indicates relationships between occurrence rate of the generated packets and the mean delay in signal processing by using the burstiness index as a parameter, an amount of resources of the virtual network node, the amount of resources being required for the mean delay in signal processing to be not more than a predetermined threshold value; and requesting the virtual network node to perform provisioning of resources by controlling the network functions for allocating the calculated amount of resources.

* * * * *

UNITED STATES PATENT AND TRADEMARK OFFICE
CERTIFICATE OF CORRECTION

PATENT NO. : 10,271,221 B2  
APPLICATION NO. : 15/534569  
DATED : April 23, 2019  
INVENTOR(S) : Yoshiyuki Yamada Page 1 of 1

It is certified that error appears in the above-identified patent and that said Letters Patent is hereby corrected as shown below:

In the Claims

Column 42, Line 36; In Claim 1, delete "preform" and insert --perform-- therefor Column 42, Line 42; In Claim 2, delete "internal," and insert --interval,-- therefor Signed and Sealed this  
Twentieth Day of August, 2019

Andrei Iancu  
*Director of the United States Patent and Trademark Office*